(12) United States Patent
Gundel

(10) Patent No.: US 12,205,732 B2
(45) Date of Patent: *Jan. 21, 2025

(54) SHIELDED ELECTRIC CABLE

(71) Applicant: 3M INNOVATIVE PROPERTIES COMPANY, St. Paul, MN (US)

(72) Inventor: Douglas B. Gundel, Cedar Park, TX (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 18/130,969

(22) Filed: Apr. 5, 2023

(65) Prior Publication Data
US 2023/0290542 A1    Sep. 14, 2023

Related U.S. Application Data

(63) Continuation of application No. 17/731,577, filed on Apr. 28, 2022, now Pat. No. 11,651,871, which is a
(Continued)

(51) Int. Cl.
*H01B 11/08*   (2006.01)
*G08B 25/00*   (2006.01)
(Continued)

(52) U.S. Cl.
CPC ........... *H01B 11/08* (2013.01); *G08B 25/004* (2013.01); *H01B 7/0823* (2013.01);
(Continued)

(58) Field of Classification Search
CPC .... H01B 3/00; H01B 3/30; H01B 3/305–308; H01B 3/44; H01B 7/04; H01B 7/02;
(Continued)

(56) References Cited

U.S. PATENT DOCUMENTS 2,952,728 A    9/1960    Yokose
3,496,281 A    2/1970    McMahon
(Continued)

FOREIGN PATENT DOCUMENTS

DE    911277      9/1954
DE    2644252     9/1976
(Continued)

OTHER PUBLICATIONS

PCT International Search Report for PCT/US2010/060629 mailed Oct. 17, 2011, 7 pages.
(Continued)

*Primary Examiner* — William H. Mayo, III
(74) *Attorney, Agent, or Firm* — Robert S. Moshrefzadeh

(57) ABSTRACT

A shielded electrical cable includes conductor sets extending along a length of the cable and spaced apart from each other along a width of the cable. First and second shielding films are disposed on opposite sides of the cable and include cover portions and pinched portions arranged such that, in transverse cross section, the cover portions of the films in combination substantially surround each conductor set. An adhesive layer bonds the shielding films together in the pinched portions of the cable. A transverse bending of the cable at a cable location of no more than 180 degrees over an inner radius of at most 2 mm causes a cable impedance of the selected insulated conductor proximate the cable location to vary by no more than 2 percent from an initial cable impedance measured at the cable location in an unbent configuration.

7 Claims, 25 Drawing Sheets

Related U.S. Application Data continuation of application No. 17/301,396, filed on Apr. 1, 2021, now Pat. No. 11,348,706, which is a continuation of application No. 16/947,868, filed on Aug. 21, 2020, now Pat. No. 10,998,111, which is a continuation of application No. 16/748,852, filed on Jan. 22, 2020, now Pat. No. 10,784,021, which is a continuation of application No. 16/424,794, filed on May 29, 2019, now Pat. No. 10,573,432, which is a continuation of application No. 16/120,624, filed on Sep. 4, 2018, now Pat. No. 10,340,059, which is a continuation of application No. 15/481,539, filed on Apr. 7, 2017, now Pat. No. 10,090,082, which is a continuation of application No. 14/926,464, filed on Oct. 29, 2015, now Pat. No. 9,653,195, which is a continuation of application No. 13/893,828, filed on May 14, 2013, now Pat. No. 9,208,927, which is a continuation of application No. 13/541,794, filed on Jul. 5, 2012, now Pat. No. 8,466,365, which is a continuation of application No. PCT/US2010/060629, filed on Dec. 16, 2010, application No. 18/130,969 is a continuation of application No. 17/301,396, filed on Apr. 1, 2021, now Pat. No. 11,348,706, said application No. 15/481,539 is a continuation of application No. 15/427,544, filed on Feb. 8, 2017, now Pat. No. 9,865,378, which is a continuation of application No. 15/245,708, filed on Aug. 24, 2016, now Pat. No. 9,601,236, which is a continuation of application No. 14/926,464, filed on Oct. 29, 2015, now Pat. No. 9,653,195, which is a continuation of application No. 14/561,291, filed on Dec. 5, 2014, now Pat. No. 9,196,397, which is a continuation of application No. 13/968,674, filed on Aug. 16, 2013, now Pat. No. 8,933,333, which is a continuation of application No. 13/893,828, filed on May 14, 2013, now Pat. No. 9,208,927.

(60) Provisional application No. 61/378,872, filed on Aug. 31, 2010.

(51) Int. Cl.

| | | |
|---|---|---|
| *H01B 7/08* | (2006.01) | |
| *H01B 9/02* | (2006.01) | |
| *H01B 11/00* | (2006.01) | |
| *H01B 11/04* | (2006.01) | |
| *H01B 11/10* | (2006.01) | |
| *H01B 11/20* | (2006.01) | |
| *H01R 9/05* | (2006.01) | |
| *H01R 12/59* | (2011.01) | |
| *H01R 13/58* | (2006.01) | |
| *H04L 41/28* | (2022.01) | |
| *H04W 4/70* | (2018.01) | |
| *H04W 24/04* | (2009.01) | |
| *H04W 84/18* | (2009.01) | |
| *H01R 12/53* | (2011.01) | |
| *H04L 43/0811* | (2022.01) | |
| *H04L 43/0817* | (2022.01) | |

(52) U.S. Cl.
CPC ......... *H01B 7/0838* (2013.01); *H01B 7/0861* (2013.01); *H01B 7/0876* (2013.01); *H01B 9/02* (2013.01); *H01B 11/00* (2013.01); *H01B 11/002* (2013.01); *H01B 11/04* (2013.01); *H01B 11/10* (2013.01); *H01B 11/203* (2013.01); *H01R 9/0515* (2013.01); *H01R 12/598* (2013.01); *H01R 13/5845* (2013.01); *H04L 41/28* (2013.01); *H04W 4/70* (2018.02); *H04W 24/04* (2013.01); *H04W 84/18* (2013.01); *H01R 12/53* (2013.01); *H04L 43/0811* (2013.01); *H04L 43/0817* (2013.01)

(58) Field of Classification Search
CPC .. H01B 7/08; H01B 7/087–0892; H01B 7/10; H01B 7/102–108
USPC .......................................... 174/110 R–120 R
See application file for complete search history.

(56) References Cited

U.S. PATENT DOCUMENTS

| | | | | |
|---|---|---|---|---|
| 3,775,552 | A | * | 11/1973 | Schumacher ........ H01B 7/0838 174/105 R |
| 3,790,697 | A | | 2/1974 | Buckingham |
| 3,993,394 | A | | 11/1976 | Cooper |
| 4,099,323 | A | | 7/1978 | Bouvier |
| 4,149,026 | A | * | 4/1979 | Fritz .................... H01B 7/0838 174/32 |
| 4,185,162 | A | | 1/1980 | Bogese |
| 4,234,759 | A | | 11/1980 | Harlow |
| 4,287,385 | A | | 9/1981 | Dombrowsky |
| 4,297,522 | A | | 10/1981 | Jesse et al. |
| 4,382,236 | A | * | 5/1983 | Suzuki ................ H01B 7/0838 428/209 |
| 4,404,424 | A | | 9/1983 | King et al. |
| 4,412,092 | A | | 10/1983 | Hansell, III |
| 4,413,469 | A | | 11/1983 | Paquin |
| 4,449,778 | A | | 5/1984 | Lane |
| 4,468,089 | A | | 8/1984 | Brorein |
| 4,470,195 | A | | 9/1984 | Lang |
| 4,475,006 | A | | 10/1984 | Olyphant |
| 4,481,379 | A | * | 11/1984 | Bolick, Jr. ........... H01B 7/0838 174/117 F |
| 4,487,992 | A | | 12/1984 | Tomita |
| 4,490,574 | A | | 12/1984 | Tomita et al. |
| 4,492,815 | A | | 1/1985 | Maros |
| 4,611,656 | A | | 9/1986 | Kendall et al. |
| 4,705,332 | A | | 11/1987 | Sadigh-Behzadi |
| 4,720,155 | A | | 1/1988 | Schildkraut et al. |
| 4,735,583 | A | | 4/1988 | Rudy, Jr. et al. |
| 4,767,345 | A | | 8/1988 | Gutter et al. |
| 4,767,891 | A | | 8/1988 | Biegon et al. |
| 4,780,157 | A | * | 10/1988 | Coon ...................... H02K 3/14 174/117 FF |
| 4,800,236 | A | | 1/1989 | Lemke |
| 4,850,898 | A | | 7/1989 | Gallusser |
| 4,920,234 | A | | 4/1990 | Lemke |
| 5,008,489 | A | | 4/1991 | Weeks et al. |
| 5,057,646 | A | | 10/1991 | Nichols et al. |
| 5,084,594 | A | | 1/1992 | Cady et al. |
| 5,090,911 | A | | 2/1992 | Welsh |
| 5,132,489 | A | | 7/1992 | Yamano |
| 5,144,098 | A | | 9/1992 | VanDeusen |
| 5,162,611 | A | | 11/1992 | Nichols, III et al. |
| 5,171,161 | A | | 12/1992 | Kachlic |
| 5,184,965 | A | | 2/1993 | Myschik et al. |
| 5,235,132 | A | | 8/1993 | Ainsworth et al. |
| 5,244,415 | A | | 9/1993 | Marsilio et al. |
| 5,250,127 | A | * | 10/1993 | Hara ...................... H01B 7/385 156/247 |
| 5,268,531 | A | | 12/1993 | Nguyen et al. |
| 5,279,415 | A | | 1/1994 | Edgley et al. |
| 5,286,924 | A | | 2/1994 | Loder et al. |
| 5,306,869 | A | | 4/1994 | Springer et al. |
| 5,380,216 | A | | 1/1995 | Broesteeg et al. |
| 5,416,268 | A | | 5/1995 | Ellis |
| 5,441,424 | A | | 8/1995 | Morlion et al. |
| 5,446,239 | A | * | 8/1995 | Mizutani .............. H01B 7/0861 174/117 FF |
| 5,460,533 | A | | 10/1995 | Broeksteeg et al. |
| 5,477,159 | A | | 12/1995 | Hamling |
| 5,483,020 | A | | 1/1996 | Hardie et al. |
| 5,507,653 | A | | 4/1996 | Stoner |
| 5,511,992 | A | | 4/1996 | Thalhammer |

(56) References Cited

U.S. PATENT DOCUMENTS

| | | |
|---|---|---|
| 5,518,421 A | 5/1996 | Davis |
| 5,524,766 A | 6/1996 | Marchek et al. |
| 5,600,544 A | 2/1997 | Thalhammer |
| 5,632,634 A | 5/1997 | Soes |
| 5,702,258 A | 12/1997 | Provencher et al. |
| 5,743,765 A | 4/1998 | Andrews et al. |
| 5,766,036 A | 6/1998 | Ahmad et al. |
| 5,767,442 A | 6/1998 | Eisenberg et al. |
| 5,775,924 A | 7/1998 | Miskin et al. |
| 5,804,768 A | 9/1998 | Sexton |
| 5,900,588 A | 5/1999 | Springer et al. |
| 5,934,942 A | 8/1999 | Patel et al. |
| 5,938,476 A | 8/1999 | Wu et al. |
| 5,941,733 A | 8/1999 | Lai |
| 6,007,385 A | 12/1999 | Wu |
| 6,039,606 A | 3/2000 | Chiou |
| 6,089,916 A | 7/2000 | Kuo |
| 6,207,901 B1 | 3/2001 | Smith et al. |
| 6,367,128 B1 | 4/2002 | Galkiewicz et al. |
| 6,403,887 B1 | 6/2002 | Kebabjian et al. |
| 6,444,902 B1 | 9/2002 | Tsao et al. |
| 6,524,135 B1 | 2/2003 | Feldman et al. |
| 6,546,604 B2 | 4/2003 | Galkiewicz et al. |
| 6,588,074 B2 | 7/2003 | Galkiewicz et al. |
| 6,630,624 B2 | 10/2003 | Tsao et al. |
| 6,717,058 B2 * | 4/2004 | Booth .................. H01B 7/0892 174/117 FF |
| 6,763,556 B2 | 7/2004 | Fagan et al. |
| 6,803,518 B2 | 10/2004 | Chang |
| 6,815,611 B1 | 11/2004 | Gareis |
| 6,831,230 B2 | 12/2004 | Ide et al. |
| 7,267,575 B1 | 9/2007 | Hwang |
| 7,294,786 B2 * | 11/2007 | Aldereguia ............ G02B 6/447 174/84 R |
| 7,329,141 B2 | 2/2008 | Kumakura et al. |
| 7,485,809 B2 * | 2/2009 | Aldereguia ............ G02B 6/447 174/84 R |
| 7,601,010 B1 | 10/2009 | Wu |
| 7,807,327 B2 | 10/2010 | Hayashi et al. |
| 7,807,927 B2 * | 10/2010 | Yeh ...................... H01B 7/0838 174/117 FF |
| 8,841,554 B2 | 9/2014 | Gundel et al. |
| 11,651,871 B2 * | 5/2023 | Gundel ................ H01B 7/0876 174/250 |
| 11,854,716 B2 * | 12/2023 | Gundel ................ H01B 11/04 |
| 2002/0020545 A1 | 2/2002 | Suzuki |
| 2003/0085052 A1 | 5/2003 | Tsao et al. |
| 2003/0102148 A1 * | 6/2003 | Ohara ...................... H01B 7/08 174/117 F |
| 2003/0213610 A1 * | 11/2003 | Ide ...................... H01B 7/0861 174/117 F |
| 2006/0013315 A1 * | 1/2006 | Song ...................... H04N 19/86 375/E7.193 |
| 2006/0016615 A1 | 1/2006 | Schilson et al. |
| 2006/0054334 A1 | 3/2006 | Vaupotic et al. |
| 2006/0172588 A1 | 8/2006 | Peng |
| 2006/0207784 A1 | 9/2006 | Chang |
| 2007/0240896 A1 | 10/2007 | Ott et al. |
| 2007/0240898 A1 * | 10/2007 | Reichert .............. H01B 7/0838 174/117 FF |
| 2008/0041610 A1 | 2/2008 | Cheng |
| 2010/0051314 A1 | 3/2010 | Watanabe et al. |
| 2010/0126752 A1 | 5/2010 | Watanabe |
| 2010/0186225 A1 | 7/2010 | Reichert |
| 2012/0090866 A1 | 4/2012 | Gundel |
| 2012/0090872 A1 | 4/2012 | Gundel |
| 2012/0090873 A1 | 4/2012 | Gundel |
| 2012/0097421 A1 | 4/2012 | Gundel |
| 2012/0267159 A1 | 10/2012 | Gundel |
| 2012/0285723 A1 | 11/2012 | Gundel et al. |
| 2012/0298395 A1 | 11/2012 | Gundel |
| 2013/0105196 A1 | 5/2013 | Gundel et al. |
| 2013/0146326 A1 | 6/2013 | Gundel et al. |
| 2013/0146327 A1 | 6/2013 | Gundel et al. |
| 2013/0168149 A1 | 7/2013 | Gundel |
| 2014/0000931 A1 | 1/2014 | Gundel et al. |
| 2014/0014406 A1 | 1/2014 | Gundel et al. |

FOREIGN PATENT DOCUMENTS

| | | |
|---|---|---|
| DE | 2547152 | 4/1977 |
| DE | 2758472 | 12/1977 |
| DE | 3522173 | 7/1986 |
| EP | 0 082 700 | 6/1983 |
| EP | 103430 | 3/1984 |
| EP | 0 284 245 | 9/1988 |
| EP | 0 366 046 | 5/1990 |
| EP | 0 446 980 | 9/1991 |
| EP | 0 477 006 | 3/1992 |
| EP | 0 548 942 | 6/1993 |
| EP | 0 654 859 | 5/1995 |
| EP | 0 696 085 | 2/1996 |
| EP | 0 907 221 | 4/1999 |
| EP | 0 961 298 | 12/1999 |
| EP | 2 085 058 | 8/2009 |
| GB | 1 546 609 | 5/1979 |
| JP | S60-124315 | 7/1985 |
| JP | 60 140309 | 9/1985 |
| JP | 61 133914 | 8/1986 |
| JP | S61-194218 | 12/1986 |
| JP | S61-292814 | 12/1986 |
| JP | S62-226508 | 10/1987 |
| JP | 1023947 | 1/1989 |
| JP | H03-48808 U | 7/1989 |
| JP | H01-298605 | 12/1989 |
| JP | 4 36906 | 2/1992 |
| JP | H06-5042 | 1/1994 |
| JP | 08-203350 | 8/1996 |
| JP | 1998-233056 | 8/1998 |
| JP | 2000082346 | 3/2000 |
| JP | 2001135157 | 5/2001 |
| JP | 2001-326007 | 11/2001 |
| JP | 2002-117731 | 4/2002 |
| JP | 2003-045240 | 2/2003 |
| JP | 2003281944 | 10/2003 |
| JP | 2005-108754 | 4/2005 |
| JP | 2005-116300 | 4/2005 |
| JP | 2006 286480 | 10/2006 |
| JP | 2007-059323 | 3/2007 |
| JP | 2007265640 | 10/2007 |
| JP | 2008-77952 | 4/2008 |
| JP | 4164979 | 8/2008 |
| JP | 2009093934 | 4/2009 |
| JP | 2009-181792 | 8/2009 |
| JP | 2010 097882 | 4/2010 |
| WO | WO 2006/113702 | 10/2006 |
| WO | WO 2009/130859 | 10/2009 |

OTHER PUBLICATIONS

Extended European Search Report from EP 13183059.8 mailed on May 16, 2014, 8 pages.

De Araujo, D.N. et al. "Full-Wave, TwinAx, Differential Cable Modeling", IEEE, 2008 Electronic Components and Technology Conference, pp. 1684-1689.

PCT International Search Report for PCT/US2010/060625 mailed Jun. 29, 2011, 5 pages.

PCT International Search Report for PCT/US2010/060640 mailed Jul. 21, 2011, 5 pages.

* cited by examiner

SHIELDED ELECTRIC CABLE

CROSS REFERENCE TO RELATED APPLICATIONS

This application is a continuation of U.S. application Ser. No. 17/731,577, filed Apr. 28, 2022, issued as U.S. Pat. No. 11,651,871, which is a continuation of U.S. application Ser. No. 17/301,396, filed Apr. 1, 2021, issued as U.S. Pat. No. 11,348,706, which is a continuation of U.S. application Ser. No. 16/947,868, filed Aug. 21, 2020, issued as U.S. Pat. No. 10,998,111, which is a continuation of U.S. application Ser. No. 16/748,852, filed Jan. 22, 2020, issued as U.S. Pat. No. 10,784,021, which is a continuation of U.S. application Ser. No. 16/424,794, filed May 29, 2019, issued as U.S. Pat. No. 10,573,432, which is a continuation of Ser. No. 16/120,624, filed Sep. 4, 2018, issued as U.S. Pat. No. 10,340,059, which is a continuation of U.S. application Ser. No. 15/481,539, filed Apr. 7, 2017, issued as U.S. Pat. No. 10,090,082, which is a continuation of U.S. application Ser. No. 14/926,464, filed Oct. 29, 2015, issued as U.S. Pat. No. 9,653,195, which is a continuation of U.S. application Ser. No. 13/893,828, filed May 14, 2013, issued as U.S. Pat. No. 9,208,927, which is a continuation of U.S. application Ser. No. 13/541,794, filed Jul. 5, 2012, issued as U.S. Pat. No. 8,466,365, which is a continuation of PCT/US2010/060629, filed Dec. 16, 2010, which claims priority to U.S. Provisional Application No. 61/378,872, filed Aug. 31, 2010.

This application is a continuation of U.S. application Ser. No. 17/731,577, filed Apr. 28, 2022, issued as U.S. Pat. No. 11,651,871, which is a continuation of U.S. application Ser. No. 17/301,396, filed Apr. 1, 2021, issued as U.S. Pat. No. 11,348,706 which is a continuation of U.S. application Ser. No. 16/947,868, filed Aug. 21, 2020, issued as U.S. Pat. No. 10,998,111, which is a continuation of U.S. application Ser. No. 16/748,852, filed Jan. 22, 2020, issued as U.S. Pat. No. 10,784,021, which is a continuation of U.S. application Ser. No. 16/424,794, filed May 29, 2019, issued as U.S. Pat. No. 10,573,432, which is a continuation of U.S. application Ser. No. 16/120,624, filed Sep. 4, 2018, issued as U.S. Pat. No. 10,340,059, which is a continuation of U.S. application Ser. No. 15/481,539, filed Apr. 7, 2017, issued as U.S. Pat. No. 10,090,082, which is a continuation of U.S. application Ser. No. 15/427,544, filed Feb. 8, 2017, issued as U.S. Pat. No. 9,865,378, which is a continuation of Ser. No. 15/245,708, filed Aug. 24, 2016, issued as U.S. Pat. No. 9,601,236, which is a continuation of U.S. application Ser. No. 14/926,464, filed Oct. 29, 2015, issued as U.S. Pat. No. 9,653,195, which is a continuation of U.S. application Ser. No. 14/561,291, filed Dec. 5, 2014, issued as U.S. Pat. No. 9,196,397, which is a continuation of U.S. application Ser. No. 13/968,674, filed Aug. 16, 2013, issued as U.S. Pat. No. 8,933,333, which is a continuation of U.S. application Ser. No. 13/893,828, filed May 14, 2013, issued as U.S. Pat. No. 9,208,927, which is a continuation of Ser. No. 13/541,794, filed Jul. 5, 2012, issued as U.S. Pat. No. 8,466,365, which is a continuation of PCT/US2010/060629, filed Dec. 16, 2010, which claims priority to U.S. Provisional Application No. 61/378,872, filed Aug. 31, 2010.

TECHNICAL FIELD

The present disclosure relates generally to shielded electrical cables for the transmission of electrical signals, in particular, to shielded electrical cables that can be mass-terminated and provide high speed electrical properties.

BACKGROUND

Due to increasing data transmission speeds used in modern electronic devices, there is a demand for electrical cables that can effectively transmit high speed electromagnetic signals (e.g., greater than 1 Gb/s). One type of cable used for these purposes are coaxial cables. Coaxial cables generally include an electrically conductive wire surrounded by an insulator. The wire and insulator are surrounded by a shield, and the wire, insulator, and shield are surrounded by a jacket. Another type of electrical cable is a shielded electrical cable having one or more insulated signal conductors surrounded by a shielding layer formed, for example, by a metal foil.

Both these types of electrical cable may require the use of specifically designed connectors for termination and are often not suitable for the use of mass-termination techniques, e.g., the simultaneous connection of a plurality of conductors to individual contact elements. Although electrical cables have been developed to facilitate these mass-termination techniques, these cables often have limitations in the ability to mass-produce them, in the ability to prepare their termination ends, in their flexibility, and in their electrical performance.

SUMMARY

The present disclosure is to directed to high speed electrical data cables. In one embodiment, a shielded electrical cable, comprises a plurality of conductor sets extending along a length of the cable and being spaced apart from each other along a width of the cable. Each conductor set includes one or more insulated conductors. The cable also comprises first and second shielding films disposed on opposite sides of the cable. The first and second films include cover portions and pinched portions arranged such that, in transverse cross section, the cover portions of the first and second films in combination substantially surround each conductor set. The pinched portions of the first and second films in combination form pinched portions of the cable on each side of each conductor set. The cable further comprises a first adhesive layer bonding the first shielding film to the second shielding film in the pinched portions of the cable. The plurality of conductor sets comprises a first conductor set that comprises neighboring first and second insulated conductors and has corresponding first cover portions of the first and second shielding films and corresponding first pinched portions of the first and second shielding films forming a first pinched cable portion on one side of the first conductor set. A selected one of the insulated conductors has a wire diameter no greater than 24 American wire gauge (AWG), and a transverse bending of the cable at a cable location of no more than 180 degrees over an inner radius of at most 2 mm causes a cable impedance of the selected insulated conductor proximate the cable location to vary by no more than 2 percent from an initial cable impedance measured at the cable location in an unbent configuration.

In one configuration, the wire diameter of the selected insulated conductor may be no greater than 26 AWG, and wherein a transverse bending of a cable location of no more than 180 degrees over an inner radius of at most 1 mm causes the cable impedance of the selected insulated conductor proximate the cable location to vary by no more than 1 percent from the initial cable impedance. In another configuration, the selected insulated conductor may be part of a selected one of the conductor sets that includes at least two insulated conductors each having a wire diameter no greater than 24 AWG and a nominal differential impedance of 100 ohms. In such a case, the transverse bending of the cable causes a differential cable impedance of the selected conductor set proximate the cable location to vary by no more than 2 ohms from an initial differential cable impedance measured at the cable location in the unbent configuration. Also in such a case, the wire diameter of the at least two insulated conductors may be no greater than 26 AWG, and therefore the transverse bending of a cable location of no more than 180 degrees over a second inner radius of at most 1 mm causes the differential cable impedance of the selected conductor set proximate the cable location to vary by no more than 1 ohm from the initial differential impedance.

In any of the embodiments above, the selected insulated conductor may have a nominal cable impedance of 50 ohms, and in such a case the cable impedance of the selected insulated conductor proximate the cable location varies by no more than 1 ohm from the initial cable impedance. In any of these embodiments, the cable may further comprise a bend of at least 45 degrees around a fold line that extends across a width of the cable, wherein the bend has an inner radius of at most 5 mm. In such a case, the bend may be at least 90 degrees and conforms to geometry of a structure that encloses the cable, and/or the bend may be at least 180 degrees and the fold line is at a fold angle relative to a longitudinal edge of the cable such that the cable turns at a turn angle in response to flattening of proximate regions before and after the bend to a plane. In the latter case, the fold angle may be 45 degrees, and the turn angle 90 degrees.

In another embodiment, a shielded electrical cable comprises a plurality of conductor sets extending along a length of the cable and being spaced apart from each other along a width of the cable. Each conductor set includes one or more insulated conductors. The cable also comprises first and second shielding films disposed on opposite sides of the cable. The first and second films including cover portions and pinched portions arranged such that, in transverse cross section, the cover portions of the first and second films in combination substantially surround each conductor set. The pinched portions of the first and second films in combination form pinched portions of the cable on each side of each conductor set. The cable further comprises first adhesive layer bonding the first shielding film to the second shielding film in the pinched portions of the cable. The plurality of conductor sets comprises a first conductor set that comprises neighboring first and second insulated conductors and has corresponding first cover portions of the first and second shielding films and corresponding first pinched portions of the first and second shielding films forming a first pinched cable portion on one side of the first conductor set. A selected one of the insulated conductors has a wire diameter no greater than 24 American wire gauge (AWG), and a transverse bending of the cable at a cable location of no more than 180 degrees over an inner radius of at most 5 mm causes an insertion loss of the selected insulated conductor proximate the cable location to vary by no more than 0.5 dB from an initial insertion loss measured at the cable location in an unbent configuration.

In this embodiment, the cable may further comprise a bend of at least 45 degrees around a fold line that extends across a width of the cable, wherein the bend has an inner radius of at most 5 mm. In such a case, the bend may be at least 90 degrees and conforms to geometry of a structure that encloses the cable, and/or the bend may be at least 180 degrees and the fold line is at a fold angle relative to a longitudinal edge of the cable such that the cable turns at a turn angle in response to flattening of proximate regions before and after the bend to a plane. In the latter case, the fold angle may be 45 degrees, and the turn angle 90 degrees.

In another embodiment of the invention, a shielded electrical cable comprises a plurality of conductor sets extending along a length of the cable and being spaced apart from each other along a width of the cable. Each conductor set includes one or more insulated conductors. The cable also comprises first and second shielding films disposed on opposite sides of the cable. The first and second films include cover portions and pinched portions arranged such that, in transverse cross section, the cover portions of the first and second films in combination substantially surround each conductor set. The pinched portions of the first and second films in combination form pinched portions of the cable on each side of each conductor set. The cable further includes a first adhesive layer bonding the first shielding film to the second shielding film in the pinched portions of the cable. The plurality of conductor sets comprises a first conductor set that comprises neighboring first and second insulated conductors and has corresponding first cover portions of the first and second shielding films and corresponding first pinched portions of the first and second shielding films forming a first pinched cable portion on one side of the first conductor set. An application of a force on the cable, the cable being simply supported between two supporting points that are 3.0 inches apart and the force being applied midpoint between the supporting points, results in a deflection in the direction of the force of at least one inch. The force, measured in pounds-force, does not exceed the sum of individual forces for each of the insulated conductors, the individual forces being equal to 11000 times a wire diameter cubed of the respective insulated conductor, the wire diameter being expressed in inches.

In one arrangement, the wire diameter may be no greater than 24 American wire gauge (AWG). In any of these arrangements, the maximum force may occur when the deflection is between 1 inch and 1.5 inches. Similarly, the cable in any of these arrangement may further comprise a bend of at least 45 degrees around a fold line that extends across a width of the cable, wherein the bend has an inner radius of at most 5 mm. In such a case, the bend may be at least 90 degrees and conform to geometry of a structure that encloses the cable. Or, in such a case, the bend may be at least 180 degrees and the fold line is at a fold angle relative to a longitudinal edge of the cable such that the cable turns at a turn angle in response to flattening of proximate regions before and after the bend to a plane. For example, the fold angle may 45 degrees, and the turn angle 90 degrees.

In another embodiment of the invention, a cable assembly comprises a shielded electrical cable. The cable comprises a plurality of conductor sets extending along a length of the cable and being spaced apart from each other along a width of the cable. Each conductor set includes one or more insulated conductors. The cable also comprises first and second shielding films disposed on opposite sides of the cable. The first and second films include cover portions and pinched portions arranged such that, in transverse cross section, the cover portions of the first and second films in combination substantially surround each conductor set. The pinched portions of the first and second films in combination form pinched portions of the cable on each side of each conductor set. The cable further includes a first adhesive layer bonding the first shielding film to the second shielding film in the pinched portions of the cable. The plurality of conductor sets comprises a first conductor set that comprises neighboring first and second insulated conductors and has corresponding first cover portions of the first and second shielding films and corresponding first pinched portions of the first and second shielding films forming a first pinched cable portion on one side of the first conductor set. The cable assembly further comprises an electrical connector encompassing at least the bend in the cable, wherein at least one of the insulated conductors is electrically coupled to at least one contact of the electrical connector.

In one arrangement, the electrical connector may comprise an overmold formed onto the cable and/or a multi-piece housing. In any of these arrangements, the connector may comprise a paddle card connector. Similarly, the bend may be at least 90 degrees around the fold line in these arrangements, and the inner radius of the bend may be at most 1 mm. In any of these arrangements, the connector may disposed on an end of the cable and/or a middle portion of the cable. The insulated conductors may have a wire diameter of no more than 24 American wire gauge (AWG).

In any of these variations, the cable may further include a second bend not encompassed by the electrical connector, the second bend being of at least 45 degrees around a second fold line that extends across a width of the cable, wherein the second bend has an inner radius of at most 5 mm. The second bend may be at least 90 degrees and conforms to geometry of a structure that encloses the cable assembly, and/or the second bend may be at least 180 degrees and the second fold line is at a fold angle relative to a longitudinal edge of the cable such that the cable turns at a turn angle in response to flattening of proximate regions before and after the second bend to a plane. In such a case, the second fold angle may be 45 degrees, and the turn angle is 90 degrees. In any of these embodiments, the at least one conductor set of the respective cables may be adapted for maximum data transmission rates of at least 1 Gb/s.

These and various other characteristics are pointed out with particularity in the claims annexed hereto and form a part hereof. Reference should also be made to the drawings which form a further part hereof, and to accompanying descriptive matter, in which there are illustrated and described representative examples of systems, apparatuses, and methods.

BRIEF DESCRIPTION OF THE DRAWINGS

In the figures, like reference numerals designate like elements.

DETAILED DESCRIPTION

Figure 1:
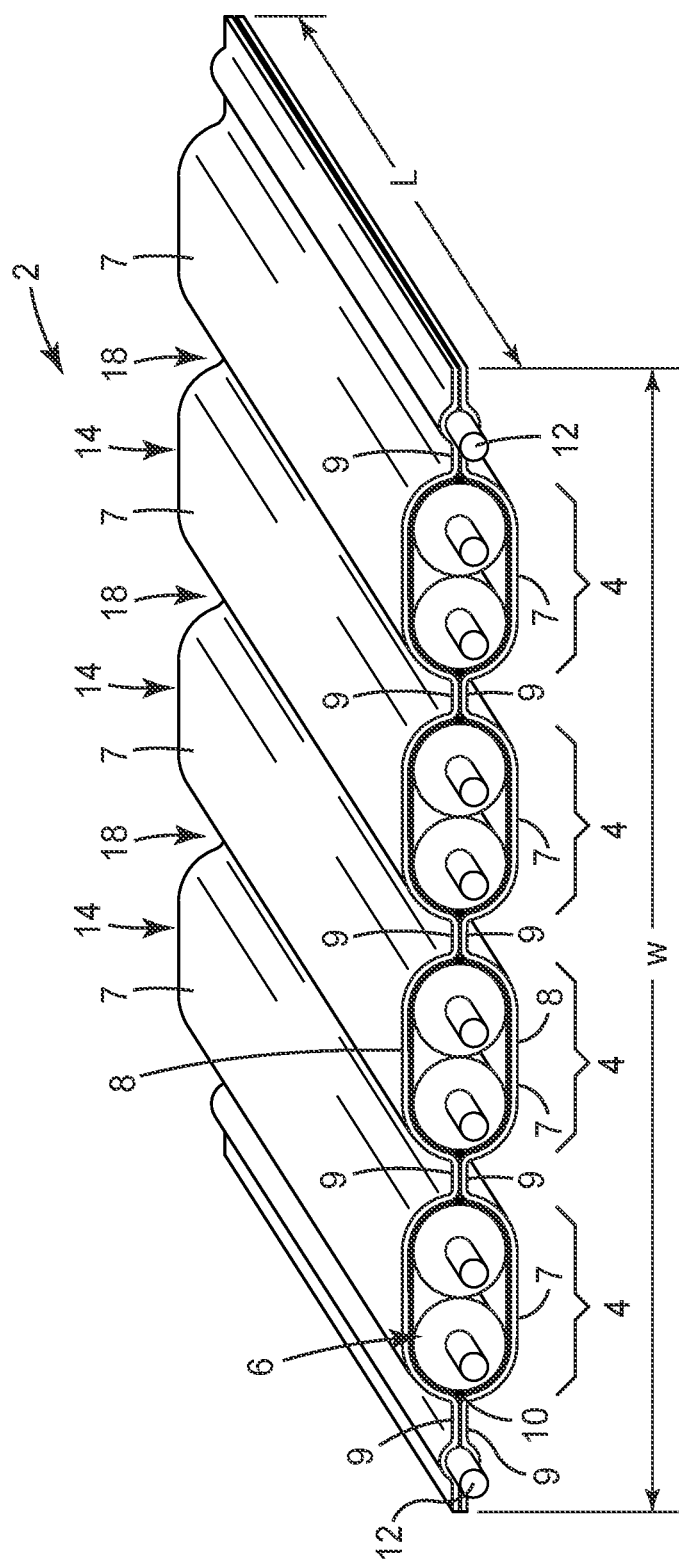
FIG. 1 is a perspective view of an example shielded electrical cable.

In the following description, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention. The following detailed description, therefore, is not to be taken in a limiting sense, and the scope of the invention is defined by the appended claims.

A growing number of applications require high speed (e.g., >1 Gb/s) high signal integrity connections. These applications may include enterprise computing, network communication, factory automation, medical, test and instrumentation, etc. These applications may use twin axial ("twinax") transmission lines that include parallel pairs of differentially-driven conductors. Each pair of conductors may be dedicated to a data transmission channel. The construction of choice for these purposes is often a jacketed loose bundle of shielded paired conductors. The jacket is often formed from shielding and/or insulating wrapped in a helical pattern around the conductor bundle.

Applications are demanding more speed from these channels and more channels per assembly. As a result, there will be a need for cables with improved termination signal integrity, termination cost, impedance/skew control, and cable cost over current twinax transmission lines. The present disclosure is generally directed to a shielded electrical ribbon cable that is suitable for, among other things, differentially driven conductor sets. Due to the ribbon construction, the cable can readily be terminated to a printed circuit board connector of similar pitch. Such a termination can provide very high termination signal integrity. The construction of this type of cable may generally include parallel insulated wires that are bonded to a substrate on one or both sides with specific placement of gaps between conductors.

The substrates may or may not contain a ground plane. Such a cable may be used as an alternative to conventional bundled, e.g., differential pair, twin-axial (twinax) constructions and is expected to have lower cable cost, termination cost, skew, and termination parasitics.

Shielded cables currently used in high performance and high speed applications are generally not sharply bent because this may cause impedance discontinuities at the bend location. Such discontinuities can produce unwanted reflections and poor overall electrical performance. For example, a conventional parallel pair twinax cable for gigabit data applications may be constructed with an overlapped shield (helical wrap) and an outer layer of polymer film to maintain the wrapped shield in place while bending. The wrapped layers add significant stiffness to the cable for bending, and also can cause pinching and local geometry changes within the cable at the bend locations. This results in significant changes in cable characteristics (e.g., impedance) at and proximate to the bend.

Compared to conventional, wrapped, parallel-pair, twinax cables, the ribbon cable structures described in the present disclosure may exhibit improved performance in applications that require sharp bending of the cable. These shield structures and cable constructions can maintain high cable electrical performance even after sharp bending. For example, such ribbon cables may be used with connectors that require the cable be sharply bent within the connector. The constructions can also provide much lower stiffness (e.g., up to one half) on bending than conventional wrapped constructions with similar materials. The lower stiffness and minimal impact on electrical performance under bending allows such cables to be bent more sharply than conventional cables, thereby saving space and providing enhanced routability in a given application.

It is noted that the various sections and section headings are provided for improved organization and convenience, and are not to be construed in a limiting way. For example, the sections and section headings are not to be construed to mean that techniques, methods, features, or components of one section cannot be used with techniques, methods, features, or components of a different section. On the contrary, we intend for any information from any given section or sections to also be applicable to information in any other section or sections, unless otherwise clearly indicated to the contrary.

Section 1: Shielded Electrical Cable Constructions and Features

As the number and speed of interconnected devices increases, electrical cables that carry signals between such devices need to be smaller and capable of carrying higher speed signals without unacceptable interference or crosstalk. Shielding is used in some electrical cables to reduce interactions between signals carried by neighboring conductors. Many of the cables described herein have a generally flat configuration, and include conductor sets that extend along a length of the cable, as well as electrical shielding films disposed on opposite sides of the cable. Pinched portions of the shielding films between adjacent conductor sets help to electrically isolate the conductor sets from each other. Many of the cables also include drain wires that electrically connect to the shields, and extend along the length of the cable. The cable configurations described herein can help to simplify connections to the conductor sets and drain wires, reduce the size of the cable connection sites, and/or provide opportunities for mass termination of the cable.

In FIG. 1 an exemplary shielded electrical cable 2 is shown that includes a plurality of conductor sets 4 spaced apart from each other along all or a portion of a width, w, of the cable 2 and extend along a length, L, of the cable 2. The cable 2 may be arranged generally in a planar configuration as illustrated in FIG. 1 or may be folded at one or more places along its length into a folded configuration. In some implementations, some parts of cable 2 may be arranged in a planar configuration and other parts of the cable may be folded. In some configurations, at least one of the conductor sets 4 of the cable 2 includes two insulated conductors 6 extending along a length, L, of cable 2. The two insulated conductors 6 of the conductor sets 4 may be arranged substantially parallel along all or a portion of the length, L, of the cable 2. Insulated conductors 6 may include insulated signal wires, insulated power wires, or insulated ground wires. Two shielding films 8 are disposed on opposite sides of the cable 2.

The first and second shielding films 8 are arranged so that, in transverse cross section, cable 2 includes cover regions 14 and pinched regions 18. In the cover regions 14 of the cable 2, cover portions 7 of the first and second shielding films 8 in transverse cross section substantially surround each conductor set 4. For example, cover portions of the shielding films may collectively encompass at least 75%, or at least 80, 85, or 90% of the perimeter of any given conductor set. Pinched portions 9 of the first and second shielding films form the pinched regions 18 of cable 2 on each side of each conductor set 4. In the pinched regions 18 of the cable 2, one or both of the shielding films 8 are deflected, bringing the pinched portions 9 of the shielding films 8 into closer proximity. In some configurations, as illustrated in FIG. 1, both of the shielding films 8 are deflected in the pinched regions 18 to bring the pinched portions 9 into closer proximity. In some configurations, one of the shielding films may remain relatively flat in the pinched regions 18 when the cable is in a planar or unfolded configuration, and the other shielding film on the opposite side of the cable may be deflected to bring the pinched portions of the shielding film into closer proximity.

The cable 2 may also include an adhesive layer 10 disposed between shielding films 8 at least between the pinched portions 9. The adhesive layer 10 bonds the pinched portions 9 of the shielding films 8 to each other in the pinched regions 18 of the cable 2. The adhesive layer 10 may or may not be present in the cover region 14 of the cable 2.

In some cases, conductor sets 4 have a substantially curvilinearly-shaped envelope or perimeter in transverse cross-section, and shielding films 8 are disposed around conductor sets 4 such as to substantially conform to and maintain the cross-sectional shape along at least part of, and preferably along substantially all of, the length L of the cable 6. Maintaining the cross-sectional shape maintains the electrical characteristics of conductor sets 4 as intended in the design of conductor sets 4. This is an advantage over some conventional shielded electrical cables where disposing a conductive shield around a conductor set changes the cross-sectional shape of the conductor set.

Although in the embodiment illustrated in FIG. 1, each conductor set 4 has exactly two insulated conductors 6, in other embodiments, some or all of the conductor sets may include only one insulated conductor, or may include more than two insulated conductors 6. For example, an alternative shielded electrical cable similar in design to that of FIG. 1 may include one conductor set that has eight insulated conductors 6, or eight conductor sets each having only one insulated conductor 6. This flexibility in arrangements of conductor sets and insulated conductors allows the disclosed shielded electrical cables to be configured in ways that are suitable for a wide variety of intended applications. For example, the conductor sets and insulated conductors may be configured to form: a multiple twinaxial cable, i.e., multiple conductor sets each having two insulated conductors; a multiple coaxial cable, i.e., multiple conductor sets each having only one insulated conductor; or combinations thereof. In some embodiments, a conductor set may further include a conductive shield (not shown) disposed around the one or more insulated conductors, and an insulative jacket (not shown) disposed around the conductive shield.

In the embodiment illustrated in FIG. 1, shielded electrical cable 2 further includes optional ground conductors 12. Ground conductors 12 may include ground wires or drain wires. Ground conductors 12 can be spaced apart from and extend in substantially the same direction as insulated conductors 6. Shielding films 8 can be disposed around ground conductors 12. The adhesive layer 10 may bond shielding films 8 to each other in the pinched portions 9 on both sides of ground conductors 12. Ground conductors 12 may electrically contact at least one of the shielding films 8.

Figure 2A:
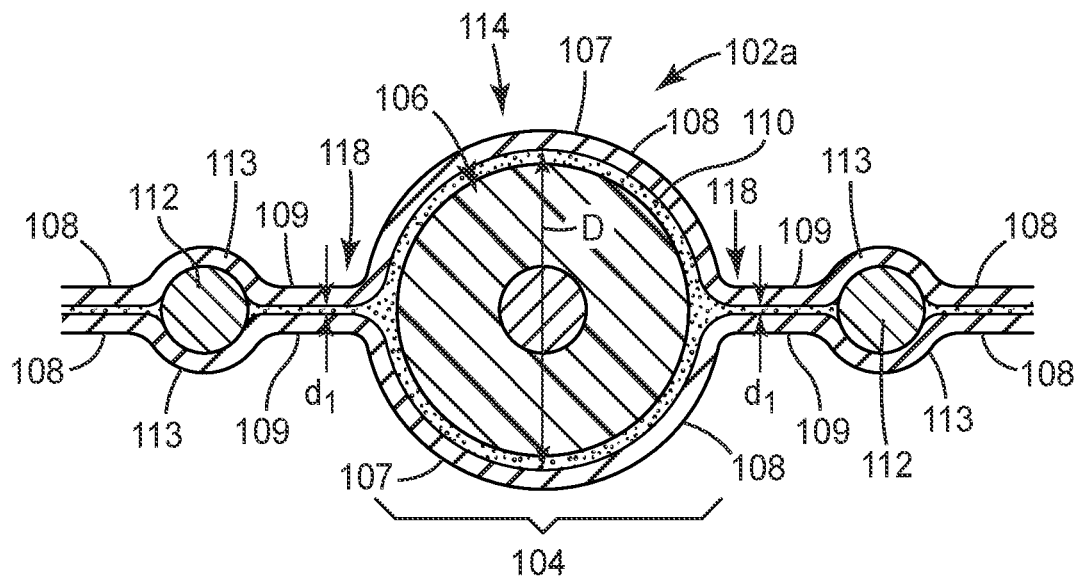
FIGS. 2a-2g are front cross-sectional views of further example shielded electrical cables.

The cross-sectional views of FIGS. 2a-2g may represent various shielded electrical cables, or portions of cables. In FIG. 2a, shielded electrical cable 102a includes a single conductor set 104. Conductor set 104 extends along the length of the cable and has only a single insulated conductor 106. If desired, the cable 102a may be made to include multiple conductor sets 104 spaced apart from each other across a width of the cable 102a and extending along a length of the cable. Two shielding films 108 are disposed on opposite sides of the cable. The cable 102a includes a cover region 114 and pinched regions 118. In the cover region 114 of the cable 102a, the shielding films 108 include cover portions 107 that cover the conductor set 104. In transverse cross section, the cover portions 107, in combination, substantially surround the conductor set 104. In the pinched regions 118 of the cable 102a, the shielding films 108 include pinched portions 109 on each side of the conductor set 104.

An optional adhesive layer 110 may be disposed between shielding films 108. Shielded electrical cable 102a further includes optional ground conductors 112. Ground conductors 112 are spaced apart from and extend in substantially the same direction as insulated conductor 106. Conductor set 104 and ground conductors 112 can be arranged so that they lie generally in a plane as illustrated in FIG. 2a.

Second cover portions 113 of shielding films 108 are disposed around, and cover, the ground conductors 112. The adhesive layer 110 may bond the shielding films 108 to each other on both sides of ground conductors 112. Ground conductors 112 may electrically contact at least one of shielding films 108. In FIG. 2a, insulated conductor 106 and shielding films 108 are effectively arranged in a coaxial cable configuration. The coaxial cable configuration of FIG. 2a can be used in a single ended circuit arrangement.

As illustrated in the transverse cross sectional view of FIG. 2a, there is a maximum separation, D, between the cover portions 107 of the shielding films 108, and there is a minimum separation, d1, between the pinched portions 109 of the shielding films 108.

In FIG. 2a, adhesive layer 110 is shown disposed between the pinched portions 109 of the shielding films 108 in the pinched regions 118 of the cable 102 and disposed between the cover portions 107 of the shielding films 108 and the insulated conductor 106 in the cover region 114 of the cable 102a. In this arrangement, the adhesive layer 110 bonds the pinched portions 109 of the shielding films 108 together in the pinched regions 118 of the cable, and bonds the cover portions 107 of the shielding films 108 to the insulated conductor 106 in the cover region 114 of the cable 102a.

Figure 2B:
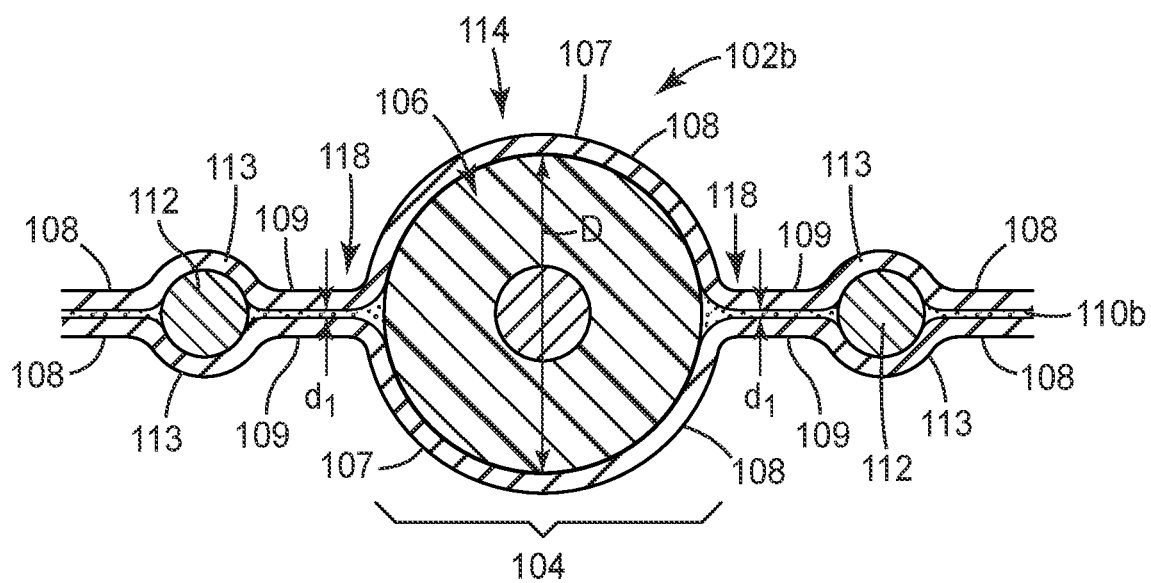

Shielded cable 102b of FIG. 2b is similar to cable 102a of FIG. 2a, with similar elements identified by similar reference numerals, except that in FIG. 2b, the optional adhesive layer 110b is not present between the cover portions 107 of the shielding films 108 and the insulated conductor 106 in the cover region 114 of the cable 102. In this arrangement, the adhesive layer 110b bonds the pinched portions 109 of the shielding films 108 together in the pinched regions 118 of the cable, but the adhesive layer 110 does not bond cover portions 107 of the shielding films 108 to the insulated conductor 106 in the cover regions 114 of the cable 102.

Figure 2C:
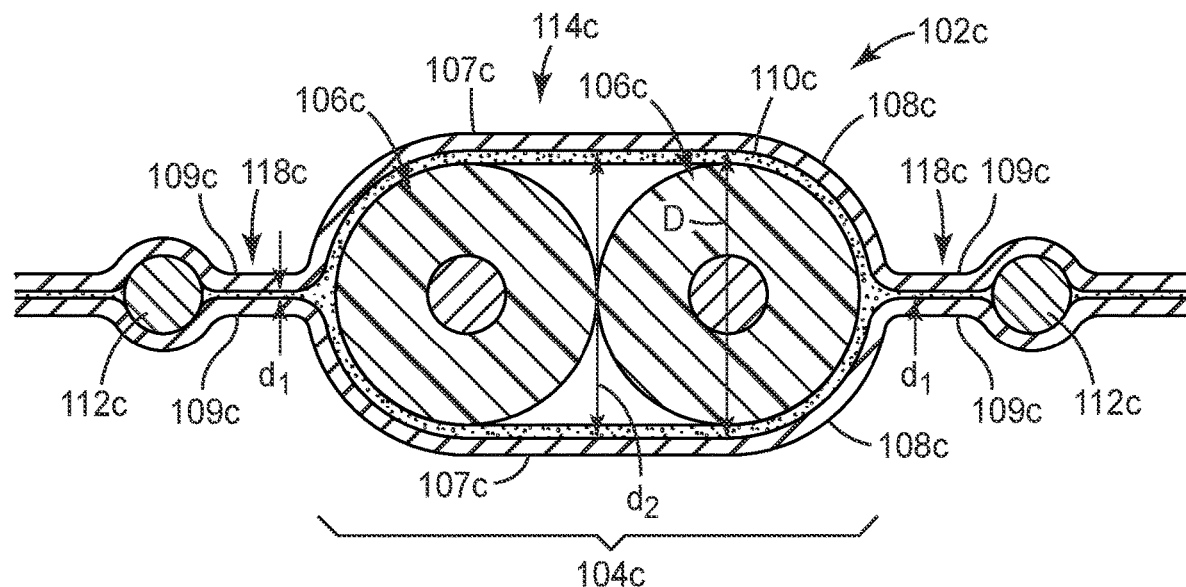

Referring to FIG. 2c, shielded electrical cable 102c is similar to shielded electrical cable 102a of FIG. 2a, except that cable 102c has a single conductor set 104c which has two insulated conductors 106c. If desired, the cable 102c may be made to include multiple conductor sets 104c spaced part across a width of the cable 102c and extending along a length of the cable. Insulated conductors 106c are arranged generally in a single plane and effectively in a twinaxial configuration. The twin axial cable configuration of FIG. 2c can be used in a differential pair circuit arrangement or in a single ended circuit arrangement.

Two shielding films 108c are disposed on opposite sides of conductor set 104c. The cable 102c includes a cover region 114c and pinched regions 118c. In the cover region 114c of the cable 102c, the shielding films 108c include cover portions 107c that cover the conductor set 104c. In transverse cross section, the cover portions 107c, in combination, substantially surround the conductor set 104c. In the pinched regions 118c of the cable 102c, the shielding films 108c include pinched portions 109c on each side of the conductor set 104c.

An optional adhesive layer 110c may be disposed between shielding films 108c. Shielded electrical cable 102c further includes optional ground conductors 112c similar to ground conductors 112 discussed previously. Ground conductors 112c are spaced apart from, and extend in substantially the same direction as, insulated conductors 106c. Conductor set 104c and ground conductors 112c can be arranged so that they lie generally in a plane as illustrated in FIG. 2c.

As illustrated in the cross section of FIG. 2c, there is a maximum separation, D, between the cover portions 107c of the shielding films 108c; there is a minimum separation, d1, between the pinched portions 109c of the shielding films 108c; and there is a minimum separation, d2, between the shielding films 108c between the insulated conductors 106c.

FIG. 2c shows the adhesive layer 110c disposed between the pinched portions 109c of the shielding films 108c in the pinched regions 118c of the cable 102c and disposed between the cover portions 107c of the shielding films 108c and the insulated conductors 106c in the cover region 114c of the cable 102c. In this arrangement, the adhesive layer 110c bonds the pinched portions 109c of the shielding films 108c together in the pinched regions 118c of the cable 102c, and also bonds the cover portions 107c of the shielding films 108c to the insulated conductors 106c in the cover region 114c of the cable 102c.

Figure 2D:
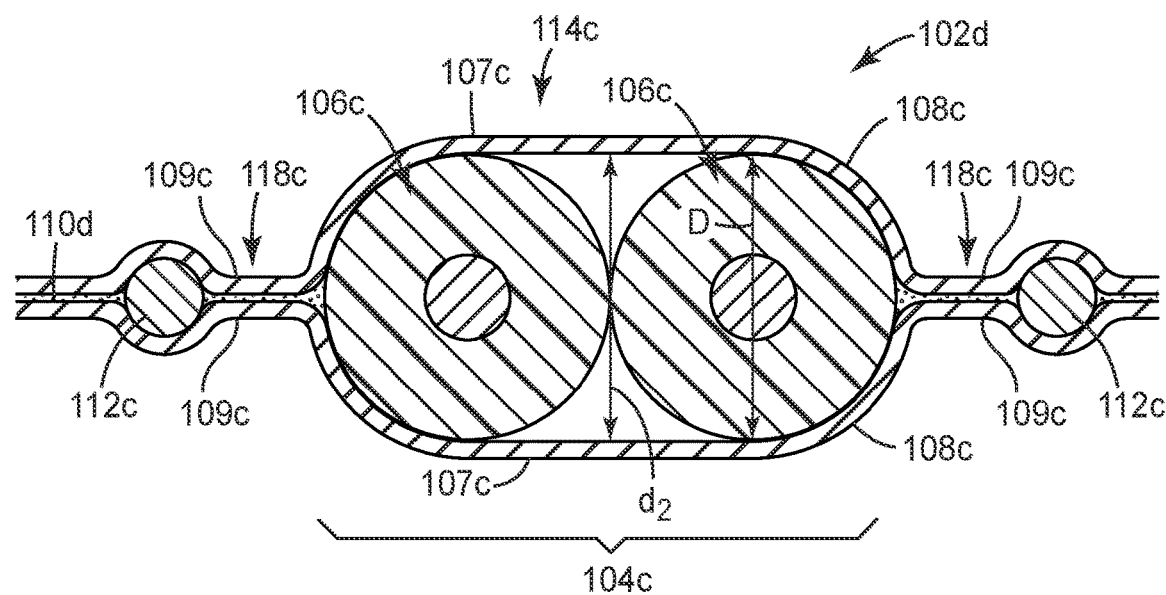

Shielded cable 102d of FIG. 2d is similar to cable 102c of FIG. 2c, with similar elements identified by similar reference numerals, except that in cable 102d the optional adhesive layer 110d is not present between the cover portions 107c of the shielding films 108c and the insulated conductors 106c in the cover region 114c of the cable. In this arrangement, the adhesive layer 110d bonds the pinched portions 109c of the shielding films 108c together in the pinched regions 118c of the cable, but does not bond the cover portions 107c of the shielding films 108c to the insulated conductors 106c in the cover region 114c of the cable 102d.

Figure 2E:
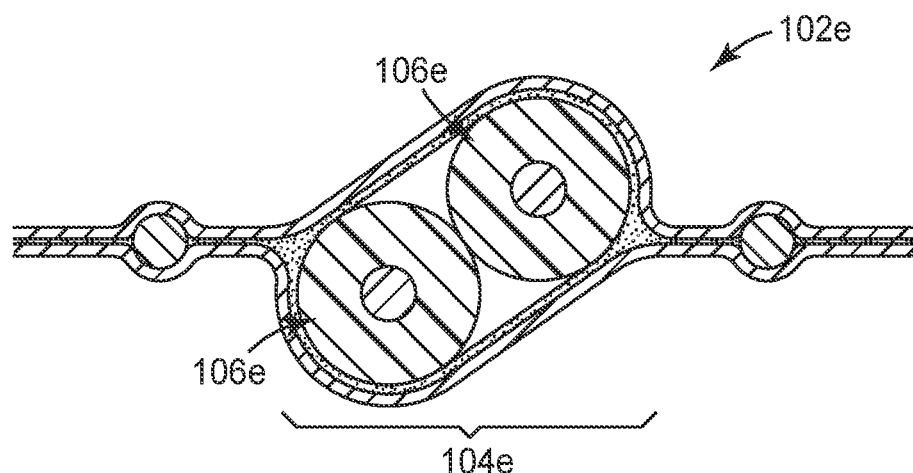

Referring now to FIG. 2e, we see there a transverse cross-sectional view of a shielded electrical cable 102e similar in many respects to the shielded electrical cable 102a of FIG. 2a. However, where cable 102a includes a single conductor set 104 having only a single insulated conductor 106, cable 102e includes a single conductor set 104e that has two insulated conductors 106e extending along a length of the cable 102e. Cable 102e may be made to have multiple conductor sets 104e spaced apart from each other across a width of the cable 102e and extending along a length of the cable 102e. Insulated conductors 106e are arranged effectively in a twisted pair cable arrangement, whereby insulated conductors 106e twist around each other and extend along a length of the cable 102e.

Figure 2F:
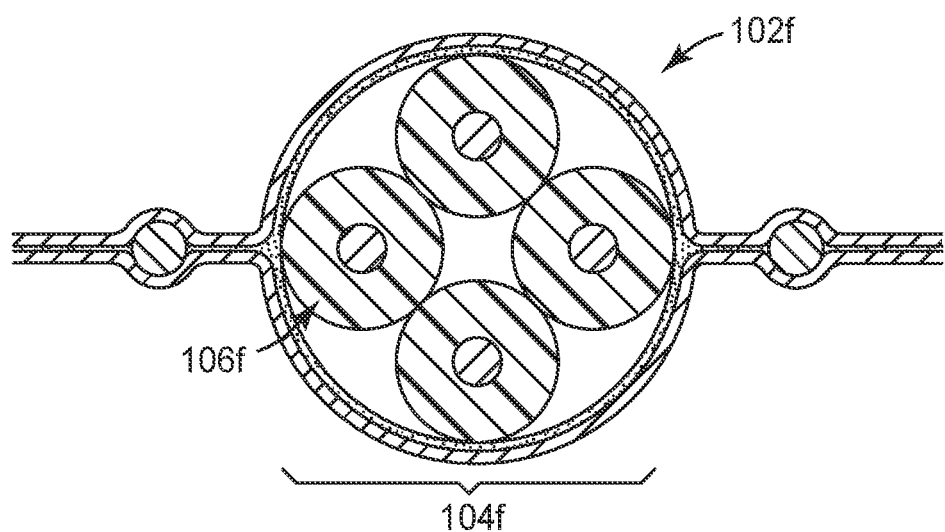

In FIG. 2f another shielded electrical cable 102f is shown that is also similar in many respects to the shielded electrical cable 102a of FIG. 2a. However, where cable 102a includes a single conductor set 104 having only a single insulated conductor 106, cable 102f includes a single conductor set 104f that has four insulated conductors 106f extending along a length of the cable 102f. The cable 102f may be made to have multiple conductor sets 104f spaced apart from each other across a width of the cable 102f and extending along a length of the cable 102f.

Insulated conductors 106f are arranged effectively in a quad cable arrangement, whereby insulated conductors 106f may or may not twist around each other as insulated conductors 106f extend along a length of the cable 102f.

Figure 2G:
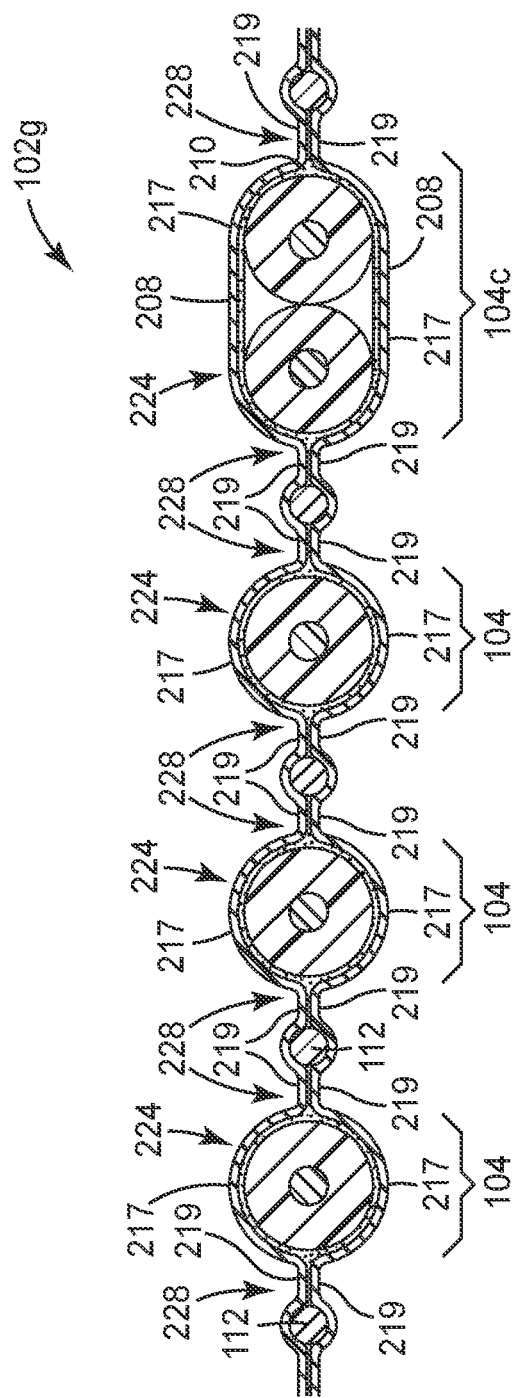

Referring back to FIGS. 2a-2f, further embodiments of shielded electrical cables may include a plurality of spaced apart conductor sets 104, 104c, 104e, or 104f, or combinations thereof, arranged generally in a single plane. Optionally, the shielded electrical cables may include a plurality of ground conductors 112 spaced apart from, and extending generally in the same direction as, the insulated conductors of the conductor sets. In some configurations, the conductor sets and ground conductors can be arranged generally in a single plane. FIG. 2g illustrates an exemplary embodiment of such a shielded electrical cable.

Referring to FIG. 2g, shielded electrical cable 102g includes a plurality of spaced apart conductor sets 104, 104c arranged generally in plane. Shielded electrical cable 102g further includes optional ground conductors 112 disposed between conductor sets 104, 104c and at both sides or edges of shielded electrical cable 102g.

First and second shielding films 208 are disposed on opposite sides of the cable 102g and are arranged so that, in transverse cross section, the cable 102g includes cover regions 224 and pinched regions 228. In the cover regions 224 of the cable, cover portions 217 of the first and second shielding films 208 in transverse cross section substantially surround each conductor set 104, 104c. Pinched portions 219 of the first and second shielding films 208 form the pinched regions 218 on two sides of each conductor set 104, 104c.

The shielding films 208 are disposed around ground conductors 112. An optional adhesive layer 210 is disposed between shielding films 208 and bonds the pinched portions 219 of the shielding films 208 to each other in the pinched regions 228 on both sides of each conductor set 104, 104c. Shielded electrical cable 102g includes a combination of coaxial cable arrangements (conductor sets 104) and a twinaxial cable arrangement (conductor set 104c) and may therefore be referred to as a hybrid cable arrangement.

One, two, or more of the shielded electrical cables may be terminated to a termination component such as a printed circuit board, paddle card, or the like. Because the insulated conductors and ground conductors can be arranged generally in a single plane, the disclosed shielded electrical cables are well suited for mass-stripping, i.e., the simultaneous stripping of the shielding films and insulation from the insulated conductors, and mass-termination, i.e., the simultaneous terminating of the stripped ends of the insulated conductors and ground conductors, which allows a more automated cable assembly process. This is an advantage of at least some of the disclosed shielded electrical cables. The stripped ends of insulated conductors and ground conductors may, for example, be terminated to contact conductive paths or other elements on a printed circuit board, for example. In other cases, the stripped ends of insulated conductors and ground conductors may be terminated to any suitable individual contact elements of any suitable termination device, such as, e.g., electrical contacts of an electrical connector.

In FIGS. 3a-3d an exemplary termination process of shielded electrical cable 302 to a printed circuit board or other termination component 314 is illustrated. This termination process can be a mass-termination process and includes the steps of stripping (illustrated in FIGS. 3a-3b), aligning (illustrated in FIG. 3c), and terminating (illustrated in FIG. 3d). When forming shielded electrical cable 302, which may in general take the form of any of the cables shown and/or described herein, the arrangement of conductor sets 304, insulated conductors 306, and ground conductors 312 of shielded electrical cable 302 may be matched to the arrangement of contact elements 316 on printed circuit board 314, which would eliminate any significant manipulation of the end portions of shielded electrical cable 302 during alignment or termination.

Figure 3A:
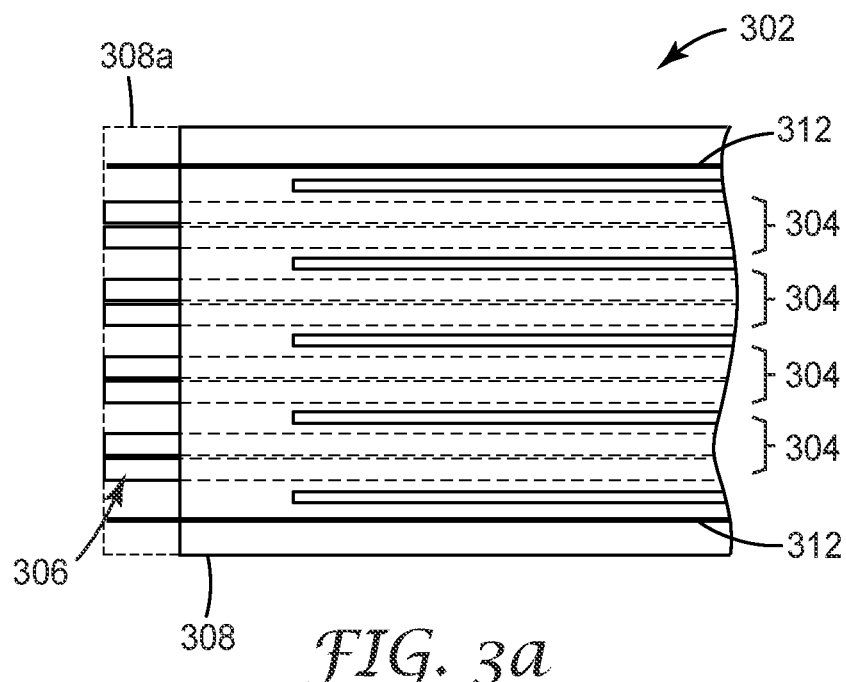
FIGS. 3a-3d are top views that illustrate different procedures of an example termination process of a shielded electrical cable to a termination component.
Figure 3B:
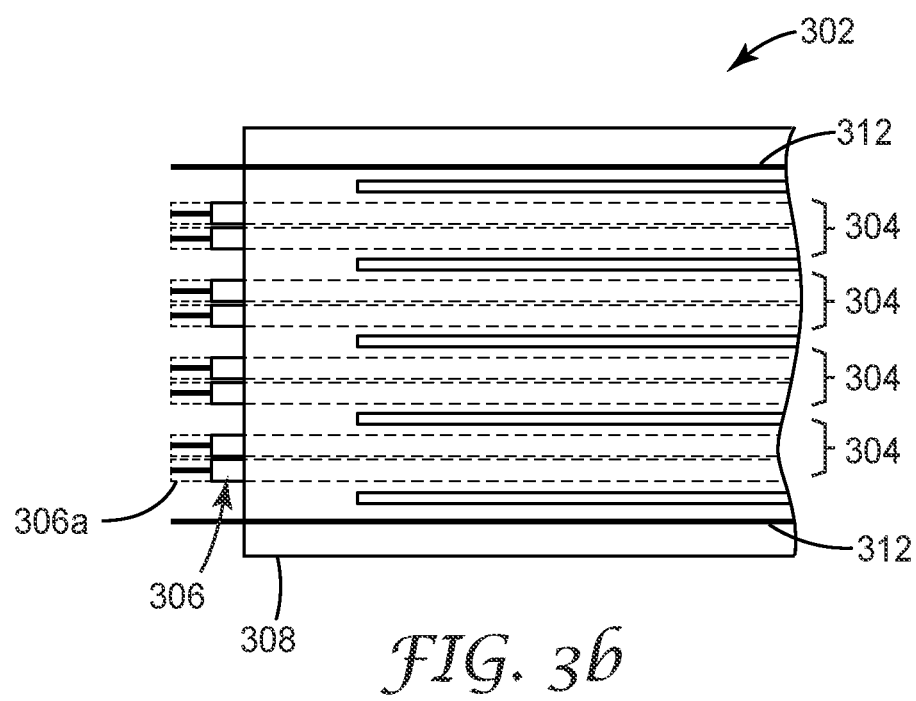
Figure 3C:
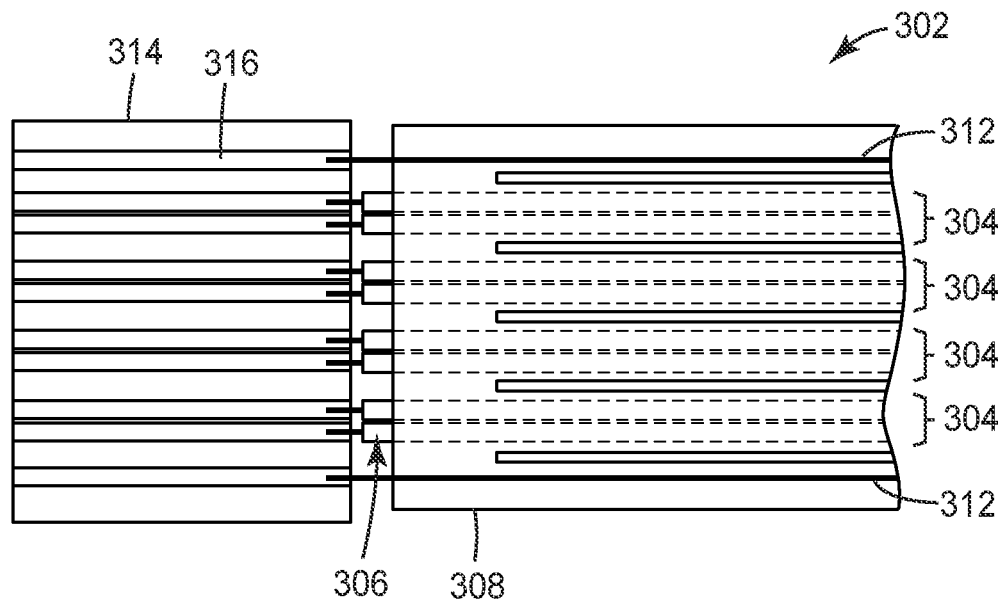
Figure 3D:
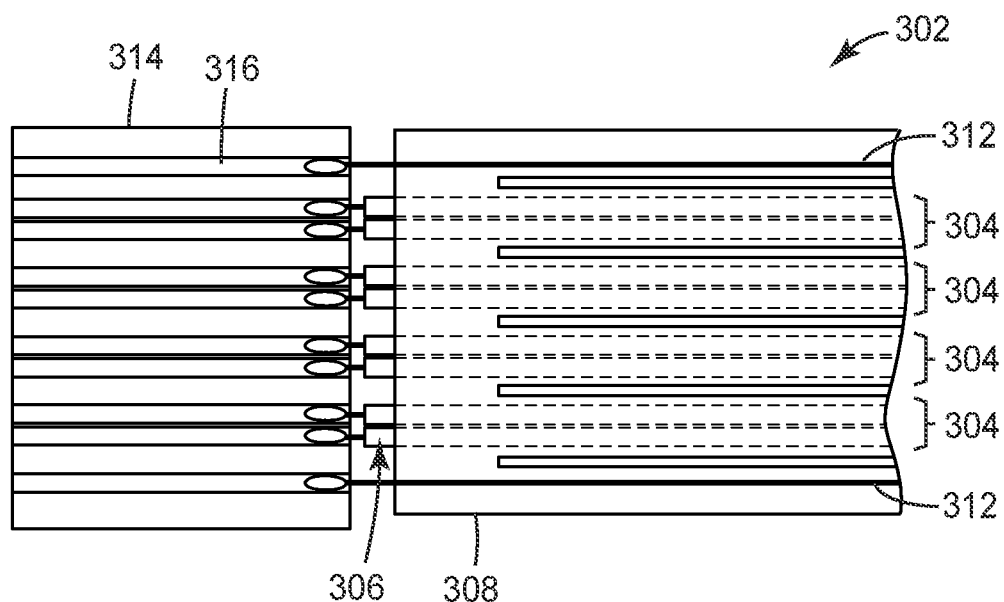

In the step illustrated in FIG. 3a, an end portion 308a of shielding films 308 is removed. Any suitable method may be used, such as, e.g., mechanical stripping or laser stripping. This step exposes an end portion of insulated conductors 306 and ground conductors 312. In one aspect, mass-stripping of end portion 308a of shielding films 308 is possible because they form an integrally connected layer that is separate from the insulation of insulated conductors 306. Removing shielding films 308 from insulated conductors 306 allows protection against electrical shorting at these locations and also provides independent movement of the exposed end portions of insulated conductors 306 and ground conductors 312. In the step illustrated in FIG. 3b, an end portion 306a of the insulation of insulated conductors 306 is removed. Any suitable method may be used, such as, e.g., mechanical stripping or laser stripping. This step exposes an end portion of the conductor of insulated conductors 306. In the step illustrated in FIG. 3c, shielded electrical cable 302 is aligned with printed circuit board 314 such that the end portions of the conductors of insulated conductors 306 and the end portions of ground conductors 312 of shielded electrical cable 302 are aligned with contact elements 316 on printed circuit board 314. In the step illustrated in FIG. 3d, the end portions of the conductors of insulated conductors 306 and the end portions of ground conductors 312 of shielded electrical cable 302 are terminated to contact elements 316 on printed circuit board 314. Examples of suitable termination methods that may be used include soldering, welding, crimping, mechanical clamping, and adhesively bonding, to name a few.

In some cases, the disclosed shielded cables can be made to include one or more longitudinal slits or other splits disposed between conductor sets. The splits may be used to separate individual conductor sets at least along a portion of the length of shielded cable, thereby increasing at least the lateral flexibility of the cable. This may allow, for example, the shielded cable to be placed more easily into a curvilinear outer jacket. In other embodiments, splits may be placed so as to separate individual or multiple conductor sets and ground conductors. To maintain the spacing of conductor sets and ground conductors, splits may be discontinuous along the length of shielded electrical cable. To maintain the spacing of conductor sets and ground conductors in at least one end portion of a shielded electrical cable so as to maintain mass-termination capability, the splits may not extend into one or both end portions of the cable. The splits may be formed in the shielded electrical cable using any suitable method, such as, e.g., laser cutting or punching. Instead of or in combination with longitudinal splits, other suitable shapes of openings may be formed in the disclosed shielded electrical cables, such as, e.g., holes, e.g., to increase at least the lateral flexibility of the cable.

The shielding films used in the disclosed shielded cables can have a variety of configurations and be made in a variety of ways. In some cases, one or more shielding films may include a conductive layer and a non-conductive polymeric layer. The conductive layer may include any suitable conductive material, including but not limited to copper, silver, aluminum, gold, and alloys thereof. The non-conductive polymeric layer may include any suitable polymeric material, including but not limited to polyester, polyimide, polyamide-imide, polytetrafluoroethylene, polypropylene, polyethylene, polyphenylene sulfide, polyethylene naphthalate, polycarbonate, silicone rubber, ethylene propylene diene rubber, polyurethane, acrylates, silicones, natural rubber, epoxies, and synthetic rubber adhesive. The non-conductive polymeric layer may include one or more additives and/or fillers to provide properties suitable for the intended application. In some cases, at least one of the shielding films may include a laminating adhesive layer disposed between the conductive layer and the non-conductive polymeric layer. For shielding films that have a conductive layer disposed on a non-conductive layer, or that otherwise have one major exterior surface that is electrically conductive and an opposite major exterior surface that is substantially non-conductive, the shielding film may be incorporated into the shielded cable in several different orientations as desired. In some cases, for example, the conductive surface may face the conductor sets of insulated wires and ground wires, and in some cases the non-conductive surface may face those components. In cases where two shielding films are used on opposite sides of the cable, the films may be oriented such that their conductive surfaces face each other and each face the conductor sets and ground wires, or they may be oriented such that their non-conductive surfaces face each other and each face the conductor sets and ground wires, or they may be oriented such that the conductive surface of one shielding film faces the conductor sets and ground wires, while the non-conductive surface of the other shielding film faces conductor sets and ground wires from the other side of the cable.

In some cases, at least one of the shielding films may be or include a stand-alone conductive film, such as a compliant or flexible metal foil. The construction of the shielding films may be selected based on a number of design parameters suitable for the intended application, such as, e.g., flexibility, electrical performance, and configuration of the shielded electrical cable (such as, e.g., presence and location of ground conductors). In some cases, the shielding films may have an integrally formed construction. In some cases, the shielding films may have a thickness in the range of 0.01 mm to 0.05 mm. The shielding films desirably provide isolation, shielding, and precise spacing between the conductor sets, and allow for a more automated and lower cost cable manufacturing process. In addition, the shielding films prevent a phenomenon known as "signal suck-out" or resonance, whereby high signal attenuation occurs at a particular frequency range. This phenomenon typically occurs in conventional shielded electrical cables where a conductive shield is wrapped around a conductor set.

As discussed elsewhere herein, adhesive material may be used in the cable construction to bond one or two shielding films to one, some, or all of the conductor sets at cover regions of the cable, and/or adhesive material may be used to bond two shielding films together at pinched regions of the cable. A layer of adhesive material may be disposed on at least one shielding film, and in cases where two shielding films are used on opposite sides of the cable, a layer of adhesive material may be disposed on both shielding films. In the latter cases, the adhesive used on one shielding film is preferably the same as, but may if desired be different from, the adhesive used on the other shielding film. A given adhesive layer may include an electrically insulative adhesive, and may provide an insulative bond between two shielding films. Furthermore, a given adhesive layer may provide an insulative bond between at least one of shielding films and insulated conductors of one, some, or all of the conductor sets, and between at least one of shielding films and one, some, or all of the ground conductors (if any). Alternatively, a given adhesive layer may include an electrically conductive adhesive, and may provide a conductive bond between two shielding films. Furthermore, a given adhesive layer may provide a conductive bond between at least one of shielding films and one, some, or all of the ground conductors (if any). Suitable conductive adhesives include conductive particles to provide the flow of electrical current. The conductive particles can be any of the types of particles currently used, such as spheres, flakes, rods, cubes, amorphous, or other particle shapes. They may be solid or substantially solid particles such as carbon black, carbon fibers, nickel spheres, nickel coated copper spheres, metal-coated oxides, metal-coated polymer fibers, or other similar conductive particles. These conductive particles can be made from electrically insulating materials that are plated or coated with a conductive material such as silver, aluminum, nickel, or indium tin-oxide. The metal-coated insulating material can be substantially hollow particles such as hollow glass spheres, or may comprise solid materials such as glass beads or metal oxides. The conductive particles may be on the order of several tens of microns to nanometer sized materials such as carbon nanotubes. Suitable conductive adhesives may also include a conductive polymeric matrix.

When used in a given cable construction, an adhesive layer is preferably substantially conformable in shape relative to other elements of the cable, and conformable with regard to bending motions of the cable. In some cases, a given adhesive layer may be substantially continuous, e.g., extending along substantially the entire length and width of a given major surface of a given shielding film. In some cases, the adhesive layer may include be substantially discontinuous. For example, the adhesive layer may be present only in some portions along the length or width of a given shielding film. A discontinuous adhesive layer may for example include a plurality of longitudinal adhesive stripes that are disposed, e.g., between the pinched portions of the shielding films on both sides of each conductor set and between the shielding films beside the ground conductors (if any). A given adhesive material may be or include at least one of a pressure sensitive adhesive, a hot melt adhesive, a thermoset adhesive, and a curable adhesive. An adhesive layer may be configured to provide a bond between shielding films that is substantially stronger than a bond between one or more insulated conductor and the shielding films. This may be achieved, e.g., by appropriate selection of the adhesive formulation. An advantage of this adhesive configuration is to allow the shielding films to be readily strippable from the insulation of insulated conductors. In other cases, an adhesive layer may be configured to provide a bond between shielding films and a bond between one or more insulated conductor and the shielding films that are substantially equally strong. An advantage of this adhesive configuration is that the insulated conductors are anchored between the shielding films. When a shielded electrical cable having this construction is bent, this allows for little relative movement and therefore reduces the likelihood of buckling of the shielding films. Suitable bond strengths may be chosen based on the intended application. In some cases, a conformable adhesive layer may be used that has a thickness of less than about 0.13 mm. In exemplary embodiments, the adhesive layer has a thickness of less than about 0.05 mm.

A given adhesive layer may conform to achieve desired mechanical and electrical performance characteristics of the shielded electrical cable. For example, the adhesive layer may conform to be thinner between the shielding films in areas between conductor sets, which increases at least the lateral flexibility of the shielded cable. This may allow the shielded cable to be placed more easily into a curvilinear outer jacket. In some cases, an adhesive layer may conform to be thicker in areas immediately adjacent the conductor sets and substantially conform to the conductor sets. This may increase the mechanical strength and enable forming a curvilinear shape of shielding films in these areas, which may increase the durability of the shielded cable, for example, during flexing of the cable. In addition, this may help to maintain the position and spacing of the insulated conductors relative to the shielding films along the length of the shielded cable, which may result in more uniform impedance and superior signal integrity of the shielded cable.

A given adhesive layer may conform to effectively be partially or completely removed between the shielding films in areas between conductor sets, e.g., in pinched regions of the cable. As a result, the shielding films may electrically contact each other in these areas, which may increase the electrical performance of the cable. In some cases, an adhesive layer may conform to effectively be partially or completely removed between at least one of the shielding films and the ground conductors. As a result, the ground conductors may electrically contact at least one of shielding films in these areas, which may increase the electrical performance of the cable. Even in cases where a thin layer of adhesive remains between at least one of shielding films and a given ground conductor, asperities on the ground conductor may break through the thin adhesive layer to establish electrical contact as intended.

Figure 4A:
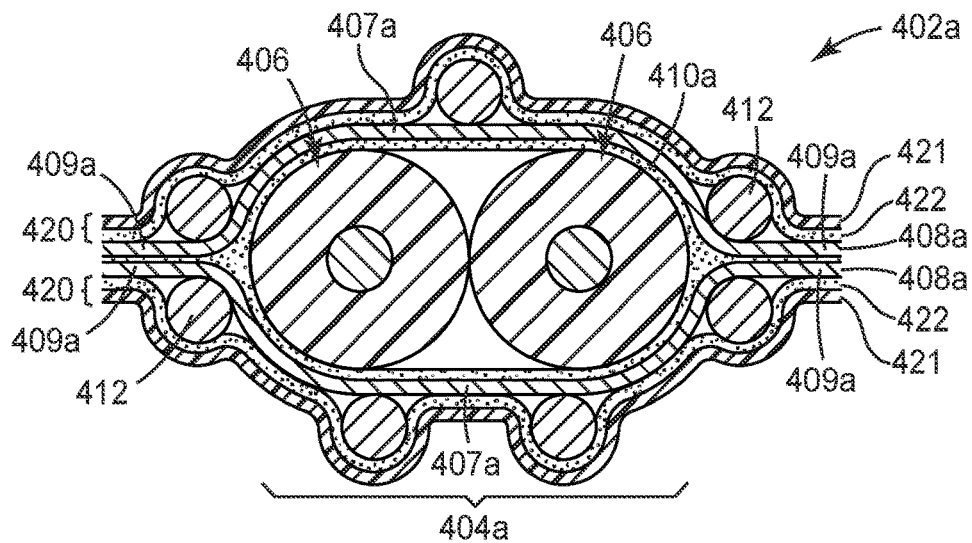
FIGS. 4a-4c are front cross-sectional views of still further example shielded electrical cables.
Figure 4B:
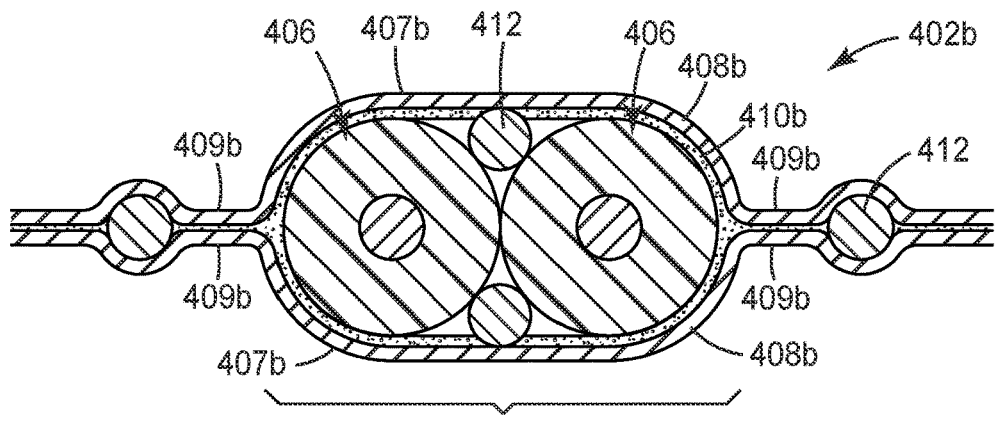
Figure 4C:
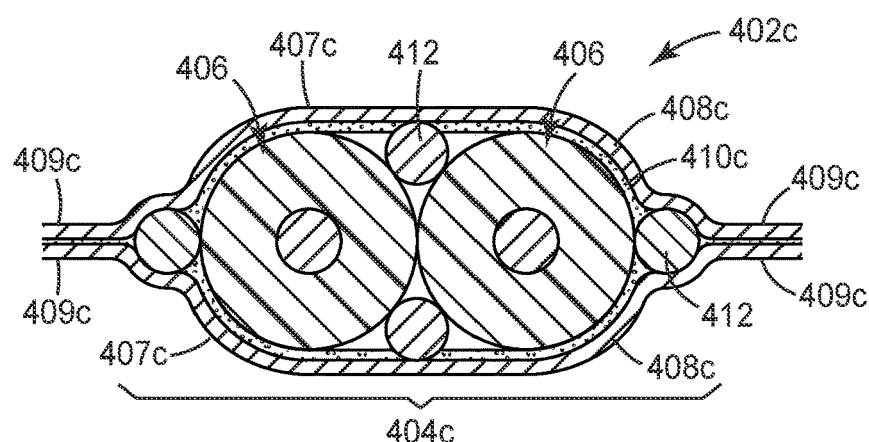

In FIGS. 4a-4c, cross sectional views are shown of three exemplary shielded electrical cables, which illustrate examples of the placement of ground conductors in the shielded electrical cables. An aspect of a shielded electrical cable is proper grounding of the shield, and such grounding can be accomplished in a number of ways. In some cases, a given ground conductor can electrically contact at least one of the shielding films such that grounding the given ground conductor also grounds the shielding film or films. Such a ground conductor may also be referred to as a "drain wire". Electrical contact between the shielding film and the ground conductor may be characterized by a relatively low DC resistance, e.g., a DC resistance of less than 10 ohms, or less than 2 ohms, or of substantially 0 ohms. In some cases, a given ground conductor may not electrically contact the shielding films, but may be an individual element in the cable construction that is independently terminated to any suitable individual contact element of any suitable termination component, such as, e.g., a conductive path or other contact element on a printed circuit board, paddle board, or other device. Such a ground conductor may also be referred to as a "ground wire". FIG. 4a illustrates an exemplary shielded electrical cable in which ground conductors are positioned external to the shielding films. FIGS. 4b and 4c illustrate embodiments in which the ground conductors are positioned between the shielding films, and may be included in the conductor set. One or more ground conductors may be placed in any suitable position external to the shielding films, between the shielding films, or a combination of both.

Referring to FIG. 4a, a shielded electrical cable 402a includes a single conductor set 404a that extends along a length of the cable 402a. Conductor set 404a has two insulated conductors 406, i.e., one pair of insulated conductors. Cable 402a may be made to have multiple conductor sets 404a spaced apart from each other across a width of the cable and extending along a length of the cable. Two shielding films 408a disposed on opposite sides of the cable include cover portions 407a. In transverse cross section, the cover portions 407a, in combination, substantially surround conductor set 404a. An optional adhesive layer 410a is disposed between pinched portions 409a of the shielding films 408a, and bonds shielding films 408a to each other on both sides of conductor set 404a. Insulated conductors 406 are arranged generally in a single plane and effectively in a twinaxial cable configuration that can be used in a single ended circuit arrangement or a differential pair circuit arrangement. The shielded electrical cable 402a further includes a plurality of ground conductors 412 positioned external to shielding films 408a. Ground conductors 412 are placed over, under, and on both sides of conductor set 404a. Optionally, the cable 402a includes protective films 420 surrounding the shielding films 408a and ground conductors 412. Protective films 420 include a protective layer 421 and an adhesive layer 422 bonding protective layer 421 to shielding films 408a and ground conductors 412. Alternatively, shielding films 408a and ground conductors 412 may be surrounded by an outer conductive shield, such as, e.g., a conductive braid, and an outer insulative jacket (not shown).

Referring to FIG. 4b, a shielded electrical cable 402b includes a single conductor set 404b that extends along a length of cable 402b. Conductor set 404b has two insulated conductors 406, i.e., one pair of insulated conductors. Cable 402b may be made to have multiple conductor sets 404b spaced apart from each other across a width of the cable and extending along the length of the cable. Two shielding films 408b are disposed on opposite sides of the cable 402b and include cover portions 407b. In transverse cross section, the cover portions 407b, in combination, substantially surround conductor set 404b. An optional adhesive layer 410b is disposed between pinched portions 409b of the shielding films 408b and bonds the shielding films to each other on both sides of the conductor set. Insulated conductors 406 are arranged generally in a single plane and effectively in a twinaxial or differential pair cable arrangement. Shielded electrical cable 402b further includes a plurality of ground conductors 412 positioned between shielding films 408b. Two of the ground conductors 412 are included in conductor set 404b, and two of the ground conductors 412 are spaced apart from conductor set 404b.

Referring to FIG. 4c, a shielded electrical cable 402c includes a single conductor set 404c that extends along a length of cable 402c. Conductor set 404c has two insulated conductors 406, i.e., one pair of insulated conductors. Cable 402c may be made to have multiple conductor sets 404c spaced apart from each other across a width of the cable and extending along the length of the cable. Two shielding films 408c are disposed on opposite sides of the cable 402c and include cover portions 407c. In transverse cross section, the cover portions 407c, in combination, substantially surround the conductor set 404c. An optional adhesive layer 410c is disposed between pinched portions 409c of the shielding films 408c and bonds shielding films 408c to each other on both sides of conductor set 404c. Insulated conductors 406 are arranged generally in a single plane and effectively in a twinaxial or differential pair cable arrangement. Shielded electrical cable 402c further includes a plurality of ground conductors 412 positioned between shielding films 408c. All of the ground conductors 412 are included in the conductor set 404c. Two of the ground conductors 412 and insulated conductors 406 are arranged generally in a single plane.

The disclosed shielded cables can, if desired, be connected to a circuit board or other termination component using one or more electrically conductive cable clips. For example, a shielded electrical cable may include a plurality of spaced apart conductor sets arranged generally in a single plane, and each conductor set may include two insulated conductors that extend along a length of the cable. Two shielding films may be disposed on opposite sides of the cable and, in transverse cross section, substantially surround each of the conductor sets. A cable clip may be clamped or otherwise attached to an end portion of the shielded electrical cable such that at least one of shielding films electrically contacts the cable clip. The cable clip may be configured for termination to a ground reference, such as, e.g., a conductive trace or other contact element on a printed circuit board, to establish a ground connection between shielded electrical cable and the ground reference. The cable clip may be terminated to the ground reference using any suitable method, including soldering, welding, crimping, mechanical clamping, and adhesively bonding, to name a few. When terminated, the cable clip may facilitate termination of end portions of the conductors of the insulated conductors of the shielded electrical cable to contact elements of a termination point, such as, e.g., contact elements on printed circuit board. The shielded electrical cable may include one or more ground conductors as described herein that may electrically contact the cable clip in addition to or instead of at least one of the shielding films.

Figure 5A:
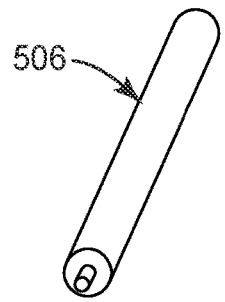
FIGS. 5a-5c are perspective views illustrating an example method of making a shielded electrical cable.
Figure 5B:
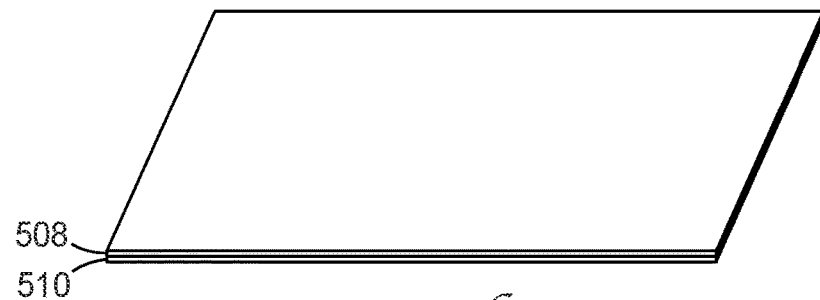
Figure 5C:
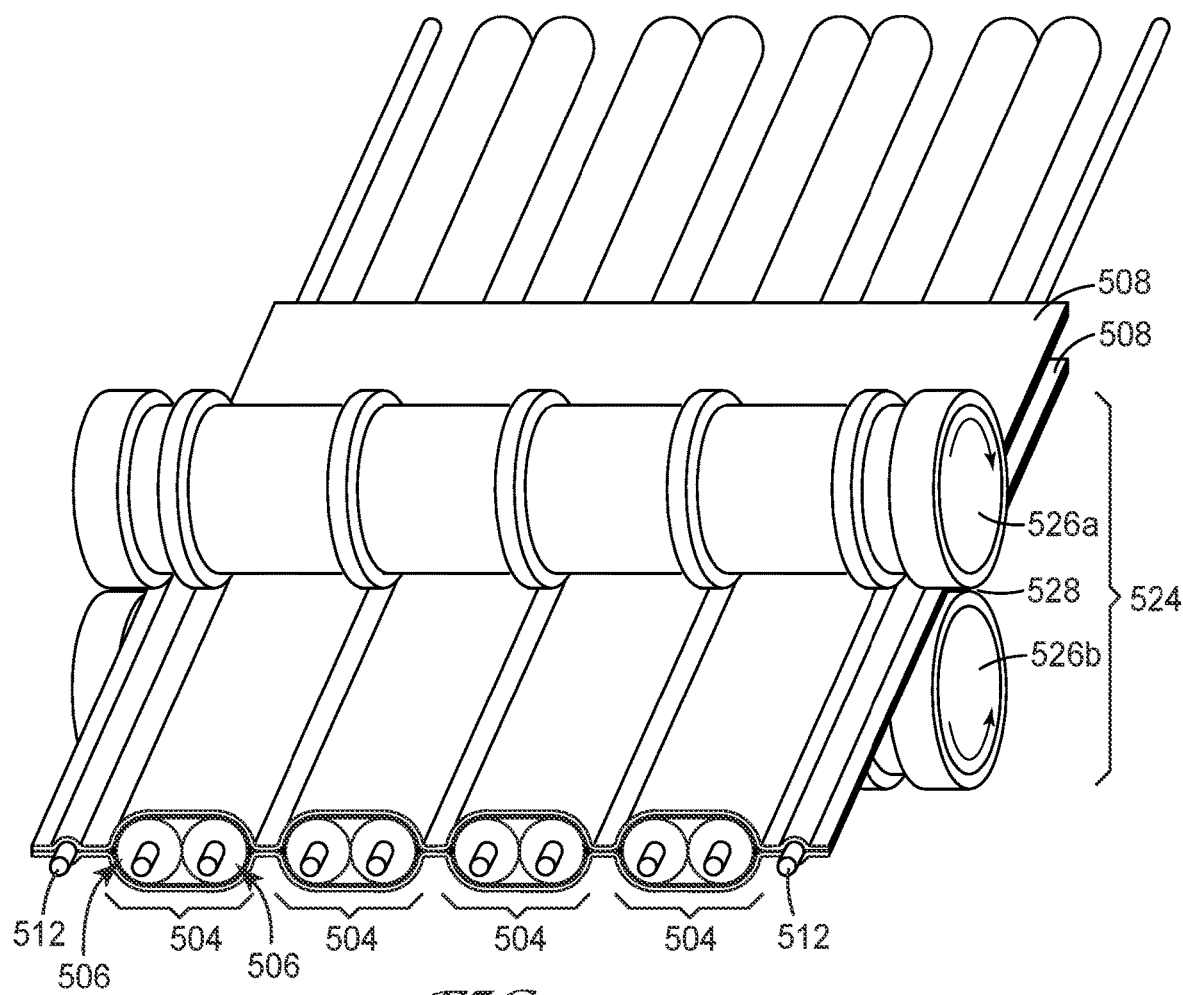

In FIGS. 5a-5c an exemplary method of making a shielded electrical cable is illustrated. Specifically, these figures illustrate an exemplary method of making a shielded electrical cable that may be substantially the same as that shown in FIG. 1. In the step illustrated in FIG. 5a, insulated conductors 506 are formed using any suitable method, such as, e.g., extrusion, or are otherwise provided. Insulated conductors 506 may be formed of any suitable length. Insulated conductors 506 may then be provided as such or cut to a desired length. Ground conductors 512 (see FIG. 5c) may be formed and provided in a similar fashion.

In the step illustrated in FIG. 5b, shielding films 508 are formed. A single layer or multilayer web may be formed using any suitable method, such as, e.g., continuous wide web processing. Shielding films 508 may be formed of any suitable length. Shielding films 508 may then be provided as such or cut to a desired length and/or width. Shielding films 508 may be pre-formed to have transverse partial folds to increase flexibility in the longitudinal direction. One or both of the shielding films may include a conformable adhesive layer 510, which may be formed on the shielding films 508 using any suitable method, such as, e.g., laminating or sputtering.

In the step illustrated in FIG. 5c, a plurality of insulated conductors 506, ground conductors 512, and shielding films 508 are provided. A forming tool 524 is provided. Forming tool 524 includes a pair of forming rolls 526a, 526b having a shape corresponding to a desired cross-sectional shape of the finished shielded electrical cable, the forming tool also including a bite 528. Insulated conductors 506, ground conductors 512, and shielding films 508 are arranged according to the configuration of the desired shielded cable, such as any of the cables shown and/or described herein, and positioned in proximity to forming rolls 526a, 526b, after which they are concurrently fed into bite 528 of forming rolls 526a, 526b and disposed between forming rolls 526a, 526b. The forming tool 524 forms shielding films 508 around conductor sets 504 and ground conductor 512 and bonds shielding films 508 to each other on both sides of each conductor set 504 and ground conductors 512. Heat may be applied to facilitate bonding. Although in this embodiment, forming shielding films 508 around conductor sets 504 and ground conductor 512 and bonding shielding films 508 to each other on both sides of each conductor set 504 and ground conductors 512 occur in a single operation, in other embodiments, these steps may occur in separate operations.

In subsequent fabrication operations, longitudinal splits may if desired be formed between the conductor sets. Such splits may be formed in the shielded cable using any suitable method, such as, e.g., laser cutting or punching. In another optional fabrication operation, the shielded electrical cable may be folded lengthwise along the pinched regions multiple times into a bundle, and an outer conductive shield may be provided around the folded bundle using any suitable method. An outer jacket may also be provided around the outer conductive shield using any suitable method, such as, e.g., extrusion. In other embodiments, the outer conductive shield may be omitted and the outer jacket may be provided by itself around the folded shielded cable.

Figure 6A:
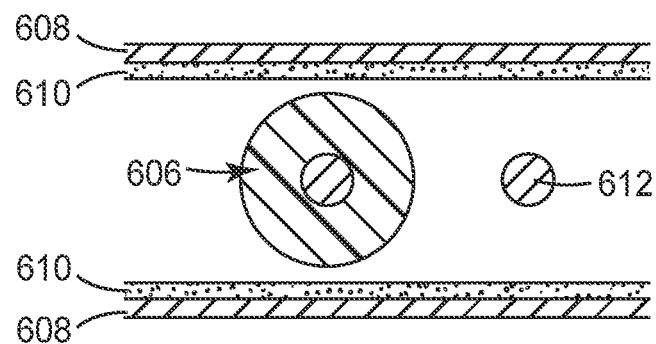
FIGS. 6a-6c are front cross-sectional views illustrating a detail of an example method of making a shielded electrical cable.
Figure 6B:
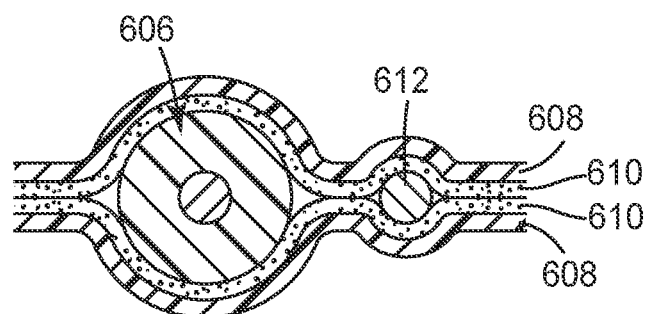
Figure 6C:
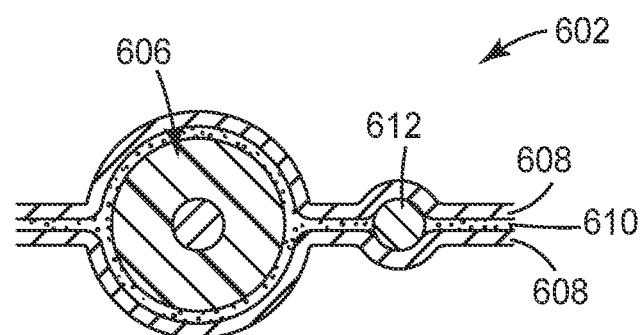

In FIGS. 6a-6c a detail of an exemplary method of making a shielded electrical cable is illustrated. In particular, these figures illustrate how one or more adhesive layers may be conformably shaped during the forming and bonding of the shielding films. In the step illustrated in FIG. 6a, an insulated conductor 606, a ground conductor 612 spaced apart from the insulated conductor 606, and two shielding films 608 are provided. Shielding films 608 each include a conformable adhesive layer 610. In the steps illustrated in FIGS. 6b-6c, shielding films 608 are formed around insulated conductor 606 and ground conductor 612 and bonded to each other. Initially, as illustrated in FIG. 6b, the adhesive layers 610 still have their original thickness. As the forming and bonding of shielding films 608 proceeds, the adhesive layers 610 conform to achieve desired mechanical and electrical performance characteristics of finished shielded electrical cable 602 (FIG. 6c).

As illustrated in FIG. 11c, adhesive layers 610 conform to be thinner between shielding films 608 on both sides of insulated conductor 606 and ground conductor 612; a portion of adhesive layers 610 displaces away from these areas. Further, adhesive layers 610 conform to be thicker in areas immediately adjacent insulated conductor 606 and ground conductor 612, and substantially conform to insulated conductor 606 and ground conductor 612; a portion of adhesive layers 610 displaces into these areas. Further, adhesive layers 610 conform to effectively be removed between shielding films 608 and ground conductor 612; the adhesive layers 610 displace away from these areas such that ground conductor 612 electrically contacts shielding films 608.

Figure 7A:
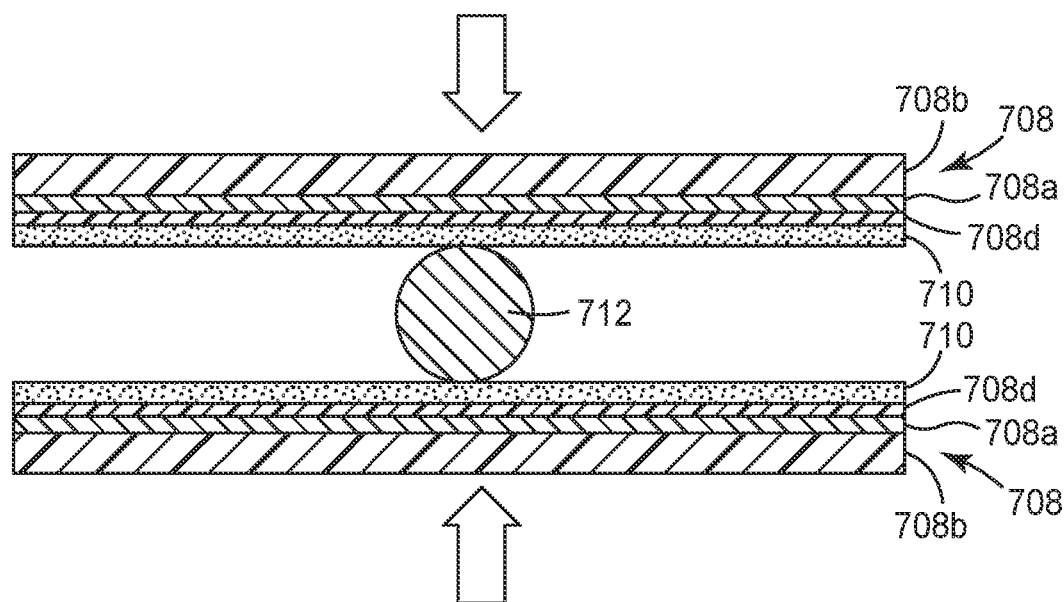
FIGS. 7a and 7b are front cross-sectional detail views illustrating another aspect of making an example shielded electrical cable.
Figure 7B:
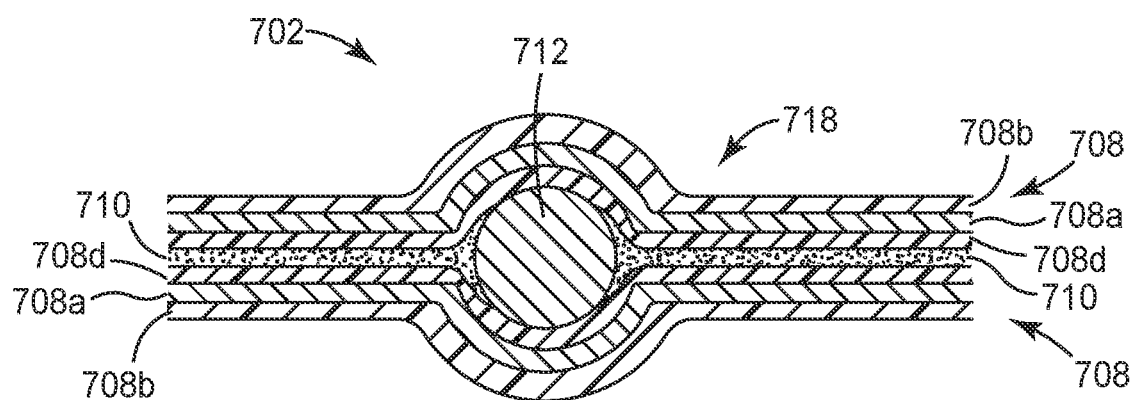

Shown in FIGS. 7a and 7b are details pertaining to a pinched region during the manufacture of an exemplary shielded electrical cable. Shielded electrical cable 702 (see FIG. 7b) is made using two shielding films 708 and includes a pinched region 718 (see FIG. 7b) wherein shielding films 708 may be substantially parallel. Shielding films 708 include a non-conductive polymeric layer 708b, a conductive layer 708a disposed on non-conductive polymeric layer 708b, and a stop layer 708d disposed on the conductive layer 708a. A conformable adhesive layer 710 is disposed on stop layer 708d. Pinched region 718 includes a longitudinal ground conductor 712 disposed between shielding films 708. After the shielding films are forced together around the ground conductor, the ground conductor 712 makes indirect electrical contact with the conductive layers 708a of shielding films 708. This indirect electrical contact is enabled by a controlled separation of conductive layer 708a and ground conductor 712 provided by stop layer 708d. In some cases, the stop layer 708d may be or include a non-conductive polymeric layer. As shown in the figures, an external pressure (see FIG. 17a) is used to press conductive layers 708a together and force the adhesive layers 710 to conform around the ground conductor 712 (FIG. 17b). Because the stop layer 708d does not conform at least under the same processing conditions, it prevents direct electrical contact between the ground conductor 712 and conductive layer 708a of the shielding films 708, but achieves indirect electrical contact. The thickness and dielectric properties of stop layer 708d may be selected to achieve a low target DC resistance, i.e., electrical contact of an indirect type. In some embodiments, the characteristic DC resistance between the ground conductor and the shielding film may be less than 10 ohms, or less than 5 ohms, for example, but greater than 0 ohms, to achieve the desired indirect electrical contact. In some cases, it is desirable to make direct electrical contact between a given ground conductor and one or two shielding films, whereupon the DC resistance between such ground conductor and such shielding film(s) may be substantially 0 ohms.

In exemplary embodiments, the cover regions of the shielded electrical cable include concentric regions and transition regions positioned on one or both sides of a given conductor set. Portions of a given shielding film in the concentric regions are referred to as concentric portions of the shielding film, and portions of the shielding film in the transition regions are referred to as transition portions of the shielding film. The transition regions can be configured to provide high manufacturability and strain and stress relief of the shielded electrical cable. Maintaining the transition regions at a substantially constant configuration (including aspects such as, e.g., size, shape, content, and radius of curvature) along the length of the shielded electrical cable may help the shielded electrical cable to have substantially uniform electrical properties, such as, e.g., high frequency isolation, impedance, skew, insertion loss, reflection, mode conversion, eye opening, and jitter.

Additionally, in certain embodiments, such as, e.g., embodiments wherein the conductor set includes two insulated conductors that extend along a length of the cable that are arranged generally in a single and effectively as a twinaxial cable that can be connected in a differential pair circuit arrangement, maintaining the transition portion at a substantially constant configuration along the length of the shielded electrical cable can beneficially provide substantially the same electromagnetic field deviation from an ideal concentric case for both conductors in the conductor set. Thus, careful control of the configuration of this transition portion along the length of the shielded electrical cable can contribute to the advantageous electrical performance and characteristics of the cable. FIGS. 8a through 10 illustrate various exemplary embodiments of a shielded electrical cable that include transition regions of the shielding films disposed on one or both sides of the conductor set.

Figure 8A:
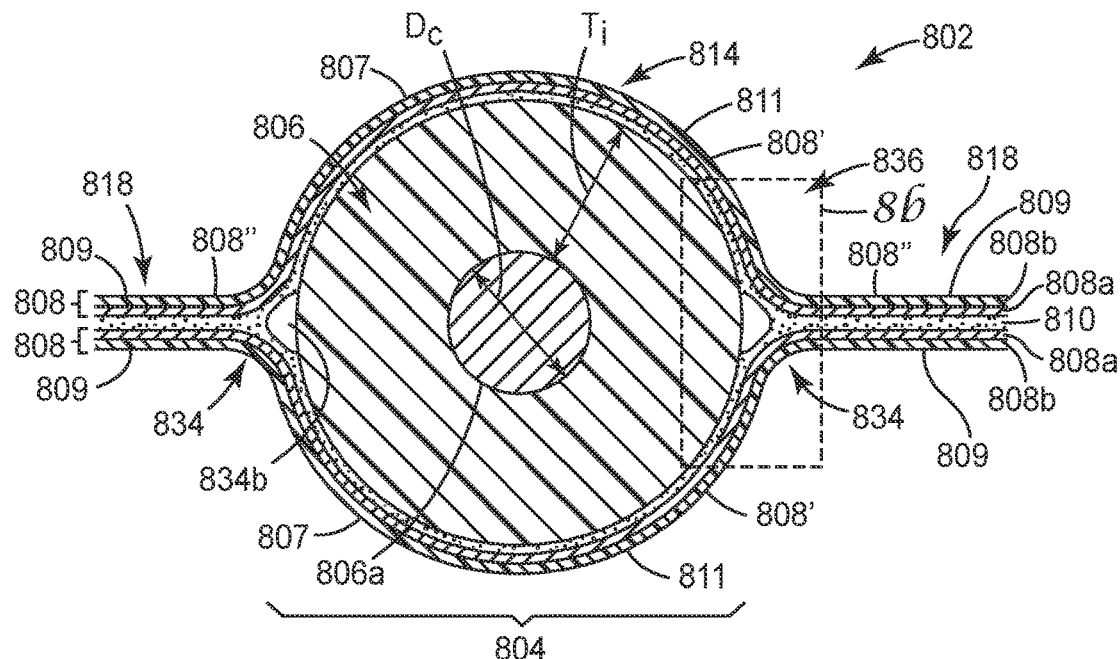
FIG. 8a is a front cross-sectional view of another example embodiment of a shielded electrical cable.
Figure 8B:
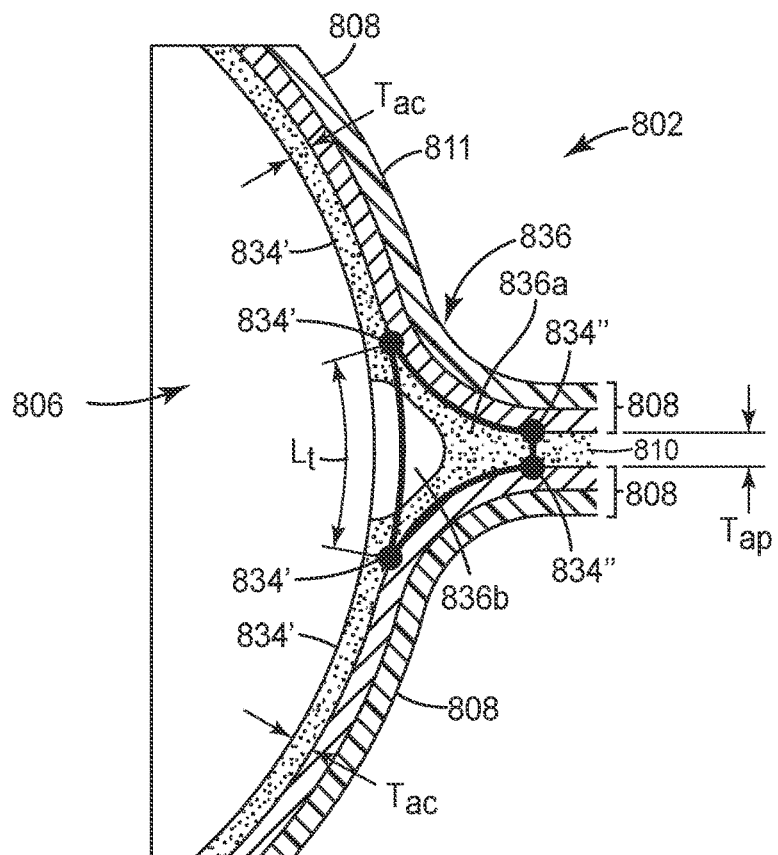
FIG. 8b is a corresponding detail view thereof.

The shielded electrical cable 802, which is shown in cross section in FIGS. 8a and 8b, includes a single conductor set 804 that extends along a length of the cable. The cable 802 may be made to have multiple conductor sets 804 spaced apart from each other along a width of the cable and extending along a length of the cable. Although only one insulated conductor 806 is shown in FIG. 8a, multiple insulated conductors may be included in the conductor set 804 if desired.

The insulated conductor of a conductor set that is positioned nearest to a pinched region of the cable is considered to be an end conductor of the conductor set. The conductor set 804, as shown, has a single insulated conductor 806, and it is also an end conductor since it is positioned nearest to the pinched region 818 of the shielded electrical cable 802.

First and second shielding films 808 are disposed on opposite sides of the cable and include cover portions 807. In transverse cross section, the cover portions 807 substantially surround conductor set 804. An optional adhesive layer 810 is disposed between the pinched portions 809 of the shielding films 808, and bonds shielding films 808 to each other in the pinched regions 818 of the cable 802 on both sides of conductor set 804. The optional adhesive layer 810 may extend partially or fully across the cover portion 807 of the shielding films 808, e.g., from the pinched portion 809 of the shielding film 808 on one side of the conductor set 804 to the pinched portion 809 of the shielding film 808 on the other side of the conductor set 804.

Insulated conductor 806 is effectively arranged as a coaxial cable which may be used in a single ended circuit arrangement. Shielding films 808 may include a conductive layer 808a and a non-conductive polymeric layer 808b. In some embodiments, as illustrated by FIGS. 8a and 8b, the conductive layer 808a of both shielding films faces the insulated conductors. Alternatively, the orientation of the conductive layers of one or both of shielding films 808 may be reversed, as discussed elsewhere herein.

Shielding films 808 include a concentric portion that is substantially concentric with the end conductor 806 of the conductor set 804. The shielded electrical cable 802 includes transition regions 836. Portions of the shielding film 808 in the transition region 836 of the cable 802 are transition portions 834 of the shielding films 808. In some embodiments, shielded electrical cable 802 includes a transition region 836 positioned on both sides of the conductor set 804, and in some embodiments a transition region 836 may be positioned on only one side of conductor set 804.

Transition regions 836 are defined by shielding films 808 and conductor set 804. The transition portions 834 of the shielding films 808 in the transition regions 836 provide a gradual transition between concentric portions 811 and pinched portions 809 of the shielding films 808. As opposed to a sharp transition, such as, e.g., a right-angle transition or a transition point (as opposed to a transition portion), a gradual or smooth transition, such as, e.g., a substantially sigmoidal transition, provides strain and stress relief for shielding films 808 in transition regions 836 and prevents damage to shielding films 808 when shielded electrical cable 802 is in use, e.g., when laterally or axially bending shielded electrical cable 802. This damage may include, e.g., fractures in conductive layer 808a and/or debonding between conductive layer 808a and non-conductive polymeric layer 808b. In addition, a gradual transition prevents damage to shielding films 808 in manufacturing of shielded electrical cable 802, which may include, e.g., cracking or shearing of conductive layer 808a and/or non-conductive polymeric layer 808b. Use of the disclosed transition regions on one or both sides of one, some, or all of the conductor sets in a shielded electrical ribbon cable represents a departure from conventional cable configurations, such as, e.g., a typical coaxial cable, wherein a shield is generally continuously disposed around a single insulated conductor, or a typical conventional twinaxial cable in which a shield is continuously disposed around a pair of insulated conductors. Although these conventional shielding configurations may provide model electromagnetic profiles, such profiles may not be necessary to achieve acceptable electrical properties in a given application.

According to one aspect of at least some of the disclosed shielded electrical cables, acceptable electrical properties can be achieved by reducing the electrical impact of the transition region, e.g., by reducing the size of the transition region and/or carefully controlling the configuration of the transition region along the length of the shielded electrical cable. Reducing the size of the transition region reduces the capacitance deviation and reduces the required space between multiple conductor sets, thereby reducing the conductor set pitch and/or increasing the electrical isolation between conductor sets. Careful control of the configuration of the transition region along the length of the shielded electrical cable contributes to obtaining predictable electrical behavior and consistency, which provides for high speed transmission lines so that electrical data can be more reliably transmitted. Careful control of the configuration of the transition region along the length of the shielded electrical cable is a factor as the size of the transition portion approaches a lower size limit.

An electrical characteristic that is often considered is the characteristic impedance of the transmission line. Any impedance changes along the length of a transmission line may cause power to be reflected back to the source instead of being transmitted to the target. Ideally, the transmission line will have no impedance variation along its length, but, depending on the intended application, variations up to 5-10% may be acceptable. Another electrical characteristic that is often considered in twinaxial cables (differentially driven) is skew or unequal transmission speeds of two transmission lines of a pair along at least a portion of their length. Skew produces conversion of the differential signal to a common mode signal that can be reflected back to the source, reduces the transmitted signal strength, creates electromagnetic radiation, and can dramatically increase the bit error rate, in particular jitter. Ideally, a pair of transmission lines will have no skew, but, depending on the intended application, a differential S-parameter SCD21 or SCD12 value (representing the differential-to common mode conversion from one end of the transmission line to the other) of less than −25 to −30 dB up to a frequency of interest, such as, e.g., 6 GHz, may be acceptable. Alternatively, skew can be measured in the time domain and compared to a required specification. Depending on the intended application, values of less than about 20 picoseconds/meter (ps/m) and preferably less than about 10 ps/m may be acceptable.

Referring again to FIGS. 8a and 8b, in part to help achieve acceptable electrical properties, transition regions 836 of shielded electrical cable 802 may each include a cross-sectional transition area 836a. The transition area 836a is preferably smaller than a cross-sectional area 806a of conductor 806. As best shown in FIG. 8b, cross-sectional transition area 836a of transition region 836 is defined by transition points 834' and 834".

The transition points 834' occur where the shielding films deviate from being substantially concentric with the end insulated conductor 806 of the conductor set 804. The transition points 834' are the points of inflection of the shielding films 808 at which the curvature of the shielding films 808 changes sign. For example, with reference to FIG. 8b, the curvature of the upper shielding film 808 transitions from concave downward to concave upward at the inflection point which is the upper transition point 834' in the figure. The curvature of the lower shielding film 808 transitions from concave upward to concave downward at the inflection point which is the lower transition point 834' in the figure. The other transition points 834" occur where a separation between the pinched portions 809 of the shielding films 808 exceeds the minimum separation d1 of the pinched portions 809 by a predetermined factor, e.g., 1.2 or 1.5.

In addition, each transition area 836a may include a void area 836b. Void areas 836b on either side of the conductor set 804 may be substantially the same. Further, adhesive layer 810 may have a thickness Tac at the concentric portion 811 of the shielding film 808, and a thickness at the transition portion 834 of the shielding film 808 that is greater than thickness Tac. Similarly, adhesive layer 810 may have a thickness Tap between the pinched portions 809 of the shielding films 808, and a thickness at the transition portion 834 of the shielding film 808 that is greater than thickness Tap. Adhesive layer 810 may represent at least 25% of cross-sectional transition area 836a. The presence of adhesive layer 810 in transition area 836a, in particular at a thickness that is greater than thickness Tac or thickness Tap, contributes to the strength of the cable 802 in the transition region 836.

Careful control of the manufacturing process and the material characteristics of the various elements of shielded electrical cable 802 may reduce variations in void area 836b and the thickness of conformable adhesive layer 810 in transition region 836, which may in turn reduce variations in the capacitance of cross-sectional transition area 836a. Shielded electrical cable 802 may include transition region 836 positioned on one or both sides of conductor set 804 that includes a cross-sectional transition area 836a that is substantially equal to or smaller than a cross-sectional area 806a of conductor 806. Shielded electrical cable 802 may include a transition region 836 positioned on one or both sides of conductor set 804 that includes a cross-sectional transition area 836a that is substantially the same along the length of conductor 806. For example, cross-sectional transition area 836a may vary less than 50% over a length of 1 meter. Shielded electrical cable 802 may include transition regions 836 positioned on both sides of conductor set 804 that each include a cross-sectional transition area, wherein the sum of cross-sectional areas 834a is substantially the same along the length of conductor 806. For example, the sum of cross-sectional areas 834a may vary less than 50% over a length of 1 m. Shielded electrical cable 802 may include transition regions 836 positioned on both sides of conductor set 804 that each include a cross-sectional transition area 836a, wherein the cross-sectional transition areas 836a are substantially the same. Shielded electrical cable 802 may include transition regions 836 positioned on both sides of conductor set 804, wherein the transition regions 836 are substantially identical. Insulated conductor 806 has an insulation thickness Ti, and transition region 836 may have a lateral length Lt that is less than insulation thickness Ti. The central conductor of insulated conductor 806 has a diameter Dc, and transition region 836 may have a lateral length Lt that is less than the diameter Dc. The various configurations described above may provide a characteristic impedance that remains within a desired range, such as, e.g., within 5-10% of a target impedance value, such as, e.g., 50 ohms, over a given length, such as, e.g., 1 meter.

Factors that can influence the configuration of transition region 836 along the length of shielded electrical cable 802 include the manufacturing process, the thickness of conductive layers 808a and non-conductive polymeric layers 808b, adhesive layer 810, and the bond strength between insulated conductor 806 and shielding films 808, to name a few.

In one aspect, conductor set 804, shielding films 808, and transition region 836 may be cooperatively configured in an impedance controlling relationship. An impedance controlling relationship means that conductor set 804, shielding films 808, and transition region 836 are cooperatively configured to control the characteristic impedance of the shielded electrical cable.

Figure 9:
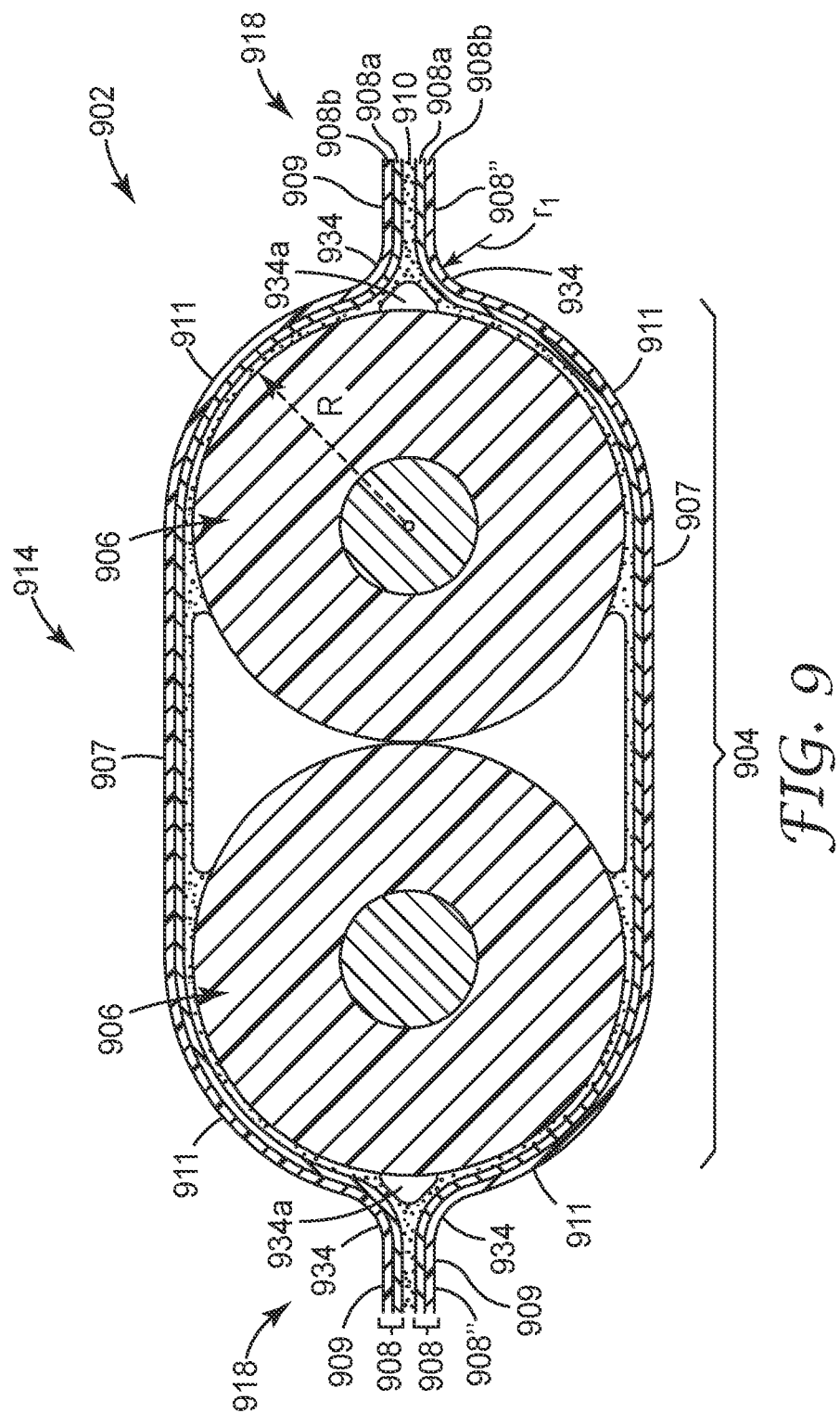
FIG. 9 is a front cross-sectional view of a portion of another example shielded electrical cable.

In FIG. 9 an exemplary shielded electrical cable 902 is shown, in transverse cross section, that includes two insulated conductors in a connector set 904, the individually insulated conductors 906 each extending along a length of the cable 902. Two shielding films 908 are disposed on opposite sides of the cable 902 and in combination substantially surround conductor set 904. An optional adhesive layer 910 is disposed between pinched portions 909 of the shielding films 908 and bonds shielding films 908 to each other on both sides of conductor set 904 in the pinched regions 918 of the cable. Insulated conductors 906 can be arranged generally in a single plane and effectively in a twinaxial cable configuration. The twinaxial cable configuration can be used in a differential pair circuit arrangement or in a single ended circuit arrangement. Shielding films 908 may include a conductive layer 908a and a non-conductive polymeric layer 908b, or may include the conductive layer 908a without the non-conductive polymeric layer 908b. In the figure, the conductive layer 908a of each shielding film is shown facing insulated conductors 906, but in alternative embodiments, one or both of the shielding films may have a reversed orientation.

The cover portion 907 of at least one of the shielding films 908 includes concentric portions 911 that are substantially concentric with corresponding end conductors 906 of the conductor set 904. In the transition regions of the cable 902, transition portion 934 of the shielding films 908 are between the concentric portions 911 and the pinched portions 909 of the shielding films 908. Transition portions 934 are positioned on both sides of conductor set 904, and each such portion includes a cross-sectional transition area 934a. The sum of cross-sectional transition areas 934a is preferably substantially the same along the length of conductors 906. For example, the sum of cross-sectional areas 934a may vary less than 50% over a length of 1 m.

In addition, the two cross-sectional transition areas 934a may be substantially the same and/or substantially identical. This configuration of transition regions contributes to a characteristic impedance for each conductor 906 (single-ended) and a differential impedance that both remain within a desired range, such as, e.g., within 5-10% of a target impedance value over a given length, such as, e.g., 1 m. In addition, this configuration of the transition regions may minimize skew of the two conductors 906 along at least a portion of their length.

When the cable is in an unfolded, planar configuration, each of the shielding films may be characterizable in transverse cross section by a radius of curvature that changes across a width of the cable 902. The maximum radius of curvature of the shielding film 908 may occur, for example, at the pinched portion 909 of the cable 902, or near the center point of the cover portion 907 of the multi-conductor cable set 904 illustrated in FIG. 9. At these positions, the film may be substantially flat and the radius of curvature may be substantially infinite. The minimum radius of curvature of the shielding film 908 may occur, for example, at the transition portion 934 of the shielding film 908. In some embodiments, the radius of curvature of the shielding film across the width of the cable is at least about 50 micrometers, i.e., the radius of curvature does not have a magnitude smaller than 50 micrometers at any point along the width of the cable, between the edges of the cable. In some embodiments, for shielding films that include a transition portion, the radius of curvature of the transition portion of the shielding film is similarly at least about 50 micrometers.

In an unfolded, planar configuration, shielding films that include a concentric portion and a transition portion are characterizable by a radius of curvature of the concentric portion, R1, and/or a radius of curvature of the transition portion r1. These parameters are illustrated in FIG. 9 for the cable 902. In exemplary embodiments, R1/r1 is in a range of 2 to 15.

Figure 10:
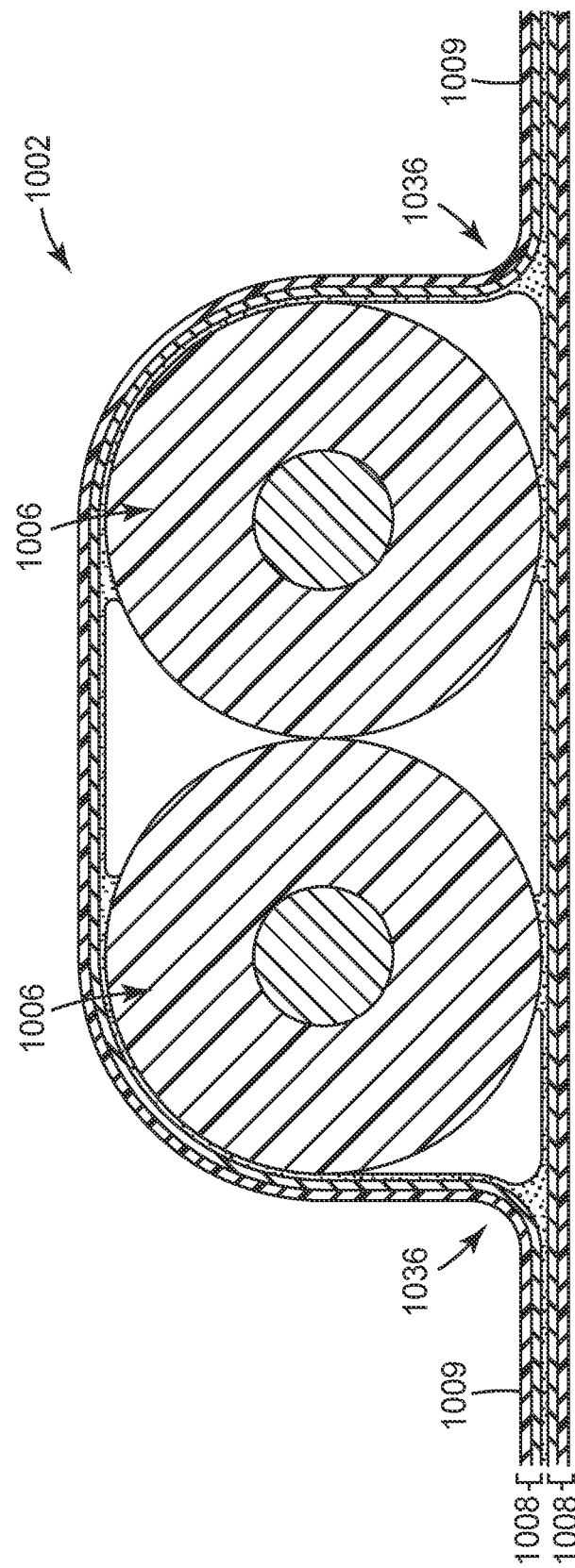
FIG. 10 is a front cross-sectional view of a portion of another example shielded electrical cable.

In FIG. 10 another exemplary shielded electrical cable 1002 is illustrated which includes a conductor set having two insulated conductors 1006. In this embodiment, the shielding films 1008 have an asymmetric configuration, which changes the position of the transition portions relative to a more symmetric embodiment such as that of FIG. 9. In FIG. 10, shielded electrical cable 1002 has pinched portions 1009 of shielding films 1008 that lie in a plane that is slightly offset from the plane of symmetry of the insulated conductors 1006. Despite the slight offset, the cable of FIG. 10 and its various elements can still be considered to extend generally along a given plane and to be substantially planar. The transition regions 1036 have a somewhat offset position and configuration relative to other depicted embodiments. However, by ensuring that the two transition regions 1036 are positioned substantially symmetrically with respect to corresponding insulated conductors 1006 (e.g. with respect to a vertical plane between the conductors 1006), and that the configuration of transition regions 1036 is carefully controlled along the length of shielded electrical cable 1002, the shielded electrical cable 1002 can be configured to still provide acceptable electrical properties.

Figure 11A:
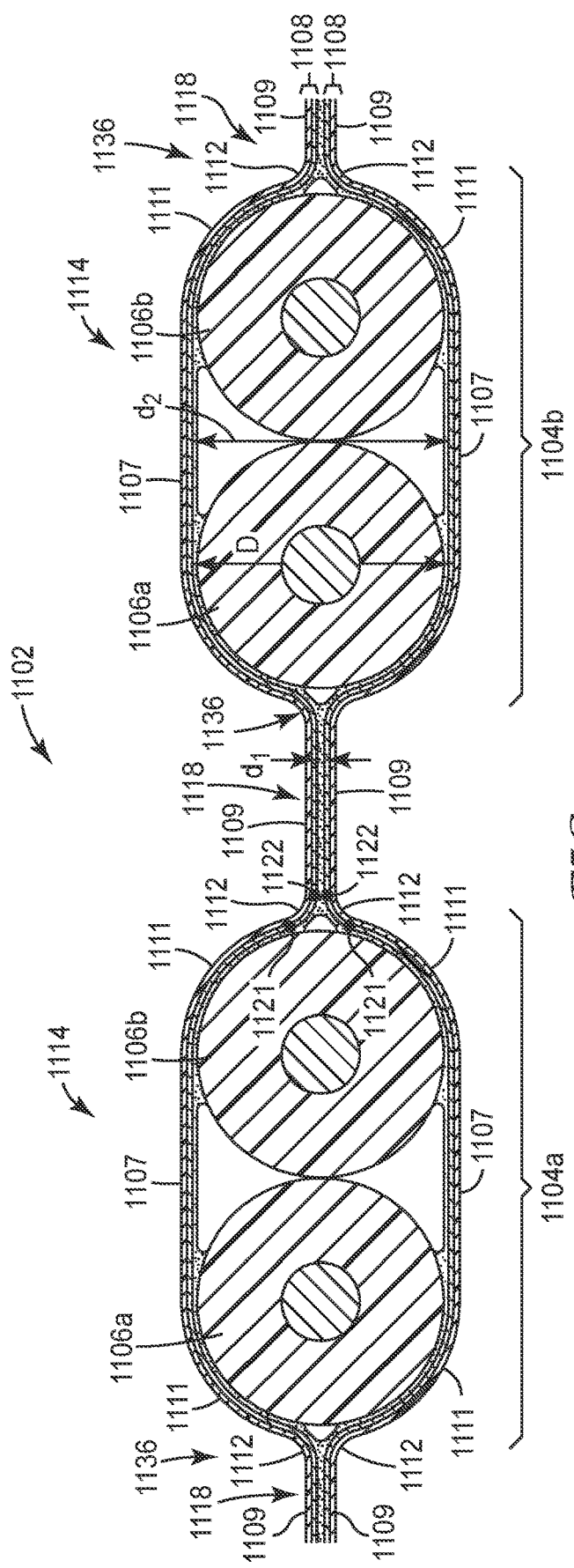
FIGS. 11a and 11b are front cross-sectional views of two other portions of example shielded electrical cables.
Figure 11B:
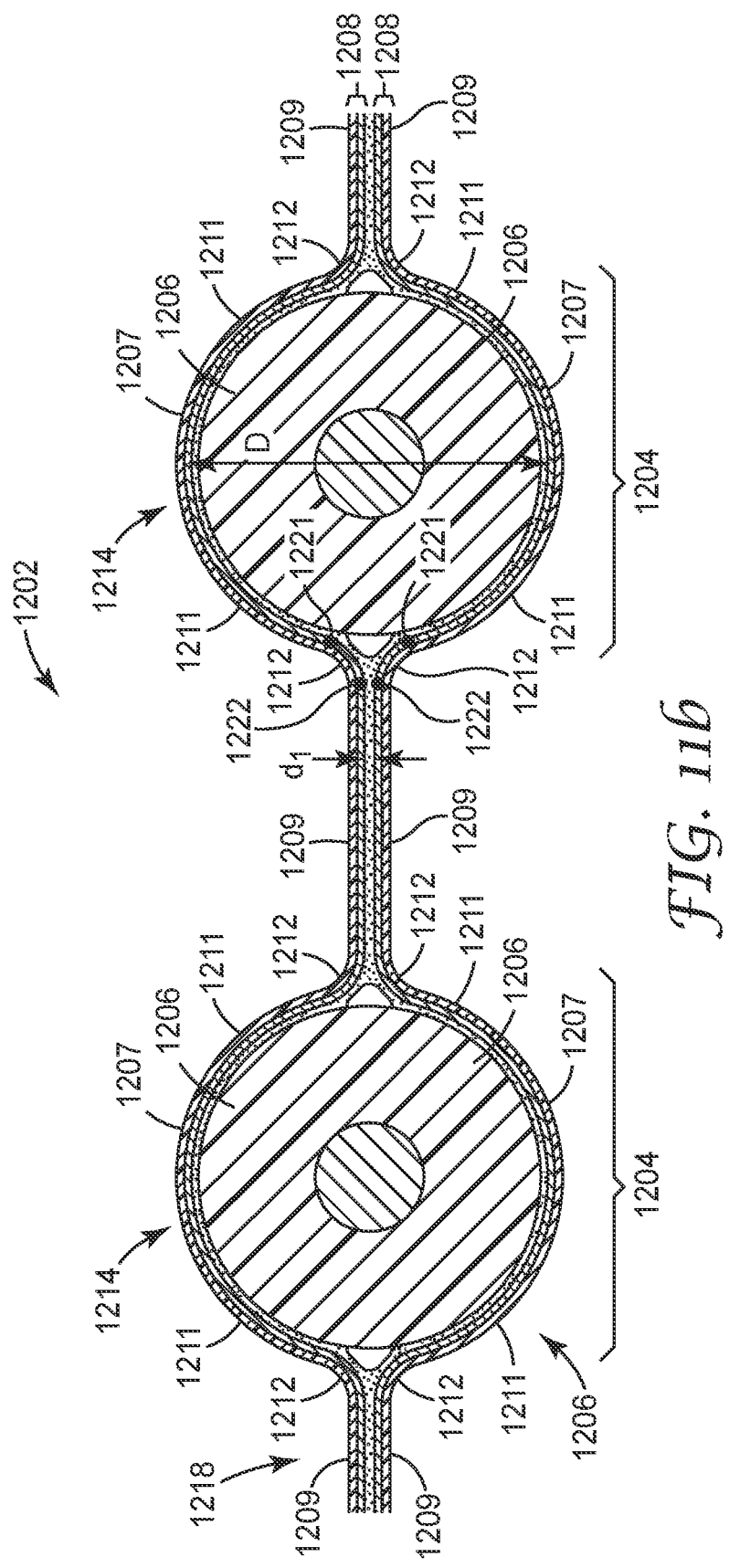

In FIGS. 11a and 11b additional exemplary shielded electrical cables are illustrated. These figures are used to further explain how a pinched portion of the cable is configured to electrically isolate a conductor set of the shielded electrical cable. The conductor set may be electrically isolated from an adjacent conductor set (e.g., to minimize crosstalk between adjacent conductor sets) or from the external environment of the shielded electrical cable (e.g., to minimize electromagnetic radiation escape from the shielded electrical cable and minimize electromagnetic interference from external sources). In both cases, the pinched portion may include various mechanical structures to realize the electrical isolation. Examples include close proximity of the shielding films, high dielectric constant material between the shielding films, ground conductors that make direct or indirect electrical contact with at least one of the shielding films, extended distance between adjacent conductor sets, physical breaks between adjacent conductor sets, intermittent contact of the shielding films to each other directly either longitudinally, transversely, or both, and conductive adhesive, to name a few.

Shown in FIG. 11a, in cross section, is a shielded electrical cable 1102 that includes two conductor sets 1104a, 104b spaced apart across a width of the cable 102 and extending longitudinally along a length of the cable. Each conductor set 1104a, 1104b has two insulated conductors 1106a, 1106b. Two shielding films 1108 are disposed on opposite sides of the cable 1102. In transverse cross section, cover portions 1107 of the shielding films 1108 substantially surround conductor sets 1104a, 1104b in cover regions 1114 of the cable 1102. In pinched regions 1118 of the cable, on both sides of the conductor sets 1104a, 1104b, the shielding films 1108 include pinched portions 1109. In shielded electrical cable 1102, the pinched portions 1109 of shielding films 1108 and insulated conductors 1106 are arranged generally in a single plane when the cable 1102 is in a planar and/or unfolded arrangement. Pinched portions 1109 positioned in between conductor sets 1104a, 1104b are configured to electrically isolate conductor sets 1104a, 1104b from each other. When arranged in a generally planar, unfolded arrangement, as illustrated in FIG. 11a, the high frequency electrical isolation of the first insulated conductor 1106a in the conductor set 1104a relative to the second insulated conductor 1106b in the conductor set 1104a is substantially less than the high frequency electrical isolation of the first conductor set 1104a relative to the second conductor set 1104b.

As illustrated in the cross section of FIG. 11a, the cable 1102 can be characterized by a maximum separation, D, between the cover portions 1107 of the shielding films 1108, a minimum separation, d2, between the cover portions 1107 of the shielding films 1108, and a minimum separation, d1, between the pinched portions 1109 of the shielding films 1108. In some embodiments, d1/D is less than 0.25, or less than 0.1. In some embodiments, d2/D is greater than 0.33.

An optional adhesive layer may be included as shown between the pinched portions 1109 of the shielding films 1108. The adhesive layer may be continuous or discontinuous. In some embodiments, the adhesive layer may extend fully or partially in the cover region 1114 of the cable 1102, e.g., between the cover portion 1107 of the shielding films 1108 and the insulated conductors 1106a, 1106b. The adhesive layer may be disposed on the cover portion 1107 of the shielding film 1108 and may extend fully or partially from the pinched portion 1109 of the shielding film 1108 on one side of a conductor set 1104a, 1104b to the pinched portion 1109 of the shielding film 1108 on the other side of the conductor set 1104a, 1104b.

The shielding films 1108 can be characterized by a radius of curvature, R, across a width of the cable 1102 and/or by a radius of curvature, r1, of the transition portion 1112 of the shielding film and/or by a radius of curvature, r2, of the concentric portion 1111 of the shielding film.

In the transition region 1136, the transition portion 1112 of the shielding film 1108 can be arranged to provide a gradual transition between the concentric portion 1111 of the shielding film 1108 and the pinched portion 1109 of the shielding film 1108. The transition portion 1112 of the shielding film 1108 extends from a first transition point 1121, which is the inflection point of the shielding film 1108 and marks the end of the concentric portion 1111, to a second transition point 1122 where the separation between the shielding films exceeds the minimum separation, d1, of the pinched portions 1109 by a predetermined factor.

In some embodiments, the cable 1102 includes at least one shielding film that has a radius of curvature, R, across the width of the cable that is at least about 50 micrometers and/or the minimum radius of curvature, r1, of the transition portion 1112 of the shielding film 1102 is at least about 50 micrometers. In some embodiments, the ratio of the minimum radius of curvature of the concentric portion to the minimum radius of curvature of the transition portion, r2/r1 is in a range of 2 to 15.

In FIG. 11b is a cross sectional view of a shielded electrical cable 1202 that includes two conductor sets 1204 spaced apart from each other across a width of the cable and extending longitudinally along a length of the cable. Each conductor set 1204 has only one insulated conductor 1206, and two shielding films 1208 are disposed on opposite sides of the cable 1202. In transverse cross section, the cover portions 1207 of the shielding films 1208 in combination substantially surround the insulated conductor 1206 of conductor sets 1204 in a cover region 1214 of the cable. In pinched regions 1218 of the cable, on both sides of the conductor sets 1204, the shielding films 1208 include pinched portions 1209. In shielded electrical cable 1202, pinched portions 1209 of shielding films 1208 and insulated conductors 1206 can be arranged generally in a single plane when the cable 1202 is in a planar and/or unfolded arrangement. The cover portions 1207 of the shielding films 1208 and/or the pinched regions 1218 of the cable 1202 are configured to electrically isolate the conductor sets 1204 from each other.

As shown in the figure, the cable 1202 can be characterized by a maximum separation, D, between the cover portions 1207 of the shielding films 1208, and a minimum separation, d1, between the pinched portions 1209 of the shielding films 1208. In exemplary embodiments, d1/D is less than 0.25, or less than 0.1.

An optional adhesive layer may be disposed as shown between the pinched portions 1209 of the shielding films 1208. The adhesive layer may be continuous or discontinuous. In some embodiments, the adhesive layer may extend fully or partially in the cover region 1214 of the cable, e.g., between the cover portions 1207 of the shielding films 1208 and the insulated conductors 1206. The adhesive layer may be disposed on the cover portions 1207 of the shielding films 1208 and may extend fully or partially from the pinched portions 1209 of the shielding films 1208 on one side of a conductor set 1204 to the pinched portions 1209 of the shielding films 1208 on the other side of the conductor set 1204.

The shielding films 1208 can be characterized by a radius of curvature, R, across a width of the cable 1202 and/or by a minimum radius of curvature, r1, in the transition portion 1212 of the shielding film 1208 and/or by a minimum radius of curvature, r2, of the concentric portion 1211 of the shielding film 1208. In the transition regions 1236 of the cable 1202, transition portions 1212 of the shielding films 1202 can be configured to provide a gradual transition between the concentric portions 1211 of the shielding films 1208 and the pinched portions 1209 of the shielding films

1208. The transition portion 1212 of the shielding film 1208 extends from a first transition point 1221, which is the inflection point of the shielding film 1208 and marks the end of the concentric portion 1211, to a second transition point 1222 where the separation between the shielding films exceeds the minimum separation, d1, of the pinched portions 1209 by a predetermined factor.

In some embodiments, the radius of curvature, R, of the shielding film across the width of the cable is at least about 50 micrometers and/or the minimum radius of curvature in the transition portion of the shielding film is at least 50 micrometers.

In some cases, the pinched regions of any of the described shielded cables can be configured to be laterally bent at an angle α of at least 30°, for example. This lateral flexibility of the pinched regions can enable the shielded cable to be folded in any suitable configuration, such as, e.g., a configuration that can be used in a round cable. In some cases, the lateral flexibility of the pinched regions is enabled by shielding films that include two or more relatively thin individual layers. To warrant the integrity of these individual layers in particular under bending conditions, it is preferred that the bonds between them remain intact. The pinched regions may for example have a minimum thickness of less than about 0.13 mm, and the bond strength between individual layers may be at least 17.86 g/mm (1 lbs/inch) after thermal exposures during processing or use.

It may be beneficial to the electrical performance of any of the disclosed shielded electrical cables for the pinched regions of the cable to have approximately the same size and shape on both sides of a given conductor set. Any dimensional changes or imbalances may produce imbalances in capacitance and inductance along the length of the pinched region. This in turn may cause impedance differences along the length of the pinched region and impedance imbalances between adjacent conductor sets. At least for these reasons, control of the spacing between the shielding films may be desired. In some cases, the pinched portions of the shielding films in the pinched regions of the cable (on each side of a conductor set) may be separated from each other by no more than about 0.05 mm.

Figure 12:
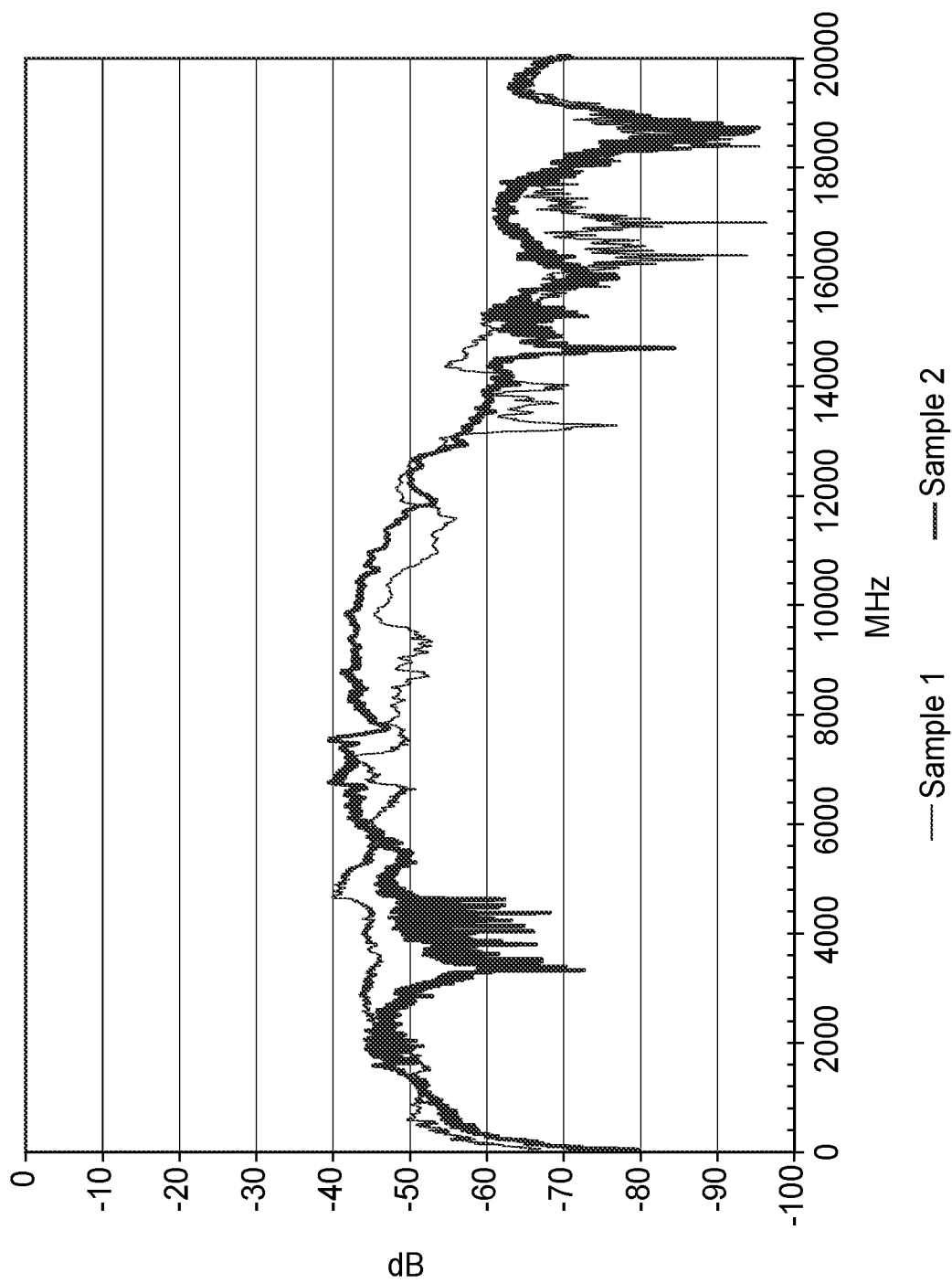
FIG. 12 is a graph comparing the electrical isolation performance of an example shielded electrical cable to that of a conventional electrical cable.

In FIG. 12, the far end crosstalk (FEXT) isolation is shown between two adjacent conductor sets of a conventional electrical cable wherein the conductor sets are completely isolated, i.e., have no common ground (Sample 1), and between two adjacent conductor sets of the shielded electrical cable 1102 illustrated in FIG. 11a wherein the shielding films 1108 are spaced apart by about 0.025 mm (Sample 2), both having a cable length of about 3 meters. The test method for creating this data is well known in the art. The data was generated using an Agilent 8720ES 50 MHz-20 GHz S-Parameter Network Analyzer. It can be seen by comparing the far end crosstalk plots that the conventional electrical cable and the shielded electrical cable 1102 provide a similar far end crosstalk performance. Specifically, it is generally accepted that a far end crosstalk of less than about −35 dB is suitable for most applications. It can be easily seen from FIG. 12 that for the configuration tested, both the conventional electrical cable and shielded electrical cable 1102 provide satisfactory electrical isolation performance. The satisfactory electrical isolation performance in combination with the increased strength of the pinched portion due to the ability to space apart the shielding films is an advantage of at least some of the disclosed shielded electrical cables over conventional electrical cables.

Figure 13:
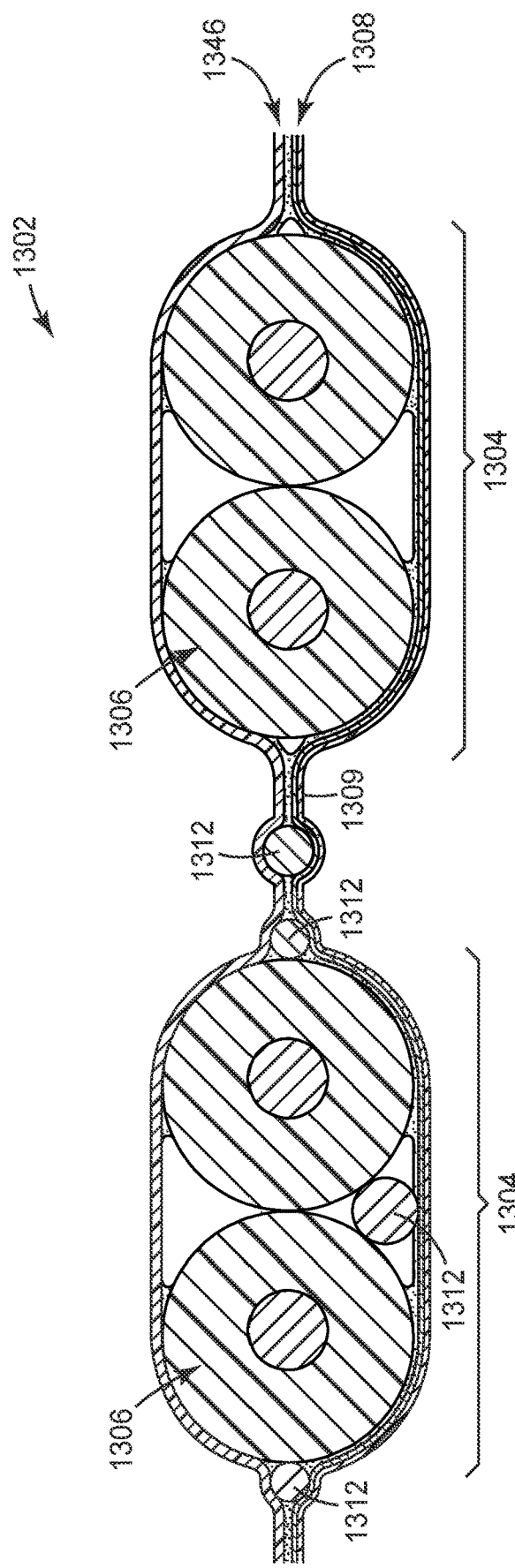
FIG. 13 is a front cross-sectional view of another example shielded electrical cable.

In exemplary embodiments described above, the shielded electrical cable includes two shielding films disposed on opposite sides of the cable such that, in transverse cross section, cover portions of the shielding films in combination substantially surround a given conductor set, and surround each of the spaced apart conductor sets individually. In some embodiments, however, the shielded electrical cable may contain only one shielding film, which is disposed on only one side of the cable. Advantages of including only a single shielding film in the shielded cable, compared to shielded cables having two shielding films, include a decrease in material cost and an increase in mechanical flexibility, manufacturability, and ease of stripping and termination. A single shielding film may provide an acceptable level of electromagnetic interference (EMI) isolation for a given application, and may reduce the proximity effect thereby decreasing signal attenuation. FIG. 13 illustrates one example of such a shielded electrical cable that includes only one shielding film.

In FIG. 13 a shielded electrical cable 1302 having only one shielding film 1308 is illustrated. Insulated conductors 1306 are arranged into two conductor sets 1304, each having only one pair of insulated conductors, although conductor sets having other numbers of insulated conductors as discussed herein are also contemplated. Shielded electrical cable 1302 is shown to include ground conductors 1312 in various exemplary locations, but any or all of them may be omitted if desired, or additional ground conductors can be included. The ground conductors 1312 extend in substantially the same direction as insulated conductors 1306 of conductor sets 1304 and are positioned between shielding film 1308 and a carrier film 1346 which does not function as a shielding film. One ground conductor 1312 is included in a pinched portion 1309 of shielding film 1308, and three ground conductors 1312 are included in one of the conductor sets 1304. One of these three ground conductors 1312 is positioned between insulated conductors 1306 and shielding film 1308, and two of the three ground conductors 1312 are arranged to be generally co-planar with the insulated conductors 1306 of the conductor set.

In addition to signal wires, drain wires, and ground wires, any of the disclosed cables can also include one or more individual wires, which are typically insulated, for any purpose defined by a user. These additional wires, which may for example be adequate for power transmission or low speed communications (e.g. less than 1 or 0.5 Gbps, or less than 1 or 0.5 GHz, or in some cases less than 1 MHz) but not for high speed communications (e.g. greater than 1 Gpbs or 1 GHz), can be referred to collectively as a sideband. Sideband wires may be used to transmit power signals, reference signals or any other signal of interest. The wires in a sideband are typically not in direct or indirect electrical contact with each other, but in at least some cases they may not be shielded from each other. A sideband can include any number of wires such as 2 or more, or 3 or more, or 5 or more.

Section 2: Bending Characteristics of Shielded Electrical Cable

In the above described cable configurations, the shield is not a wrapped structure but is arranged in two layers around the insulated wires. This shield structure may eliminate the resonance that afflicts helically wrapped constructions, and may also exhibit bend behavior that is less stiff than a wrapped construction and has superior retention of electrical performance after a sharp bend. These properties are enabled by, among other things, the use of a single ply thin shielding film rather than an overlapped and an additional over-wrapped film. One advantage of this construction is that the cable can be bent sharply to more effectively route the cable within a constrained space such as within a server, router, or other enclosed computer system.

Figure 14:
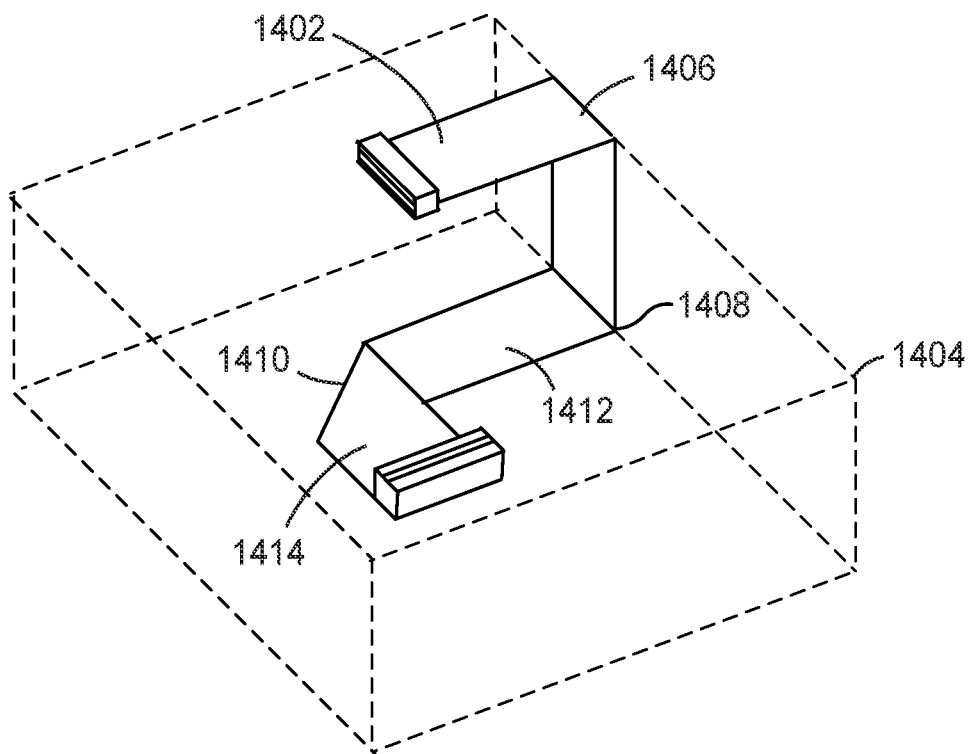
FIG. 14 is a perspective view of an example shielded electrical ribbon cable application.

In reference now to FIG. 14, a perspective view shows an application of a shielded, high-speed, electrical ribbon cable 1402 according to example embodiments. The cable 1402 may include any combination of the features shown in FIGS. 1, 2a-f, and 4a-c, 8a-b, 9, 10, 11a-b, and 13, but at least includes features shown in FIG. 2b. The ribbon cable 1402 is used to carry signals within a chassis 1404 or other object. In many situations, it is desirable to route the cable 1402 along sides of the chassis 1404. For example, such routing may allow cooling air to more freely flow within the chassis 1404, ease access for maintenance, allow tighter spacing of components, improve appearance, etc. Accordingly, the cable 1402 may need to make sharp bends, such as corner bends 1406 and 1408, e.g., to conform to structural features of the chassis 1404 and/or components contained therein. These bends 1406, 1408 are shown as right angle (90 degree) bends, although the cable may be bent at sharper or broader angles in some applications.

In another application, an approximately 180 degree fold 1410 may be used to allow the cable 1402 to make a turn in a substantially planar space. In such a case, the cable 1402 is folded across a fold line that is at a particular angle relative to a longitudinal edge of the cable. In the illustrated fold 1410, the fold line is approximately 45 degrees relative to such an edge, causing the cable 1402 to turn 90 degrees. Other fold angles may be used to form other turning angles as needed. Generally, the cable 1402 can configured to a given turn angle in response to proximate regions 1412, 1414 before and after the fold 1410 being attached flat to a planar surface, e.g., a side of the chassis 1404, or formed equivalently relative to a plane without being attached to a surface.

Figure 15:
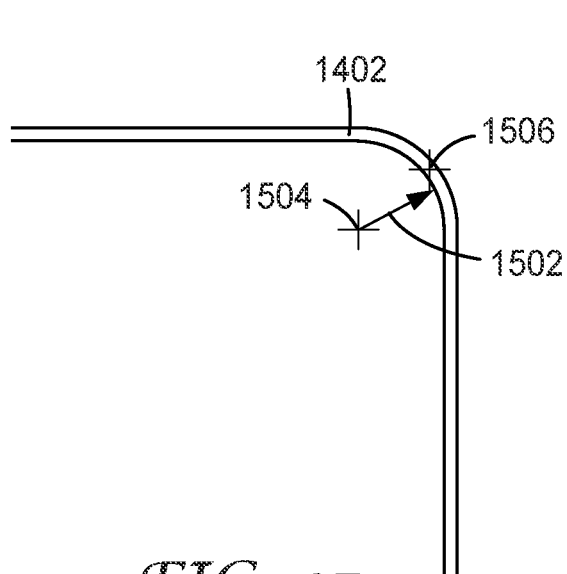
FIGS. 15 and 16 are side views of bending/folding of an example cable.
Figure 16:
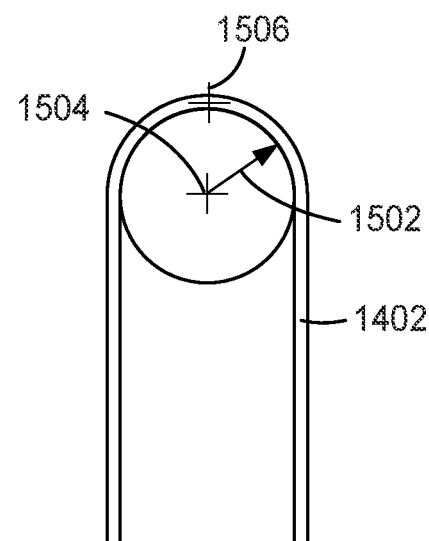

In order for cable 1402 to be shaped as shown, the inner radii of bends 1406, 1408 and folds 1410 may need to be relatively small. In FIGS. 15 and 16, a side view shows cable 1402 bent/folded according to example embodiments. In FIG. 15, a 90 degree bend is shown, and in FIG. 16, a 180-degree bend is shown. In both cases, an inner bend radius 1502 may be a limiting factor when determining how flexible the cable is and how such bending may affect performance. The bend radius 1502 may be measured relative to a centerline 1504, which is parallel to and offset from a fold line 1506 on the cable 1402. Both lines 1504 and 1506 project orthogonally out of the page in this example, although may project at other angles for fold line angles different than 90 degrees.

For cables of constructions described here with conductors of wire diameter 24 American wire gauge (AWG) or less, the inner radius 1502 may range from 5 mm to 1 mm (or lower in some cases) without significant impact to electrical performance (e.g., characteristic impedance, skew, attenuation loss, insertion loss, etc.). It is noted, that unless otherwise stated, diameters of insulated conductors that are expressed in terms of AWG are intended to refer to a wire portion of the insulated conductor, and not a diameter of the covering insulation.

Table 1 below illustrates expected maximum variations of some of these characteristics for production cables having wire diameters of 24 AWG or less. These characteristics are measured for differential pairs of conductors. While the cables may be capable of performance better than illustrated in Table 1, these values may represent at least a conservative baseline usable for a system designer for estimating performance in production and/or deployment environments, and may still represent a significant improvement over wrapped twinax cables commonly used in similar environments.

TABLE 1

Variance of electrical characteristics for ribbon cable, 24 AWG or smaller, bend angle 180 degrees or less

| Inner bend radius | Local differential impedance variance | Insertion loss variance |
|---|---|---|
| 5 mm | 1 ohm | 0.1 dB |
| 4 mm | 2 ohms | 0.2 dB |
| 3 mm | 3 ohms | 0.3 dB |
| 2 mm | 4 ohms | 0.4 dB |
| 1 mm | 5 ohms | 0.5 dB |

Generally, ribbon cables according to the embodiments discussed herein may be more flexible than conventional (e.g., wrapped) twinax cables designed for high speed data transfer. This flexibility may be measured in a number of ways, including defining a minimum bend radius 1502 for a given conductor/wire diameter, definition of an amount of force needed to deflect the cable, and/or impact on electrical characteristics for a given set of bending parameters. These and other characteristics will be discussed in greater detail below.

Figure 17:
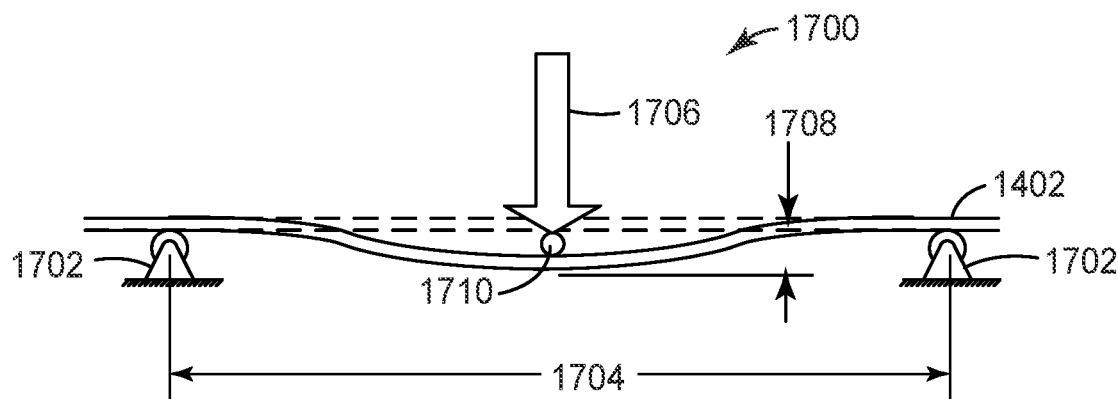
FIG. 17 is a block diagram illustrating an example test setup for measuring force versus deflection of a cable.

In reference now to FIG. 17, a block diagram illustrates a test setup 1700 for measuring force versus deflection of a cable 1402 according to an example embodiment. In this setup, the cable 1402 is initially laid flat across roller-type supports 1702 as indicated by dashed lines. The supports 1702 prevent downward motion, but otherwise allow free movement of the cable in a side-to-side direction. This may be analogous to the constraint of a simply supported beam, e.g., a beam that has hinged connection at one end and roller connection in other end, although in the case of the cable there need be no side-to-side restraint such as a hinge might provide.

The supports 1702 in this test setup include 2.0 inch diameter cylinders separated by a constant distance 1704 of 5.0 inches between the top sides of the cylinders (e.g., 12 o'clock position when viewed from the side as seen in FIG. 17). A force 1706 is applied to the cable 1402 via a force actuator 1710 at a point equidistant between supports 1704, and deflection 1708 is measured. The force actuator 1710 is a 0.375 inch diameter cylinder, driven at a 5.0 inches per minute crosshead speed.

Figure 18:
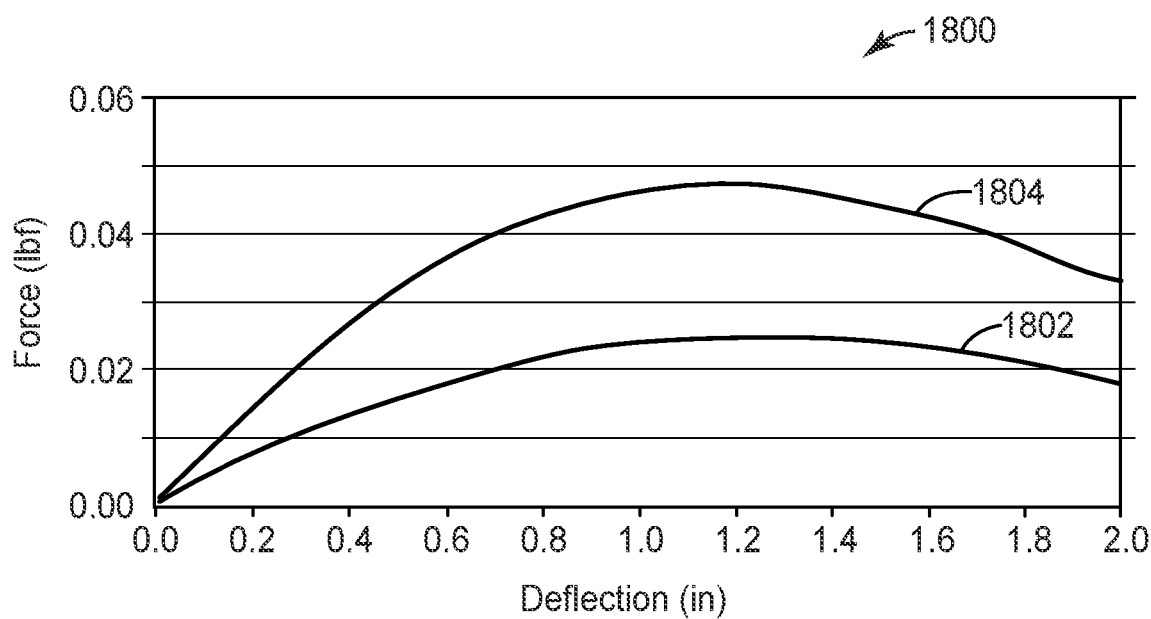
FIGS. 18 and 19 are graphs showing results of example force-deflection tests for cables.

Results of a first test using setup 1700 for cables according to embodiments are shown in graph 1800 of FIG. 18. Curve 1802 represents force-deflection results for a ribbon cable (e.g., similar to configuration 102c in FIG. 2c) with two solid 30 AWG conductors, solid polyolefin insulation, and two 32 AWG drain wires. The maximum force is approximately 0.025 lbf, and occurs at approximately 1.2 inches of deflection. By way of a rough comparison, curve 1804 was measured for a wrapped twinax cable having two 30 AWG wires, and two 30 AWG drain wires. This curve has maximum force of around 0.048 lbs at a deflection of 1.2 inches. All things being equal, it would be expected that the twinax cable would be slightly stiffer due to the thicker (30 AWG vs. 32 AWG) drain wires used, however this would not fully explain the significant difference between curves 1802 and 1804. Generally, it is expected that the application of the force of 0.03 lbf on the cable represented by curve 1802 midpoint between the supporting points causes the deflection in the direction of the force of at least 1 inch. It should be apparent that the cable represented by curve 1804 would deflect about half that much in response to the same 0.03 lbf force.

Figure 19:
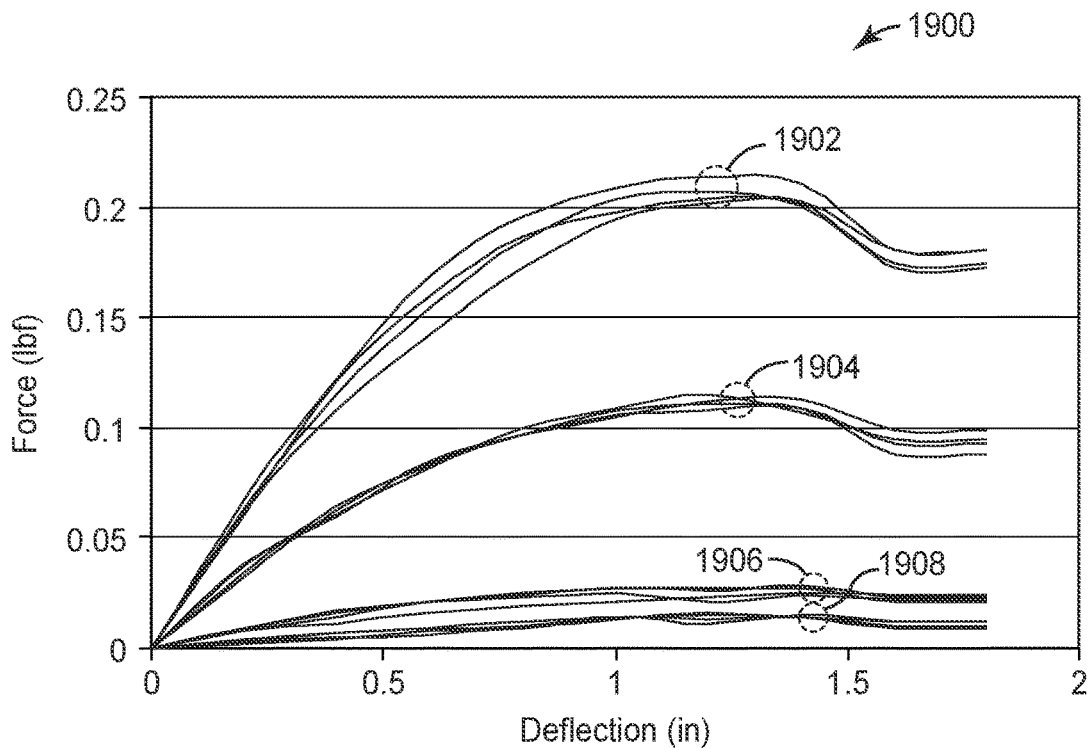

In FIG. 19, a graph 1900 shows results of a subsequent test of cables according to example embodiments using the force deflection setup of FIG. 17. For each of four wire gauges (24, 26, 30, and 32 AWG), four cables were tested, each having two solid wire conductors of the respective gauges. The cables included polypropylene insulation on the conductors, shielding films on both sides of the cables, and no drain wires. The force was measured for every 0.2 inches of deflection. Table 2 below summarizes the results at the maximum force points 1902, 1904, 1906, 1908, which correspond to the results for the sets of cables with respective wire gauge sizes of 24, 26, 30, and 32 AWG. The fifth and sixth columns of Table 2 correspond to the respective highest and lowest maximum forces of the four cables tested within each gauge group.

TABLE 2

Force-deflection results for shielded ribbon cables with one conductor pair.

| Conductor wire gauge (AWG) | Deflection at maximum force (in.) | Average maximum force, $F_{max}$ (lbf) | Standard deviation of $F_{max}$ (lbf) | Highest max force (lbf) | Lowest max force (lbf) |
|---|---|---|---|---|---|
| 24 | 1.2 | 0.207 | 0.005 | 0.214 | 0.202 |
| 26 | 1.2 | 0.111 | 0.003 | 0.114 | 0.108 |
| 30 | 1.4 | 0.0261 | 0.002 | 0.0284 | 0.0241 |
| 32 | 1.4 | 0.0140 | 0.0006 | 0.0149 | 0.0137 |

Figure 20:
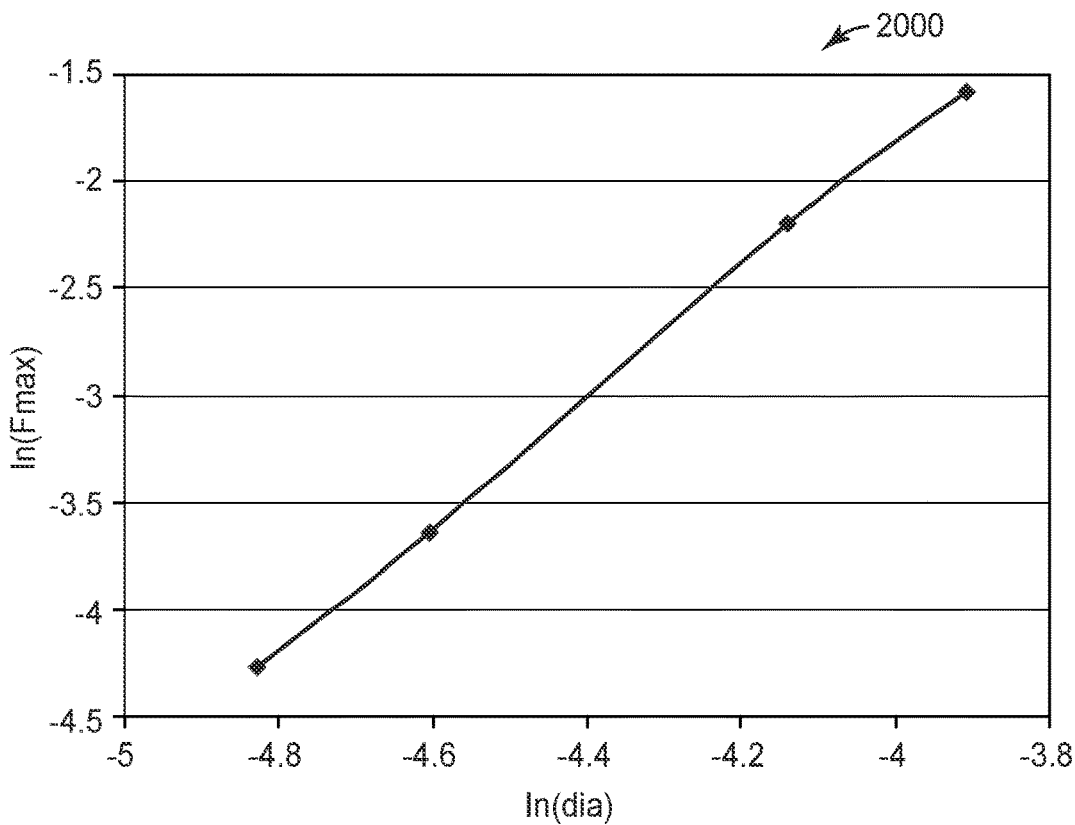
FIG. 20 is a logarithmic graph summarizing average values of force-deflection tests for example cables.

For the data in Table 2, it is possible to perform a linear regression of the form y=mx+b on the logarithms of wire diameters versus the logarithms of maximum deflection force. The natural logarithms (1n) of the forces in the third column of Table 2 are plotted versus natural logarithms of the respective diameters in graph 2000 of FIG. 20. The diameters of 24, 26, 30, and 32 AWG wires are 0.0201, 0.0159, 0.010, and 0.008, respectively. A least squares linear regression of the curve in graph 2000 results in the following fit: ln(Fmax)=2.96*ln(dia)+10.0. By solving for Fmax and rounding to two significant figures, the following empirical result is obtained:

$$F_{max} = M * dia^3, \text{ where } M = 22{,}000 \text{ lbf/in}^3 \quad [1]$$

Equation [1] predicts that a similar cable made using two 28 AWG conductors (diameter=0.0126) would bend at a maximum force of 22,000*0.01263=0.044 lbf. Such a result is reasonable in view of the results for other gauges shown in FIG. 19. Further, Equation [1] may be modified to express the individual maximum force ($F_{max-single}$) for each single insulated conductor as follows:

$$F_{max-single} = M * dia^3, \text{ where } M = 11{,}000 \text{ lbf/in}^3 \quad [2]$$

The individual forces calculated from [2] for each insulated conductor (and drain wires or other non-insulated conductors) may be combined to obtain a collective maximum bending force for a give cable. For example, a combination of two 30 AWG and two 32 AWG wires would be expected to have a maximum bending resistance force of 0.0261+0.014=0.0301 lbf. This is higher than the 0.025 lbf value seen in curve 1802 of FIG. 18 for the tested cable that had a combination of 30 AWG insulated wires and 32 AWG drain wires. However, such a difference may be expected. The drain wires in the tested cable are not insulated, thereby making the tested cable more flexible than the theoretical case. Generally, the results of Equations [1] and [2] are expected to return a high-end limit of bending forces, which would still be more flexible than a conventional wrapped cable. By way of comparison, using Equation [2] for four 30 AWG wires, the maximum force would be 4*11,000*0.01=0.044 lbf, which is below what is seen with the conventional wrapped cable test curve 1804 in FIG. 18. If the drain wires in the wrapped cable were insulated (which was not the case) the curve 1804 would be expected exhibit an even higher maximum force.

A number of other factors could alter the results predicted by Equations [1] and [2], including the type of wire insulation (polyethylene and foamed insulation would likely be less stiff, and fluoropolymer insulation more stiff), the type of wire (stranded wires would be less stiff), etc. Nonetheless, Equations [1] and [2] may provide a reasonable estimate of maximum bending forces for a given cable assembly, and present ribbon cable constructions exhibiting such properties should be measurably more flexible than equivalent wrapped constructions.

Figure 21:
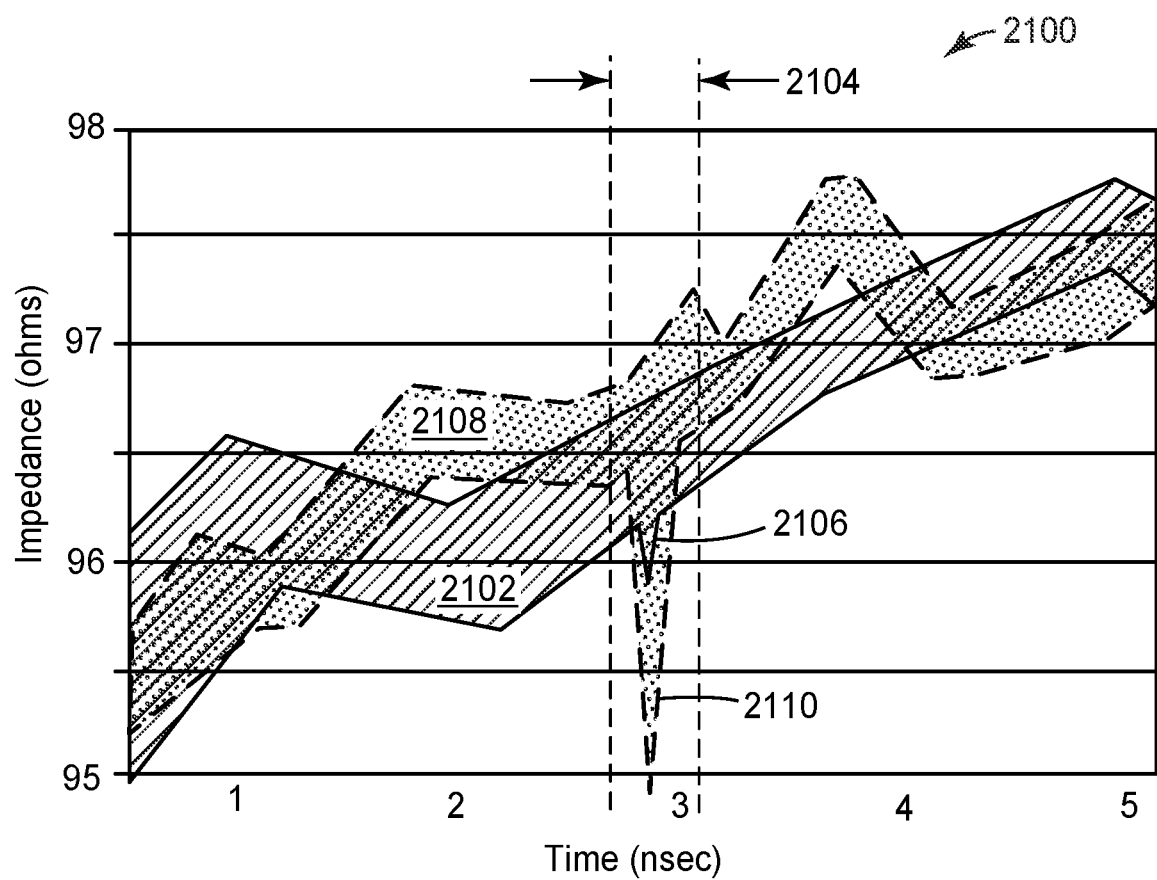
FIG. 21 is a graph showing time domain reflectometer measurements of differential impedance at a bend regions for a cable according to an example embodiment.

Also of interest in these cables is the minimum size of the radius 1506 over which the cable 1402 may be bent/folded (see FIGS. 15 and 16) without significantly affecting electrical characteristics of the cable (e.g., impedance, crosstalk). These characteristics may be measured locally and/or over the entire cable. In reference now to FIG. 21, a graph 2100 illustrates bending performance of a cable according to an example embodiment. Graph 2100 represents characteristic impedance measurements of a representative cable measured using a time domain reflectometer (TDR) with a rise time of 35 ps. Area 2102 represents an envelope of differential impedance readings for a 100-ohm, solid conductor, differential pair, 30 AWG ribbon cable with a construction similar to that of cable construction 102c shown in FIG. 2c. The impedance of the cable was measured in an initial, unbent state, and again when the cable was bent once at 180-degree angle over a 1.0 mm bend radius. The bent-cable impedance measurement was made again after the cable was bent ten times over the same angle and radius. The time region 2104 indicated by the vertical dashed lines corresponds to a location generally proximate to this bending.

The envelope 2102 represents an outline of the extremum of the measured impedance curves under all of the above described tests. This envelope 2102 includes an impedance variance/discontinuity 2106 due to the bending. The variance 2106 is estimated to be approximately 0.5 ohms (peak impedance 95.9 ohms versus nominal 96.4 ohms in an unbent configuration at this location 2104). This variance 2106 was seen after the first bend, but not after the tenth, where no significant deviation from the envelope 2102 was seen. By way of comparison, a similar test, represented by envelope 2108, was performed on a conventional, helically-wrapped, 30 AWG, twinax cable. This measurement 2108 shows a local impedance variance 2110 of approximately 1.6 ohms. The variance 2110 not only is of greater magnitude than variance 2106, but is wider in the time scale, thereby affecting a larger region of the cable. This deviation 2110 was also seen both in the first and tenth bend measurement of the conventional cable.

A similar set of impedance measurements was made for solid 26 AWG and 24 AWG 100 ohm cables of similar construction to that of cable construction 102c shown in FIG. 2c, except without drain wires 112c. The 26 and 24 AWG cables were bent 180 degrees over a 1.0 mm bend radius. The resulting average variance was 0.71 ohms for the 26 AWG cable and 2.4 ohms for the 24 AWG cable. Further, the 24 AWG was bent 180 degrees over a 2.0 mm radius, and the average variance was 1.7 ohms. Therefore a cable of this construction should exhibit a variance of characteristic impedance of no more than 2 ohms (or 2% of 100 ohm nominal impedance) proximate a 2.0 mm bend for conductor wire diameters of 24 AWG or less. Further, a cable of this construction should exhibit a variance of characteristic impedance of no more than 1 ohms (or 2% of 100 ohm nominal impedance) proximate a 1.0 mm bend for conductor wire diameters of 26 AWG or less.

Although the measurements shown in graph 2100 are differential impedance measurements for cables with nominal 100 ohm characteristic impedance, the deviation/discontinuity 2106 is expected to scale linearly for other cable impedances and measurement techniques. For example, a 50 ohm single-ended impedance measurement (e.g., measuring just one wire of a differential pair) would be expected to vary no more than 2% (1 ohm) proximate the bending for conductor wire diameters of 24 AWG or less, and 1% (0.5 ohm) for conductor wire diameters of 26 AWG or less. Similar scaling may be seen with different nominal values, e.g., 75 ohm characteristic differential impedance versus 100 ohms.

One possible reason for the improvement in impedance characteristics 2102 of the representative ribbon cable compared to characteristics 2108 of the wrapped cable is because of how the outer layers are formed on the wrapped cable. Having a wrapped construction (e.g., individual layers being overlapped, leading to more layers of covering) tends to increase the stiffness of the wrap. This can pinch or "choke" the cable in the local area of a bend more than a ribbon cable with a single layer. Thus, all things being equal, a ribbon cable can be bent more sharply than a conventional cable with less effect on impedance. The effect of these impedance discontinuities is cumulative in the same cable, and so the ribbon cable can contain a greater number bends and still function acceptably relative to a conventional wrapped cable. This improved bend performance may be present whether the conductor set is alone (discrete), or in a ribbon cable with other conductor sets.

Among the benefits of a ribbon cable type construction are reduced labor and cost associated with terminating the cable. One connector of choice for high speed connections is a printed circuit board (PCB) style "paddle-card" that connects to stamped contacts on the one or both sides of the board. To facilitate this type of termination, the ground planes of the ribbon cable may be made easily strippable from the core and the core can be made readily strippable from the wires. Lasers, fixtures, and mechanical cutting can be employed to make the process repeatable and fast.

Connection of the PCB to the cable ground planes can be accomplished by any number of methods such as conductive adhesives, conductive tapes, soldering, welding, ultrasound, mechanical clamping, etc. Likewise, connection of the conductors to the PCB can be accomplished using solder, welding, ultrasound, and other processes and is most efficiently done all at once (gang bonding). In many of these configurations, the PCB has wire connections on both sides, therefore one or two such ribbon cables can be used (one for each side) and can be stacked on top of one another in the cable.

In addition to the time savings that may be seen using ribbon cable to paddle card termination, the magnitude and length of any impedance discontinuities or skew may be reduced at the termination site. One approach used in terminating the cables is to limit the length of conductor at the termination that is not impedance-controlled. This may accomplished by presenting the wire to the connection in roughly the same format as the connector, which may include a linear array of traces with pads on a PCB. The pitch of the cable may be able to be matched with the pitch of the PCB, thereby eliminating unequal and long exposed wire lengths needed when the cables do not have a matching pitch. Also, since the pitch can be made to match the board pitch, a length of uncontrolled wire extending from the cable to the connector can be minimized.

Figure 22:
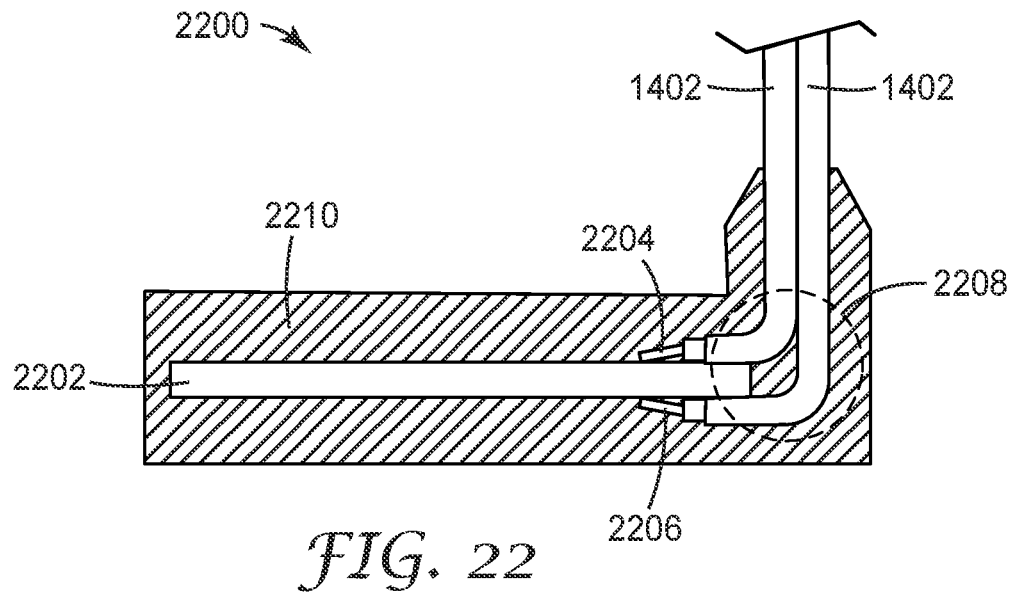
FIGS. 22-27 are side cross-sectional views of connectors according to example embodiments.

Another benefit the cables described herein may exhibit with regards to termination is that folded portions of such cables can be encapsulated in connectors. This may readily facilitate the formation of inexpensive angled connectors. Various examples of connectors according to example embodiments are shown in FIGS. 22-27. In FIG. 22, connector assembly 2200 terminates two layers of cable of previously described shielded ribbon cable configuration 1402. Some or all conductors of cables 1402 are electrically coupled to the paddle card at top and bottom termination areas 2204, 2206. The cables 1402 include bends at region 2208 that facilitate routing the cables 1402 at a right angle relative to the paddle card. An overmold 2210 encompasses at least the bend region 2208, and may encompass at least part of the paddle card 2202 (e.g., near termination areas 2204, 2206).

Figure 23:
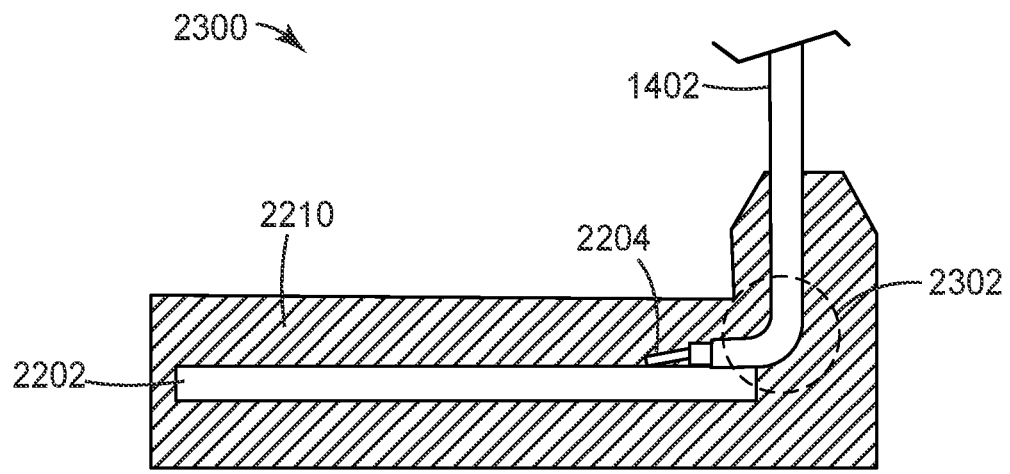
Figure 24:
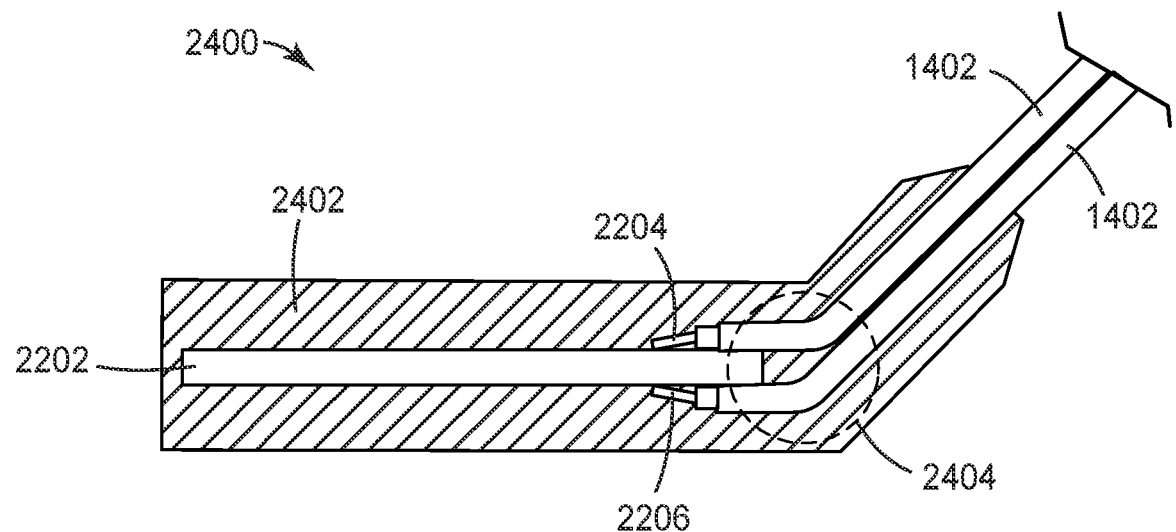
Figure 25:
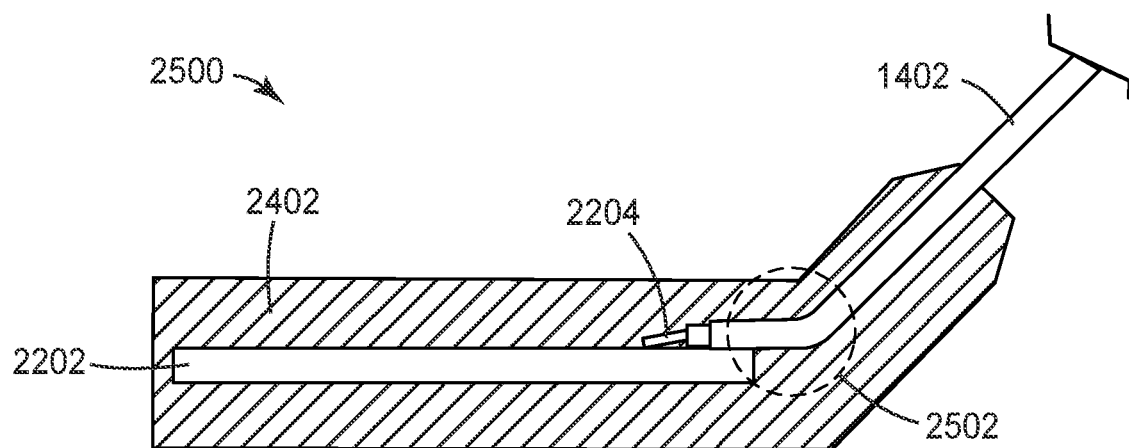

In FIG. 23, a connector assembly 2300 may include components similar to 2200, except that a single shielded ribbon cable 1402 is used. The assembly 2300 may include a similar overmold 2210, which in this example encompasses bend region 2302 and termination area 2204. FIGS. 24 and 25 include connector assemblies 2400 and 2500 similar to 2300 and 1400, respectively, except that respective overmolds 2402 encompass bend regions 2404, 2502 with approximate 45 degree bends.

Figure 26:
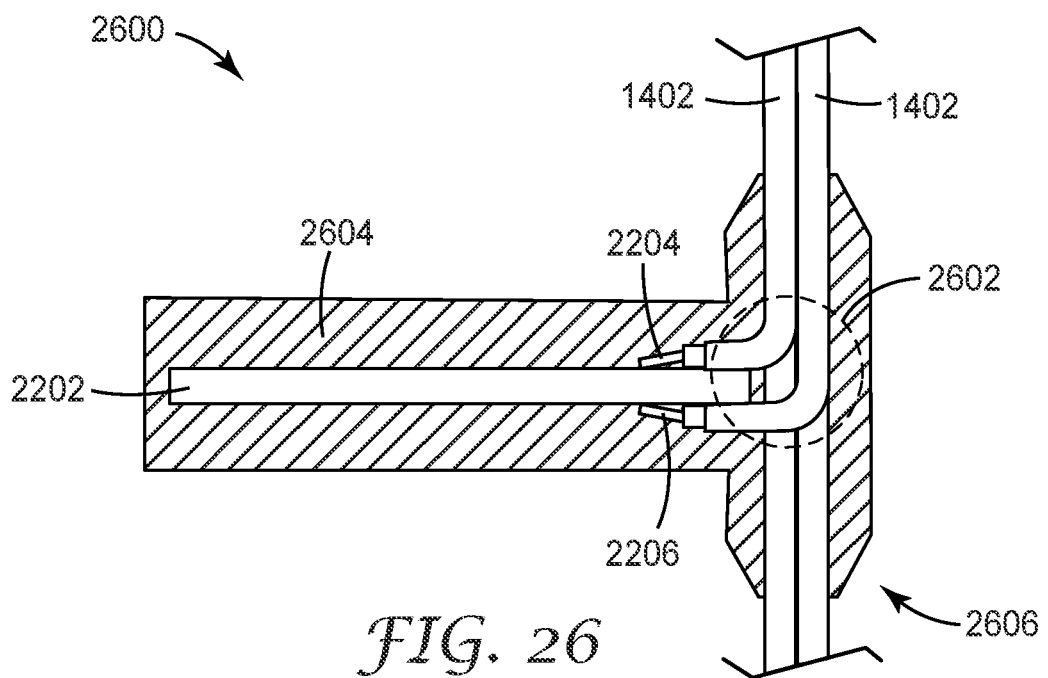
Figure 27:
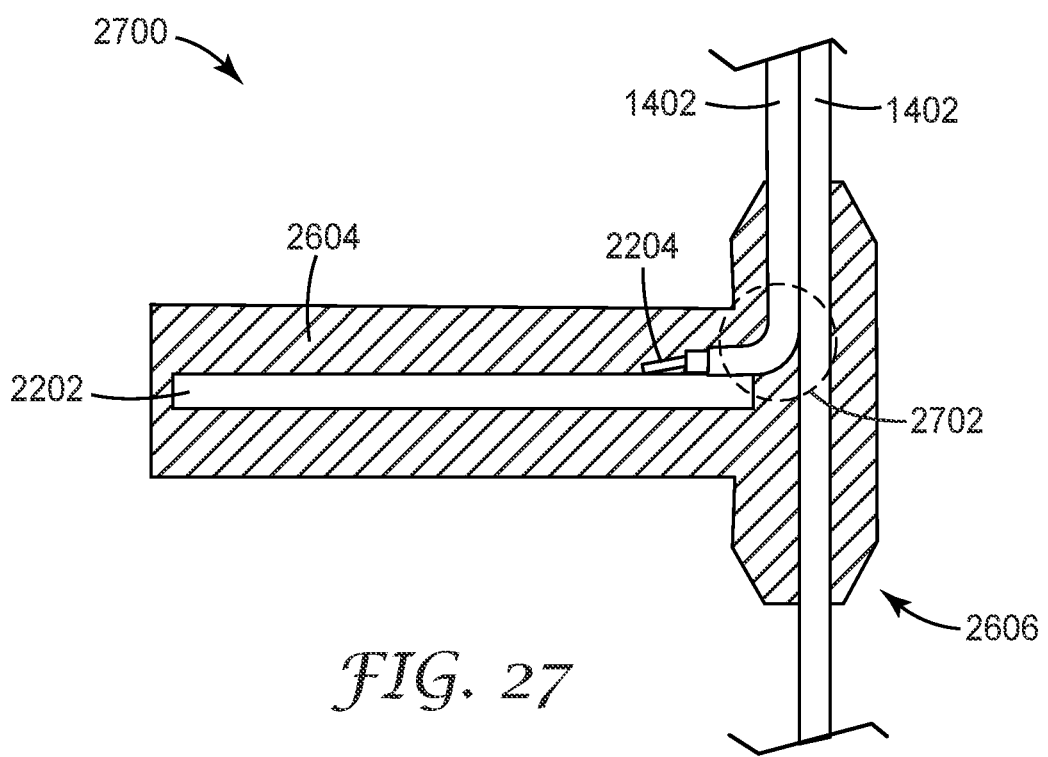

The connectors 2200, 2300, 2400, 2500 are all illustrated as terminating connectors, e.g., located at the end of a cable assembly. In some situations, a connector may be desired at a middle portion of the cable assembly, which may include any non-terminal part of one or more cables 1402 that make up the assembly. Examples of middle portion connectors 2600 and 2700 are shown in FIGS. 26 and 27. In FIG. 26, a portion of respective cables 1402 may be broken off from the ribbon, bent at bend area 2602 and terminated at termination areas 2204, 2206. An overmold 2604 encompasses at least the bend area 2602, and also include an exit region 2606 (e.g., strain relief) where unbent portions of ribbon cables 1402 continue on. Cable 2700 is similar to cable 2600, except that one of the ribbon cables 1402 is bent at region 2702 and terminated entirely at area 2204. The other of the cables 1402 is not bent or terminated, but exits region 2606.

Those of ordinary skill in the art will appreciate that the features shown in FIGS. 22-27 are provided for purposes of illustration and not of limitation. It will be appreciated that many variations may exist that combine various disclosed features in FIGS. 22-27. For example, the bends in regions 2208, 2302, 2404, and 2502 may take on any angle and bend radius described herein for cable 1402 and equivalents. In another example, while the illustrated connectors 2200, 2300, 2400, 2500, 2600, and 2700 are all shown using paddle cards 2206, other termination structures (e.g., crimped pins/sockets, insulation displacement connections, solder cups, etc.) may be used for similar purposes without departing from the inventive scope of these embodiments. In yet another example, the connectors 2200, 2300, 2400, 2500, 2600, and 2700 may use alternate casings/covers instead of overmolds, such as multi-piece, mechanically-attached housings, shrink wrap structures, bonded/adhesive attached coverings, etc.

The foregoing description of the example embodiments has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

The following items are exemplary embodiments of a shielded electrical cable according to aspects of the present invention.

Item 1 is a shielded electrical cable, comprising: a plurality of conductor sets extending along a length of the cable and being spaced apart from each other along a width of the cable, each conductor set including one or more insulated conductors; first and second shielding films disposed on opposite sides of the cable, the first and second films including cover portions and pinched portions arranged such that, in transverse cross section, the cover portions of the first and second films in combination substantially surround each conductor set, and the pinched portions of the first and second films in combination form pinched portions of the cable on each side of each conductor set; and a first adhesive layer bonding the first shielding film to the second shielding film in the pinched portions of the cable; wherein: the plurality of conductor sets comprises a first conductor set that comprises neighboring first and second insulated conductors and has corresponding first cover portions of the first and second shielding films and corresponding first pinched portions of the first and second shielding films forming a first pinched cable portion on one side of the first conductor set; a selected one of the insulated conductors has a wire diameter no greater than 24 American wire gauge (AWG); and wherein a transverse bending of the cable at a cable location of no more than 180 degrees over an inner radius of at most 2 mm causes a cable impedance of the selected insulated conductor proximate the cable location to vary by no more than 2 percent from an initial cable impedance measured at the cable location in an unbent configuration.

Item 2 is a cable according to item 1, wherein the wire diameter of the selected insulated conductor is no greater than 26 AWG, and wherein a transverse bending of a cable location of no more than 180 degrees over an inner radius of at most 1 mm causes the cable impedance of the selected insulated conductor proximate the cable location to vary by no more than 1 percent from the initial cable impedance.

Item 3 is a cable according to item 1, wherein the selected insulated conductor is part of a selected one of the conductor sets that includes at least two insulated conductors each having a wire diameter no greater than 24 AWG and a nominal differential impedance of 100 ohms, and wherein the transverse bending of the cable causes a differential cable impedance of the selected conductor set proximate the cable location to vary by no more than 2 ohms from an initial differential cable impedance measured at the cable location in the unbent configuration.

Item 4 is a cable according to item 3, wherein the wire diameter of the at least two insulated conductors is no greater than 26 AWG, and wherein the transverse bending of a cable location of no more than 180 degrees over a second inner radius of at most 1 mm causes the differential cable impedance of the selected conductor set proximate the cable location to vary by no more than 1 ohm from the initial differential impedance.

Item 5 is a cable according to items 1 or 2, wherein the selected insulated conductor has a nominal cable impedance of 50 ohms, and wherein the cable impedance of the selected insulated conductor proximate the cable location varies by no more than 1 ohm from the initial cable impedance.

Item 6 is a cable according to any of items 1-5, wherein the cable further comprises a bend of at least 45 degrees around a fold line that extends across a width of the cable, wherein the bend has an inner radius of at most 5 mm.

Item 7 is a cable according to item 6, wherein the bend is at least 90 degrees and conforms to geometry of a structure that encloses the cable.

Item 8 is a cable according to item 6 or 7, wherein the bend is at least 180 degrees and the fold line is at a fold angle relative to a longitudinal edge of the cable such that the cable turns at a turn angle in response to flattening of proximate regions before and after the bend to a plane.

Item 9 is a cable according to item 8, wherein the fold angle is 45 degrees, and the turn angle is 90 degrees.

Item 10 is a shielded electrical cable, comprising: a plurality of conductor sets extending along a length of the cable and being spaced apart from each other along a width of the cable, each conductor set including one or more insulated conductors; first and second shielding films disposed on opposite sides of the cable, the first and second films including cover portions and pinched portions arranged such that, in transverse cross section, the cover portions of the first and second films in combination substantially surround each conductor set, and the pinched portions of the first and second films in combination form pinched portions of the cable on each side of each conductor set; and a first adhesive layer bonding the first shielding film to the second shielding film in the pinched portions of the cable; wherein: the plurality of conductor sets comprises a first conductor set that comprises neighboring first and second insulated conductors and has corresponding first cover portions of the first and second shielding films and corresponding first pinched portions of the first and second shielding films forming a first pinched cable portion on one side of the first conductor set; a selected one of the insulated conductors has a wire diameter no greater than 24 American wire gauge (AWG); and wherein a transverse bending of the cable at a cable location of no more than 180 degrees over an inner radius of at most 5 mm causes an insertion loss of the selected insulated conductor proximate the cable location to vary by no more than 0.5 dB from an initial insertion loss measured at the cable location in an unbent configuration.

Item 11 is a cable according to item 10, wherein the cable further comprises a bend of at least 45 degrees around a fold line that extends across a width of the cable, wherein the bend has an inner radius of at most 5 mm.

Item 12 is a cable according to item 11, wherein the bend is at least 90 degrees and conforms to geometry of a structure that encloses the cable.

Item 13 is a cable according to item 11, wherein the bend is at least 180 degrees and the fold line is at a fold angle relative to a longitudinal edge of the cable such that the cable turns at a turn angle in response to flattening of proximate regions before and after the bend to a plane.

Item 14 is a cable according to item 13, wherein the fold angle is 45 degrees, and the turn angle is 90 degrees.

Item 15 is a shielded electrical cable, comprising: a plurality of conductor sets extending along a length of the cable and being spaced apart from each other along a width of the cable, each conductor set including one or more insulated conductors; first and second shielding films disposed on opposite sides of the cable, the first and second films including cover portions and pinched portions arranged such that, in transverse cross section, the cover portions of the first and second films in combination substantially surround each conductor set, and the pinched portions of the first and second films in combination form pinched portions of the cable on each side of each conductor set; and a first adhesive layer bonding the first shielding film to the second shielding film in the pinched portions of the cable; wherein: the plurality of conductor sets comprises a first conductor set that comprises neighboring first and second insulated conductors and has corresponding first cover portions of the first and second shielding films and corresponding first pinched portions of the first and second shielding films forming a first pinched cable portion on one side of the first conductor set; and an application of a force on the cable, the cable being simply supported between two supporting points that are 3.0 inches apart and the force being applied midpoint between the supporting points, results in a deflection in the direction of the force of at least one inch, and wherein the force, measured in pounds-force, does not exceed the sum of individual forces for each of the insulated conductors, the individual forces being equal to 11000 times a wire diameter cubed of the respective insulated conductor, the wire diameter being expressed in inches.

Item 16 is a cable according to item 15, wherein the wire diameter is no greater than 24 American wire gauge (AWG).

Item 17 is a cable according to item 15 or 16, wherein the maximum force occurs when the deflection is between 1 inch and 1.5 inches.

Item 18 is a cable according to any of items 15-17, wherein the cable further comprises a bend of at least 45 degrees around a fold line that extends across a width of the cable, wherein the bend has an inner radius of at most 5 mm.

Item 19 is a cable according to item 18, wherein the bend is at least 90 degrees and conforms to geometry of a structure that encloses the cable.

Item 20 is a cable according to item 18, wherein the bend is at least 180 degrees and the fold line is at a fold angle relative to a longitudinal edge of the cable such that the cable turns at a turn angle in response to flattening of proximate regions before and after the bend to a plane.

Item 21 is a cable according to item 20, wherein the fold angle is 45 degrees, and the turn angle is 90 degrees.

Item 22 is a cable assembly, comprising: a shielded electrical cable comprising: a plurality of conductor sets extending along a length of the cable and being spaced apart from each other along a width of the cable, each conductor set including one or more insulated conductors; first and second shielding films disposed on opposite sides of the cable, the first and second films including cover portions and pinched portions arranged such that, in transverse cross section, the cover portions of the first and second films in combination substantially surround each conductor set, and the pinched portions of the first and second films in combination form pinched portions of the cable on each side of each conductor set; a first adhesive layer bonding the first shielding film to the second shielding film in the pinched portions of the cable; and a bend in the cable of at least 45 degrees around a fold line that extends across a width of the cable, wherein the bend has an inner radius of at most 5 mm; wherein: the plurality of conductor sets comprises a first conductor set that comprises neighboring first and second insulated conductors and has corresponding first cover portions of the first and second shielding films and corresponding first pinched portions of the first and second shielding films forming a first pinched cable portion on one side of the first conductor set; and an electrical connector encompassing at least the bend in the cable, wherein at least one of the insulated conductors is electrically coupled to at least one contact of the electrical connector.

Item 23 is a cable assembly according to item 22, wherein the electrical connector comprises an overmold formed onto the cable.

Item 24 is a cable assembly according to items 22-23, wherein the electrical connector comprises a multi-piece housing.

Item 25 is a cable assembly according to any of items 22-24, wherein the connector comprises a paddle card connector.

Item 26 is a cable assembly according to any of items 22-24, wherein the bend is at least 90 degrees around the fold line.

Item 27 is a cable assembly according to item 26, wherein the inner radius of the bend is at most 1 mm.

Item 28 is a cable assembly according to any of items 22-25, wherein the inner radius of the bend is at most 1 mm.

Item 29 is a cable assembly according to any of items 22-28, wherein the connector is disposed on an end of the cable.

Item 30 is a cable assembly according to any of items 22-28, wherein the connector is disposed on a middle portion of the cable.

Item 31 is a cable assembly according to any of items 22-30, wherein the insulated conductors have a wire diameter of no more than 24 American wire gauge (AWG).

Item 32 is a cable assembly according to any of items 22-31, wherein the cable further comprises a second bend not encompassed by the electrical connector, the second bend being of at least 45 degrees around a second fold line that extends across a width of the cable, wherein the second bend has an inner radius of at most 5 mm.

Item 33 is a cable assembly according to item 32, wherein the second bend is at least 90 degrees and conforms to geometry of a structure that encloses the cable assembly.

Item 34 is a cable assembly according to item 32, wherein the second bend is at least 180 degrees and the second fold line is at a fold angle relative to a longitudinal edge of the cable such that the cable turns at a turn angle in response to flattening of proximate regions before and after the second bend to a plane.

Item 35 is a cable assembly according to item 34, wherein the second fold angle is degrees, and the turn angle is 90 degrees.

Item 36 is the cable assembly according to any of items 22-35, wherein the at least one conductor set is adapted for maximum data transmission rates of at least 1 Gb/s.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the mechanical, electro-mechanical, and electrical arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A shielded electrical cable, comprising:
a plurality of conductor sets extending along a length of the cable and arranged and spaced apart from each other along a width of the cable, each conductor set including two or more insulated conductors; each conductor set disposed on at least one shielding film; and
a non-conductive polymeric layer covering opposite sides of the plurality of differential pairs and including cover portions and at least one pinched portion arranged such that, in a transverse cross section, the cover portions of the polymeric layer substantially surrounds each of the differential pairs, and the at least one pinched portion of the polymeric layer forms at least one pinched portion of the cable on at least one corresponding lateral side of the cable;
wherein a transverse bending of the cable at a cable location of 90 degrees over an inner radius of at most 5 mm causes an insertion loss of the insulated conductors proximate the cable location to vary by no more than about 0.5 dB from an initial insertion loss measured at the cable location in an unbent configuration, wherein for a frequency range from about 2 GHz to about 20 GHz, a far end cross talk (FEXT) between adjacent conductor sets is less than about −35 dB.

2. The shielded electrical cable of claim 1, wherein the insulated conductors have wire diameters not greater than 24 American Wire Gauge (AWG).

3. The shielded electrical cable of claim 1, wherein the insulated conductors have wire diameters not greater than 26 American Wire Gauge (AWG).

4. The shielded electrical cable of claim 1, wherein a transverse bending of a cable location of 180 degrees over an inner radius of at most 2 mm causes a cable impedance of the insulated conductors proximate the cable location to vary by no more than 2 percent from an initial cable impedance measured at the cable location in an unbent configuration.

5. The shielded electrical cable of claim 1 further comprising a bend of at least 45 degrees around a fold line that extends across a width of the cable, wherein the bend has an inner radius of at most 5 mm.

6. The shielded electrical cable of claim 5, wherein the bend is at least 90 degrees and conforms to geometry of a structure that encloses the cable.

7. The shielded electrical cable of claim 5, wherein for the cable has a skew of less than about 20 psec/meter.

* * * * *